United States Patent
Tucker

(10) Patent No.: US 8,365,479 B2
(45) Date of Patent: Feb. 5, 2013

(54) SOLAR POWER STRUCTURE

(75) Inventor: Nicholas Brady Tucker, La Cañada, CA (US)

(73) Assignee: Phat Energy Corporation, La Crescenta, CA (US)

( * ) Notice: Subject to any disclaimer, the term of this patent is extended or adjusted under 35 U.S.C. 154(b) by 0 days.

(21) Appl. No.: 13/163,655

(22) Filed: Jun. 17, 2011

(65) Prior Publication Data

US 2011/0240093 A1  Oct. 6, 2011

(51) Int. Cl.
  *E04D 13/18*  (2006.01)
  *E04D 13/02*  (2006.01)
(52) U.S. Cl. ........ 52/173.3; 136/244; 136/251; 126/623
(58) Field of Classification Search ............. 52/658, 52/696, 656.1, 656.9, 657, 173.3; 136/244, 136/251; 126/623
  See application file for complete search history.

(56) References Cited

U.S. PATENT DOCUMENTS

| | | | |
|---|---|---|---|
| 1,897,062 A | 2/1933 | Liermann | |
| 3,195,735 A | 7/1965 | Jay | |
| 3,326,497 A | 6/1967 | Michelson | |
| 3,563,626 A | 2/1971 | Ferdinand et al. | |
| 3,698,958 A | 10/1972 | Williamson | |
| 3,741,405 A | 6/1973 | McConnell et al. | |
| 4,045,926 A | 9/1977 | Gibbs | |
| 4,216,633 A | 8/1980 | Grauer | |
| 4,262,809 A | 4/1981 | McConnell | |
| 4,269,173 A * | 5/1981 | Krueger et al. | 126/634 |
| 4,928,834 A | 5/1990 | Neiman | |
| 4,966,631 A * | 10/1990 | Matlin et al. | 136/244 |
| 5,125,608 A * | 6/1992 | McMaster et al. | 248/163.1 |
| 5,143,556 A * | 9/1992 | Matlin | 136/244 |
| 5,771,655 A * | 6/1998 | Strickland et al. | 52/745.2 |
| 5,899,035 A | 5/1999 | Waalkes et al. | |
| 5,969,501 A | 10/1999 | Glidden | |
| 6,301,846 B1 | 10/2001 | Waalkes et al. | |
| 6,374,566 B1 * | 4/2002 | Weeks | 52/655.2 |
| 7,252,083 B2 * | 8/2007 | Hayden | 126/600 |
| 7,254,925 B2 * | 8/2007 | Stefanutti et al. | 52/309.9 |
| 7,531,741 B1 * | 5/2009 | Melton et al. | 136/246 |
| 7,941,986 B2 * | 5/2011 | Jolicoeur et al. | 52/745.2 |
| 7,987,641 B2 * | 8/2011 | Cinnamon | 52/173.3 |

(Continued)

FOREIGN PATENT DOCUMENTS

| | | |
|---|---|---|
| CN | 2867597 Y | 2/2007 |
| DE | 102005013745 A1 | 10/2005 |

(Continued)

OTHER PUBLICATIONS

Sunforce 30W Folding Solar Panel Users Manual, publication date unknown, pp. 1-2, China.

(Continued)

*Primary Examiner* — Phi D. A
(74) *Attorney, Agent, or Firm* — Stone Creek Services LLC; Alan M. Flum

(57) ABSTRACT

A standalone or partially standalone solar photovoltaic structure and methods for assembling the structure are described. The solar photovoltaic structure can employ a hinged photovoltaic roof deck that can be folded for transportation. Described are hinges that can be removed after assembly and act as protective elements to facilitate transportation. Also described is an attachment arrangement for joining purlin or frame members to vertical support columns by locking the frame numbers into column capitals.

11 Claims, 50 Drawing Sheets

U.S. PATENT DOCUMENTS

| | | |
|---|---|---|
| 2003/0190222 A1 | 10/2003 | Riggin |
| 2006/0112656 A1 | 6/2006 | Tarleton et al. |
| 2007/0051067 A1 | 3/2007 | Wall |
| 2008/0264467 A1 | 10/2008 | Doko |
| 2009/0050194 A1 | 2/2009 | Noble |
| 2009/0320898 A1 | 12/2009 | Gumm |
| 2010/0065104 A1 | 3/2010 | Baruh |
| 2010/0275975 A1 | 11/2010 | Monschke et al. |
| 2011/0049992 A1 | 3/2011 | Sant'Anselmo et al. |
| 2011/0094569 A1 | 4/2011 | Hartley et al. |
| 2011/0283923 A1 | 11/2011 | Potter |
| 2011/0284709 A1 | 11/2011 | Potter |

FOREIGN PATENT DOCUMENTS

| | | |
|---|---|---|
| DE | 202009015885 | 4/2010 |
| GB | 1014861 | 12/1965 |
| GB | 2079808 | 1/1982 |
| GB | 2290567 A | 1/1996 |
| GB | 2362393 A | 11/2001 |
| GB | 2432855 | 6/2007 |
| JP | 7062876 A | 3/1995 |
| JP | 7268958 A | 10/1995 |
| JP | 7292968 A | 11/1995 |

OTHER PUBLICATIONS

Steel Building DIY Project Picture Gallery, publication date unknown, viewed on the internet at: http://www.absoluterv.com/user_gallery_solar_carport.htm.

Solar Canopies, publication date unknown, viewed on the internet at: http://floriansolarproducts.com/canopy.html.

Florian Commercial Division, publication date unknown, viewed on the internet at: http://floriansolarproducts.com/commerical.html.

* cited by examiner

SOLAR POWER STRUCTURE

BACKGROUND

The disclosure relates generally to photovoltaic power generating structures. In particular, the disclosure relates to standalone or partially standalone solar photovoltaic structures for commercial and residential applications that might typically include carport, shade, porch, or canopy structures.

Solar photovoltaic (PV) cells utilized in the form of solar PV panels and solar PV surfaces for converting sunlight into electricity are becoming an increasingly popular source of clean and renewable energy in both commercial and residential settings. Solar PV panels and solar PV surfaces have been deployed directly on top of existing roof structures. They have also been deployed in standalone or partially supported solar PV structures, for example in commercial and residential carports or covered patios, porches and walkways.

One challenge is to make an aesthetically pleasing standalone or partially standalone solar PV structures that are easy and inexpensive to transport and deploy. Another challenge is to minimize extra equipment needed for deployment. For example, depending on the specific installation requirements of the system, the installation contractor often must provide cranes, ladders, or other lifting or placement equipment. An additional challenge is to make a system that is designed for modular expansion. Addressing these challenges can help to encourage wide spread use of solar PV structures in both commercial and residential settings and therefore the greater use of solar PV energy, a renewable energy resource. Aesthetically pleasing structures, for example, allow solar PV energy to be installed in both commercial and residential locations were appearance is important. Solar PV structures that are easy and economical to install and easy to transport lower the overall costs of a solar PV installation and thus encourage the use of solar electric energy as an alternative to traditional non-renewable sources.

For the forgoing reasons, there is a need for a standalone or partially standalone solar PV structure, in commercial or residential settings, designed for modular expansion, that is easy to deployed, aesthetically pleasing, and minimizes the need for extra equipment to facilitate its deployment.

SUMMARY

This Summary introduces a selection of concepts in simplified form that are described the Description. The Summary is not intended to identify essential features or limit the scope of the claimed subject matter.

One aspect of the present disclosure describes a standalone or partially standalone solar PV structure, methods for assembling a solar PV structure, and an apparatus to help facilitate deployment and assembly the solar PV structure. One aspect of the disclosed solar PV structure includes one or more solar PV roof deck assemblies that together form the roof of the solar PV structure. The solar PV roof deck assembly can be folded in half for transportation.

Part of the inventor's contribution, in an embodiment of the disclosure, is the discovery that it would be possible to help facilitate transportation and assembly of a standalone or partially standalone solar PV structures by providing a plurality of removable hinges where the hinges are configured to act as a protective elements during transportation and storage of the folded PV roof deck assembly. Optionally, one or more of the hinges can be configured to accept lifting hooks to help facilitate assembly of the solar PV structure.

In an alternative embodiment, a solar PV structure includes two or more beams, and two or more support column extending beneath the beams. Each beam includes an end portion with one or more pairs of hooks and tabs extending outward from the end portion of the beam. The top of each column is secured to a column capital. The column capital includes two or more portions that include slots for receiving the hook/tabs extending from the beams. This arrangement can help to facilitate modular expansion. For example, to expand the solar PV structure, an additional pair of columns and column capitals can be secured in place. An additional pair of beams can be secured between the additional column capital and their adjacent column capital of the solar PV structure.

Also disclosed is a solar PV structure that includes two or more beams, two or more support columns attached to and extending beneath the beams, and one or more PV roof decks. The roof decks each include two portions hinged together by a single central fold. The PV roof deck can be configured to unfolded by applying a force at the edges opposite the fold.

In one aspect, a method is described for assembling a solar PV structure using a rigging apparatus that is part of the transportation carrier. The transportation carrier is configured to lift and upwardly unfold the solar PV deck above the column and beam assembly by applying force at the edges opposite the fold. In addition, a transportation carrier for carrying out this method is described.

DRAWINGS

These and other features, aspects, and advantages of the present invention, which is defined solely by the claims and their equivalents, will become better understood with regard to the following description and accompanying drawings where:

FIG. 16 illustrates a solar PV roof deck structure with protective hinges folded for transportation in a shipping container.

DESCRIPTION

Figure 1:
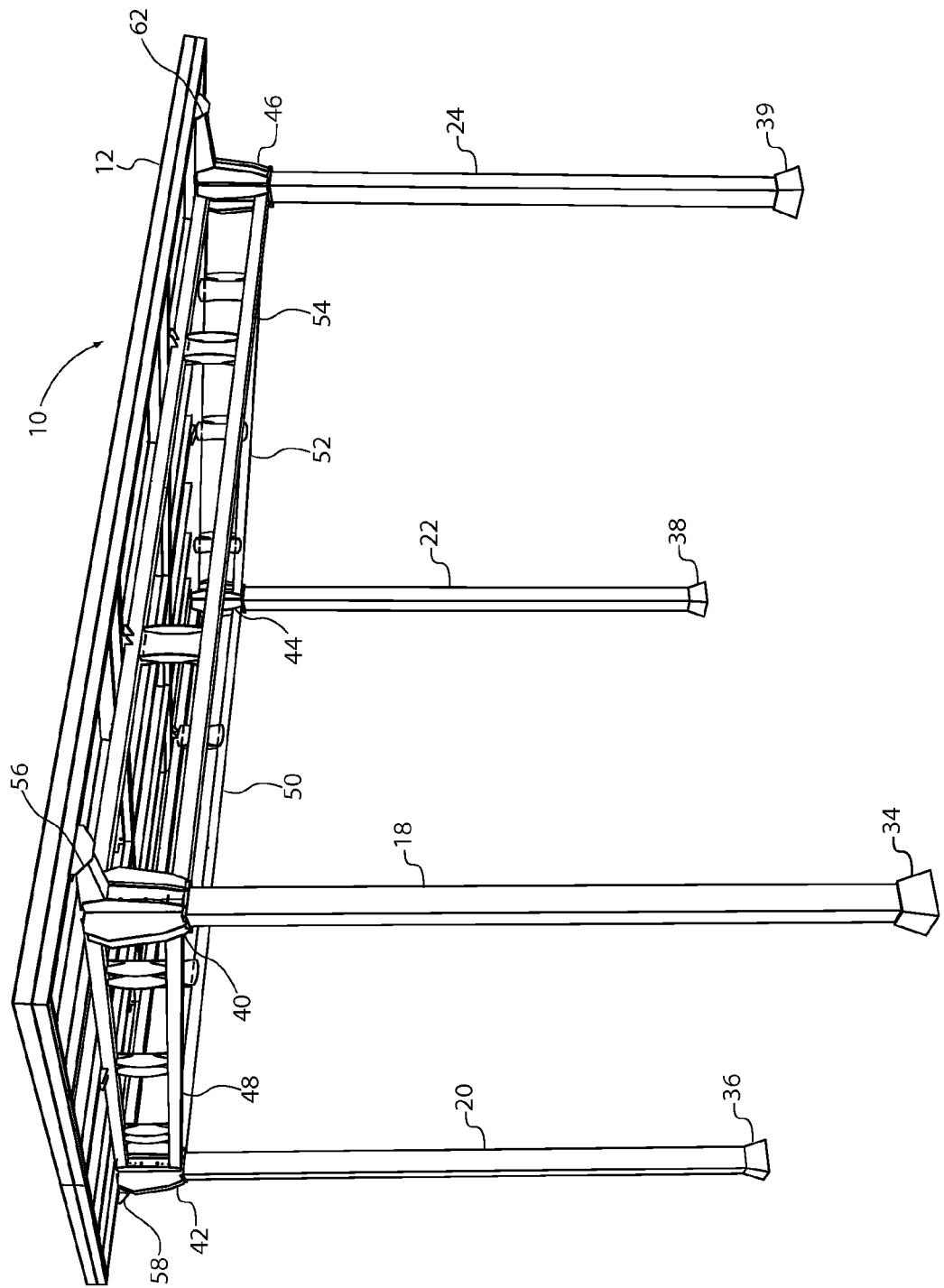
FIG. 1 illustrates an assembled solar PV structure.
Figure 2:
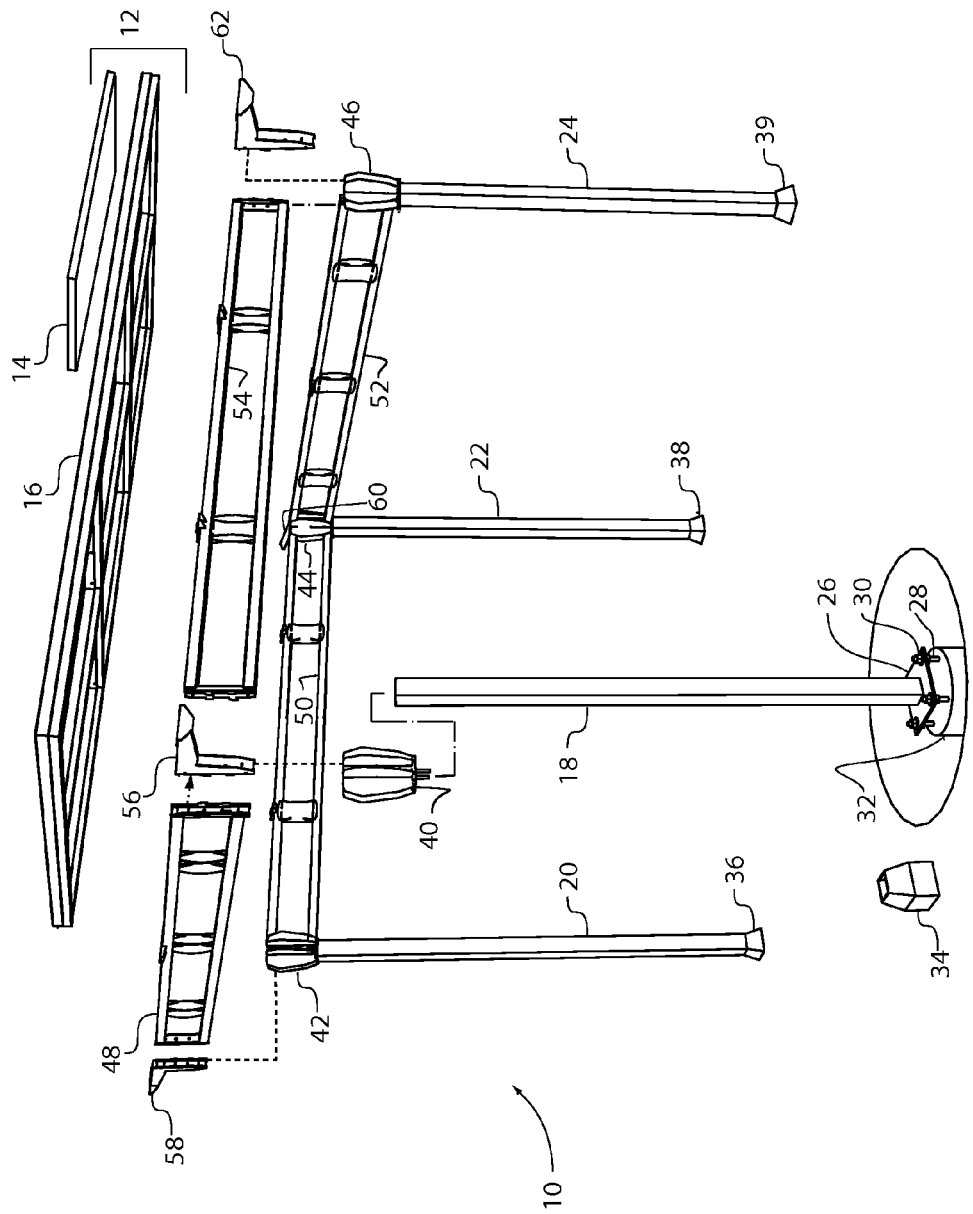
FIG. 2 illustrates an exploded view of a solar PV structure as in FIG. 1.

Referring now to the drawings in detail wherein like numerals indicate like elements throughout the several views, FIG. 1 illustrates an exemplary embodiment of a solar PV structure 10. FIG. 2 illustrates an exploded view of a solar PV structure 10 as in FIG. 1. Referring to FIGS. 1 and 2, the solar panel PV assembly includes a solar PV roof deck 12. Referring to FIG. 2, the solar PV roof deck 12 includes solar PV surfaces 14 and a PV surface support frame 16 for hold the solar PV surface. As used in this disclosure, a solar PV surface is a broad term used to mean a collection of solar PV cells assembled in a planar surface. A solar PV surface can include what is known in the art as a solar PV panels or solar PV module, but can also include flexible thin film PV modules or sheets, rigid thin film PV modules or sheets.

Referring again to FIGS. 1 and 2, the solar PV roof deck 12 can be supported by a plurality of approximately vertical support columns. Illustrated are a first support column 18, a second support column 20, a third support column 22, and a fourth support column 24. The support columns can be made of metal, such as steel or aluminum. Alternatively, the support columns can be made of fiberglass, or can be metal core with a of tertiary cladding. While four vertical support columns are shown, this number is exemplary, and additional pairs of support columns can be added to expand the structure beyond what is shown in FIG. 1.

The base of each support column can include a base plate. Referring to FIG. 2, the first support column 18 includes a base plate 26. The base plate includes one or more apertures that are disposed to receive a threaded fastener 28 and seat a nut 30. The nut 30 is disposed to engage and hold the threaded fastener 28. Illustrated are three of the threaded fasteners 28 with a nut 30 corresponding to each of the threaded fasteners 28. A fourth threaded fastener and fourth corresponding nut hidden behind the first support column 18. This number of threaded fasteners and nuts are exemplary and other numbers of fasteners are possible.

The threaded fastener 28 is engaged by a concrete footer 32. The concrete footer 32 can be either pre-cast or cast in place. The threaded fastener 28 can be of the type that is cast into the footer such as a column anchor, J-bolt, L-bolt, pigtail anchor. These anchor types can allow for the possibility for disassembly of solar PV structure 10 and removal of the support columns for the concrete footers, for example, the first support column 18 from the concrete footer 32. While the threaded fastener 28 is illustrated engaged by a nut 30, a threaded fastener that does not require a nut to engage it to the concrete can alternatively be used. In addition, the threaded fastener can be a non-removable type such as a cast in-place post-tensionable anchor system or can be of the type that is secured by drilling into the concrete, rather than cast in place such as a spin-lock anchor, undercut anchor or sledge drive anchor.

Illustrated in FIGS. 1 and 2 are column covers for covering column bases. The first support column 18 is coupled to a first base cover 34, the second support column 20 is coupled to a second base cover 36, the third support column 22 is coupled to a third base cover 38, and the fourth support column 24 is coupled to a fourth base cover 39.

The top of each illustrated support column of FIGS. 1 and 2 is coupled to a corresponding column capital, also known as a column crown. The first support column 18 is coupled to a first column capital 40, the second support column 20 is coupled to second column capital 42, the third support column 22 is coupled to a third column capital 44, and the fourth support column 24 is coupled to a fourth column capital 46.

Each column capital is coupled to a pair of beams using a hook, tab, and slot arrangement that will be described. Illustrated in FIGS. 1 and 2 are a first beam 48, a second beam 50, a third beam 52, and a fourth beam 54. The first column capital 40 is coupled to the first beam 48 and the fourth beam 54. The second column capital 42 is coupled to the first beam 48 and the second beam 50. The third column capital 44 is coupled to the second beam 50 and the third beam 52. The fourth column capital 46 is coupled to the third beam 52 and the fourth beam 54.

The solar PV structure 10 can be configured so that the solar PV roof deck 12 is positioned horizontally. In the northern hemisphere, the solar PV roof deck 12 can optionally be sloped at a downward angle toward the south to help optimize solar energy falling on the solar PV roof deck 12 surface. Likewise, in the southern hemisphere, the solar PV roof deck 12 can be sloped at a downward angle toward the north. The solar PV structure 10 is illustrated in FIGS. 1 and 2 as downward sloping. The solar PV structure 10 is not limited to a sloped arrangement of the solar PV roof deck 12 and can accommodate either sloped or horizontal arrangements.

In the illustrated embodiment of FIGS. 1 and 2, the first support column 18 and the fourth support column 24 are approximately equal in length to each other and form a first pair of support columns. The second support column 20 and the third support column are approximately equal in length to each other and form a second pair of support columns. In one aspect, the first pair of support columns and the second pair of support columns can be unequal in length and the solar PV roof deck 12 slopes toward the pair of support columns shorter in height. For example, if the first support column 18 and fourth support column 24 where shorter in height than the second support column 20 and the third support column 22, then the solar PV roof deck 12 would slope toward the first support column 18 and the fourth support column 24.

Alternatively, the first support column 18, the second support column 20, the third support column 22, and the fourth support column 24 can be of equal heights. In this aspect, the slope can be determined setting the concrete footers of each pair of support columns at unequal depths, but with equal depths within each pair. In this aspect, the solar PV roof deck 12 would slope toward the pair of support columns with more deeply buried footers. For example, if the first support column 18 and fourth support column 24 where coupled to associated footers buried more deeply than footers coupled to the second support column 20 and the third support column 22, then the solar PV roof deck 12 would slope toward the first support column 18 and the fourth support column 24.

As illustrated in FIGS. 1 and 2, the column capitals are adapted to receive end support brackets. Referring to FIGS. 1 and 2, the first column capital 40 is coupled to a first end support bracket 56, the second column capital 42 is coupled to a second end support bracket 58, and the fourth column capital 46 is coupled to a fourth end support bracket 62. Referring to FIG. 2, the third column capital 44 is coupled to a third end support bracket.

Figure 3:
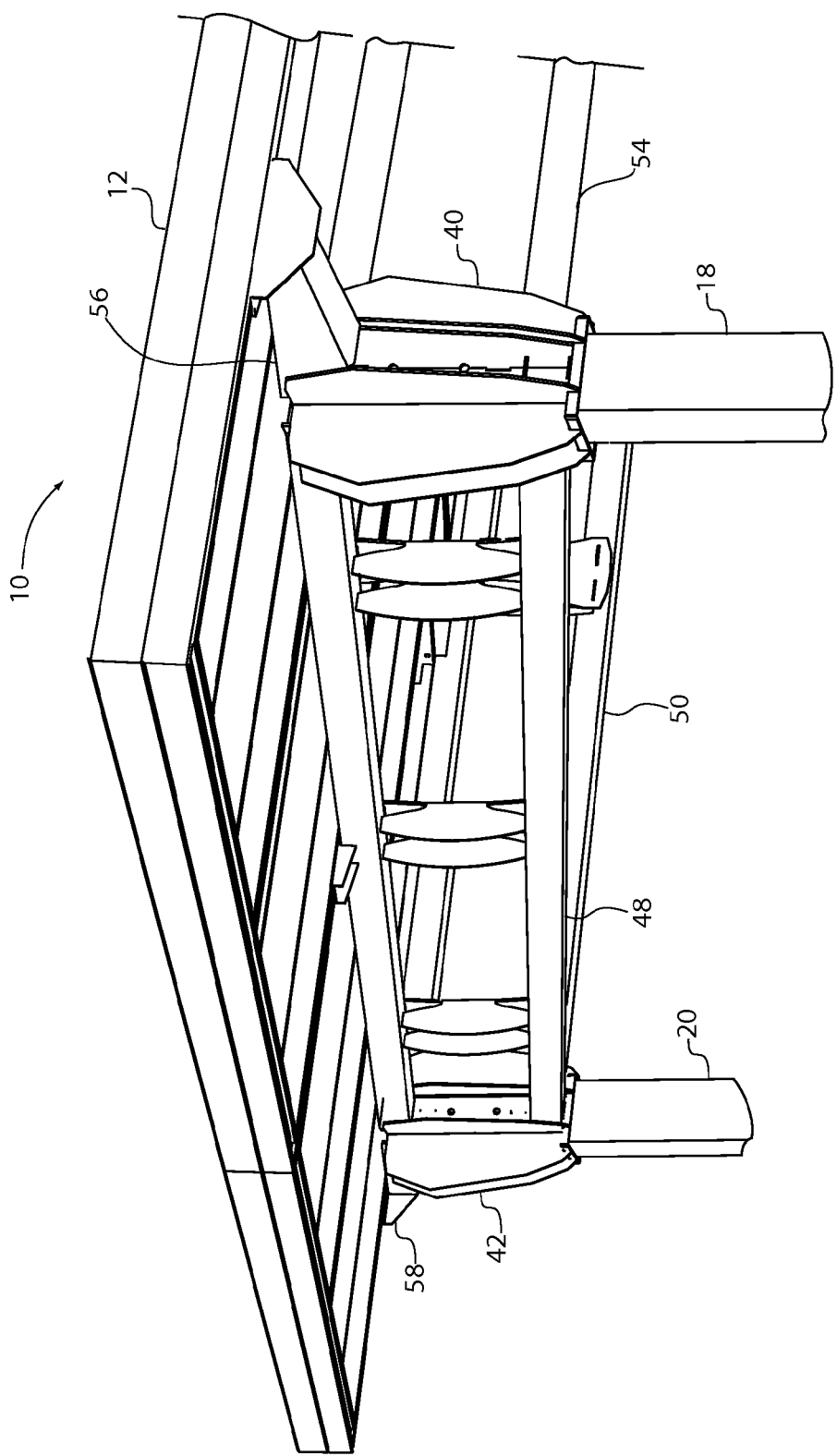
FIG. 3 illustrates a detailed view of a portion of the column capital, beam and column assembly as in FIG. 1.

FIG. 3 illustrates a detailed view of a portion of the solar PV structure 10 that includes the first column capital 40, the second column capital 42, the first end support bracket 56, the second end support bracket 58, the first beam 48, a portion of the second beam 50, a portion of the fourth beam 54, a portion of the first support column 18, and a portion of the second support column 20. As illustrated, the first end support bracket 56 is associated with the first column capital 40. One end of the first beam 48 is associated with the first column capital 40 and the opposing end of the first beam 48 is associated with the second column capital 42. One end of the fourth beam 54 is associated with the first column capital 40. One end of the second beam 50 is associated with the second column capital 42.

Figure 4:
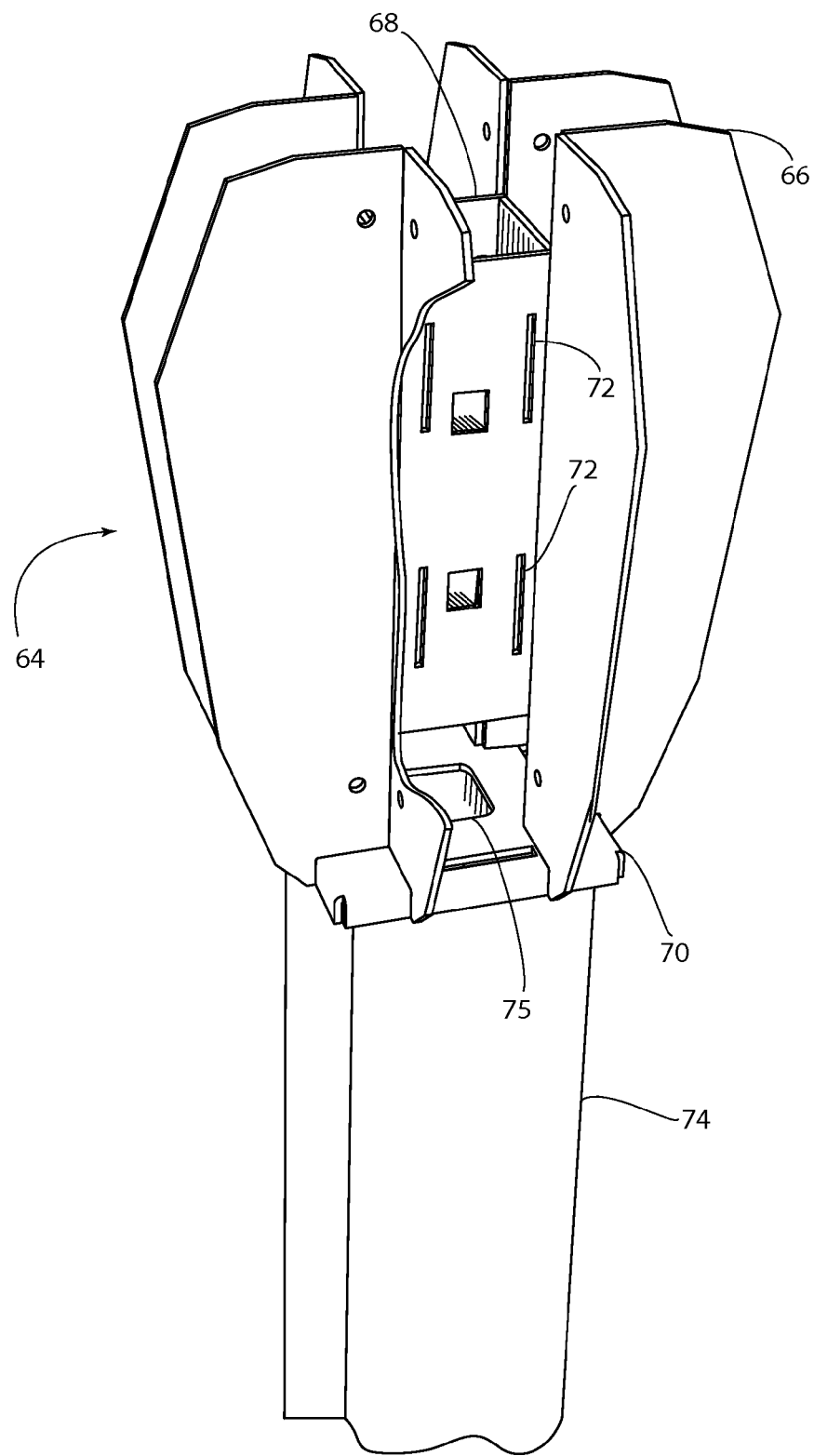
FIG. 4 illustrates a detailed perspective and partial cutaway view of the column capital as in FIG. 1.

The column capitals of FIGS. 1, 2, and 3 includes guide portions for engaging either beams or end support brackets at approximately 90-degree angles. FIG. 4 illustrates a detailed view of a column capital 64, this being representative of the column capitals of FIGS. 1, 2, and 3. Referring to FIG. 4, the column capital includes guide portions 66. The guide portion has two portions, each portion forming a planar surface that form an approximately a 90-degree angle with respect to the other portion. The guide portion can be formed by bending, pressing or stamping steel, aluminum or other metal into a right angle shape. Alternatively, the guide portion can be cast or extruded and cut. In the illustrated embodiment, there are four guide portions.

The column capital includes a central portion 68 and a base 70. In the illustrated embodiment, the central portion 68 is a hollow rectangular metal tube. The rectangular metal tube can be formed from rolled steel, or can be made of aluminum. The guide portions are positioned with respect to each other in order to form four channels. In the illustrated embodiment, the inside vertex of each guide portion is attached a corner of the central portion by welding. Alternatively, the guide portions can be joined to the central portion by a fastener such as a threaded fastener or a rivet. In an alternative embodiment, the column capital can be partially extruded with the central portion 68 and guide portions formed together as a single piece with the central portion 68 extending to the top and bottom of the top and bottom of the guide portions.

The central portion includes a plurality of slotted apertures 72 on each face of the central portion 68. The slotted apertures 72 are sized to receive and couple with a hook and tab arrangement from a beam end or an end support bracket. Illustrated are four slotted apertures 72, arranged new the edges of the central portion 68 face.

The column capital includes a base 70. In the illustrated embodiment, the base 70 is attached to the guide portions 66 by welding or alternatively by threaded fasteners or rivets. Illustrated is a support column 74, the support column 74 being representative of the columns illustrated in FIGS. 1, 2, and 3. The base 70 can coupled to the support column 74 by welding. The base portion can include an aperture 75 for routing electrical wires into the support column 74

Figure 5:
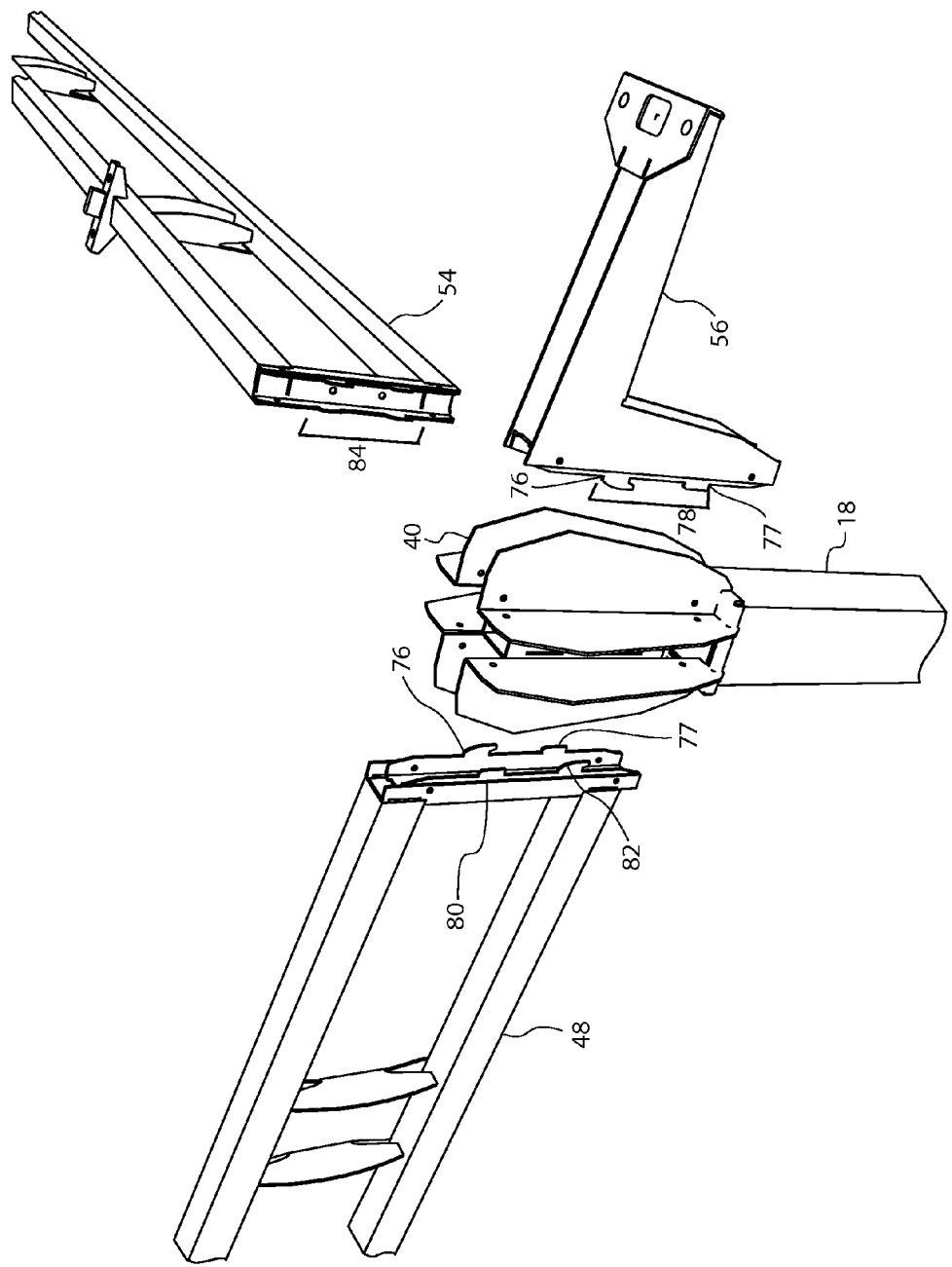
FIG. 5 illustrates a partial exploded perspective view of a portion of a solar PV structure including a portion of two beams, a portion of a support column, a column capital, and an end support bracket.

FIG. 5 illustrates an exploded perspective view of a portion of the solar PV structure 10 of FIG. 1. FIG. 5 illustrates the first column capital 40, the first end support bracket 56, as well as portions of the first beam 48, fourth beam 54, and first support column 18, illustrated with associated coupling relationships. The first beam 48, fourth beam 54, and the first end support bracket 56 include an upper hook 76 and lower tab 77 forming a first hook/tab pair 78, an upper tab 80 and lower hook 82 forming a second hook/tab pair 84.

Figure 6:
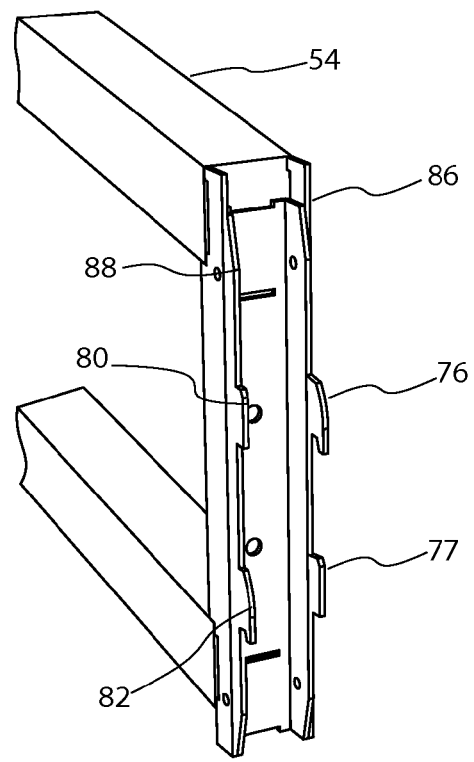
FIG. 6 shows a perspective view of an end portion of a beam of FIG. 1.
Figure 7:
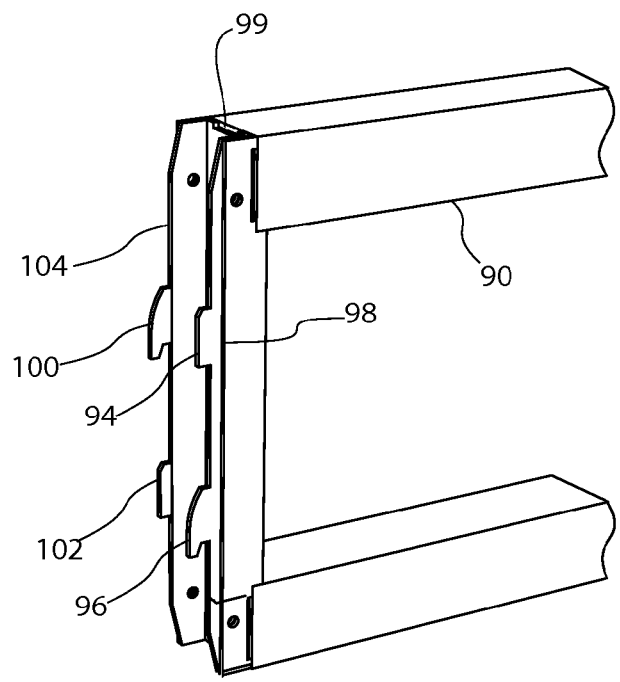
FIG. 7 shows a perspective view of an alternate end portion of a beam of FIG. 1.

FIGS. 6 and 7 illustrate alternative beam end portions in perspective view. Referring to FIG. 6, in the illustrated view of the fourth beam 54, the upper hook 76 and lower tab 77 of the end portion are disposed near the right-hand edge 86 of the fourth beam 54 face. The upper tab 80 and lower hook 82 of the end portion are disposed near the left-hand edge 88 of the fourth beam 54 face. The fourth beam 54 is representative of the hook and tab arrangement of the beams of FIGS. 1, 2, 3, and 5. However, the hook and tab arrangement is not limited to the above described arrangement.

FIG. 7 illustrates an alternative hook and tab arrangement. In the illustrated view, a beam 90 includes an upper tab 94 and a lower hook 96 disposed near the right-hand edge 98 of the beam face 99. An upper hook 100 and lower tab 102 are disposed near the left-hand edge 104 of the beam face 99. This is a complementary arrangement to the hook and tab arrangement of FIG. 6. In both FIG. 6 and FIG. 7, hooks and tabs are arranged so that tabs are 90-degrees adjacent to hooks so that they do not interfere.

Figure 8:
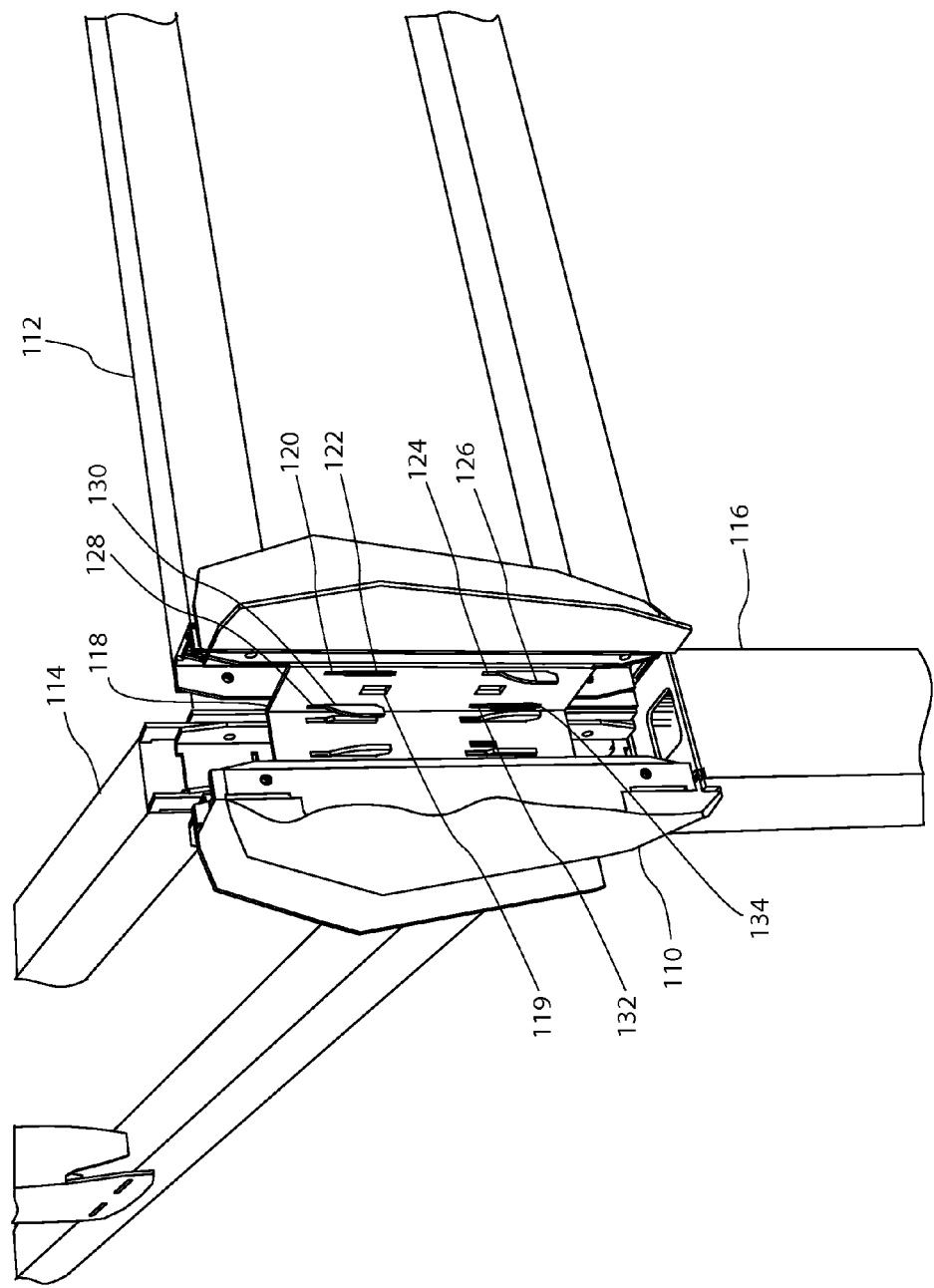
FIG. 8 illustrates a portion of an embodiment of a solar PV structure of FIG. 1 with the column capital in a partial cutaway perspective view.

FIG. 8 illustrates a column capital 110, and portions of a first beam 112, a second beam 114, and a support column 116. The column capital 110 is similarly constructed as the column capitals illustrated in FIGS. 1, 2, 3, and 4. The first beam 112 and the second beam 114 have a similar hook and tab arrangement as illustrated in the beam 90 of FIG. 7. The column capital 110 is shown in partial cutaway view illustrating two of the interior faces of a central portion 118. The central portion 118 includes one or more apertures 119 that can be used to route electrical wiring. The central portion 118 also includes a plurality of slotted apertures through each face. The slotted apertures are sized and positioned to receive tabs and hooks from beams or from end support brackets. For example, in the illustrated embodiment, a first slotted aperture 120 receives an upper tab 122 from the first beam 112. A second slotted aperture 124 receives a lower hook 126. A third slotted aperture 128 receives an upper hook 130. A fourth slotted aperture 132 receives a lower tab 134. The first slotted aperture 120, the second slotted aperture 124, the third slotted aperture 128, and the fourth slotted aperture 132 are sized and positioned so that once the tabs and hooks are received, the lower hook 126 and the upper hook 130 lock into place by sliding down the second slotted aperture 124, and the third slotted aperture 128 respectively and engage the portion of central portion below the respective slots.

While several hook and tab arrangements have been described, the slot arrangement of FIG. 8, as illustrated can be configured to accommodate both disclosed hook and tab arrangements.

Figure 9:
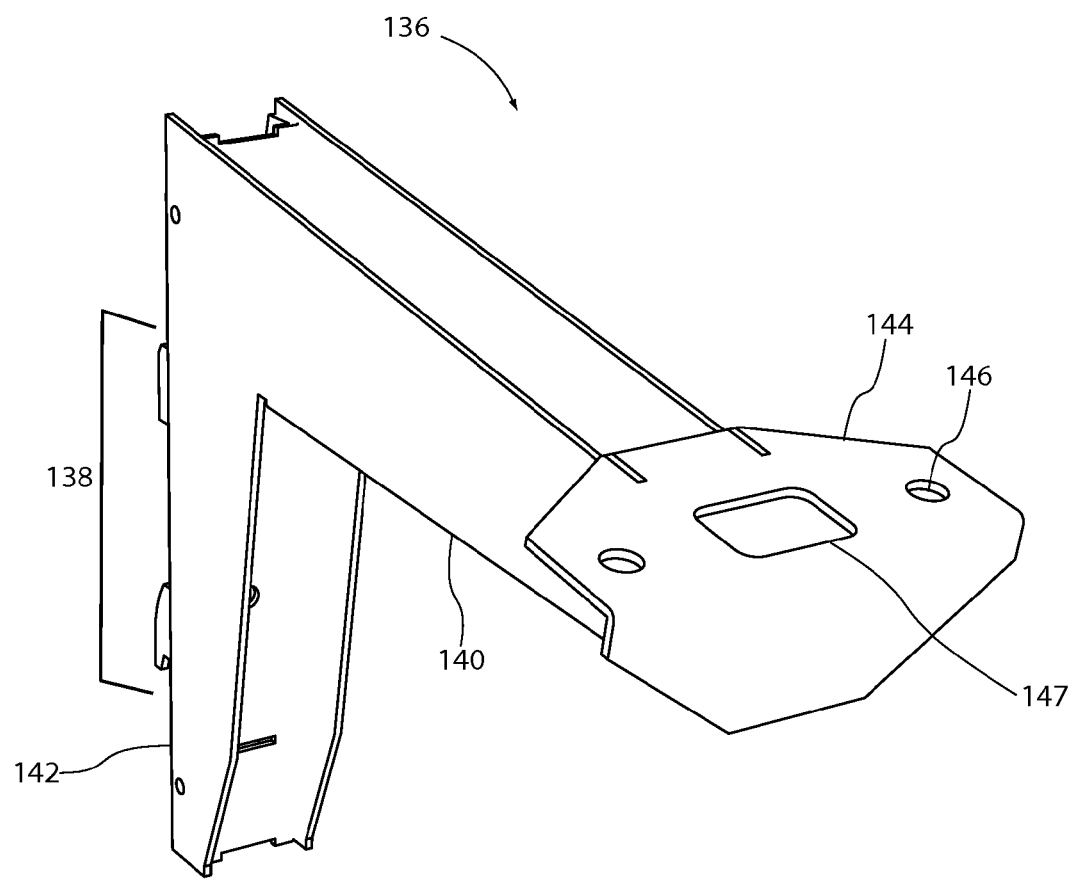
FIG. 9 shows a perspective view of an end support bracket in accordance with FIG. 5.

FIG. 9 illustrates an end support bracket 136. The end support bracket is similarly constructed as the end support brackets illustrated in FIGS. 1, 2, 3, and 5. In FIG. 9, the end support bracket includes a hook/tab arrangement 138 with the hooks and tabs positioned opposite or the complement of the first hook/tab pair 78 of the first end support bracket 56 of FIG. 5. The illustrated bracket includes an upper bracket portion 140 and a lower bracket portion 142. The upper bracket portion includes a bracket end portion 144. The bracket end portion 144 can include one or more round apertures 146. The bracket end portion 144 can be shaped, as illustrated, with a downward projecting portion to engage a frame of a solar PV roof deck structure, such as the solar PV roof deck 12 of FIG. 1. The apertures can be disposed to receive threaded fasteners in order to secure the solar PV roof deck structure to the bracket end portion 144. In addition, the bracket end portion 144 can include an aperture 147 for receiving and routing electrical wiring.

The end support brackets can be installed to accommodate sloping solar PV structure, such as the solar PV structure 10 of FIG. 1 or non-sloping horizontal structures. In order to accommodate sloping structures, upward sloping and downward sloping brackets can be installed on opposing column capitals.

For example, in FIG. 1, the first end support bracket 56 is downward sloping and the second end support bracket 58 is upward sloping. Both the first end support bracket 56 and the second end support bracket 58 engage and secure the solar PV roof deck 12. At the same time, the solar PV roof deck structure slopes approximately parallel to the slope of first beam 48.

Figure 10:
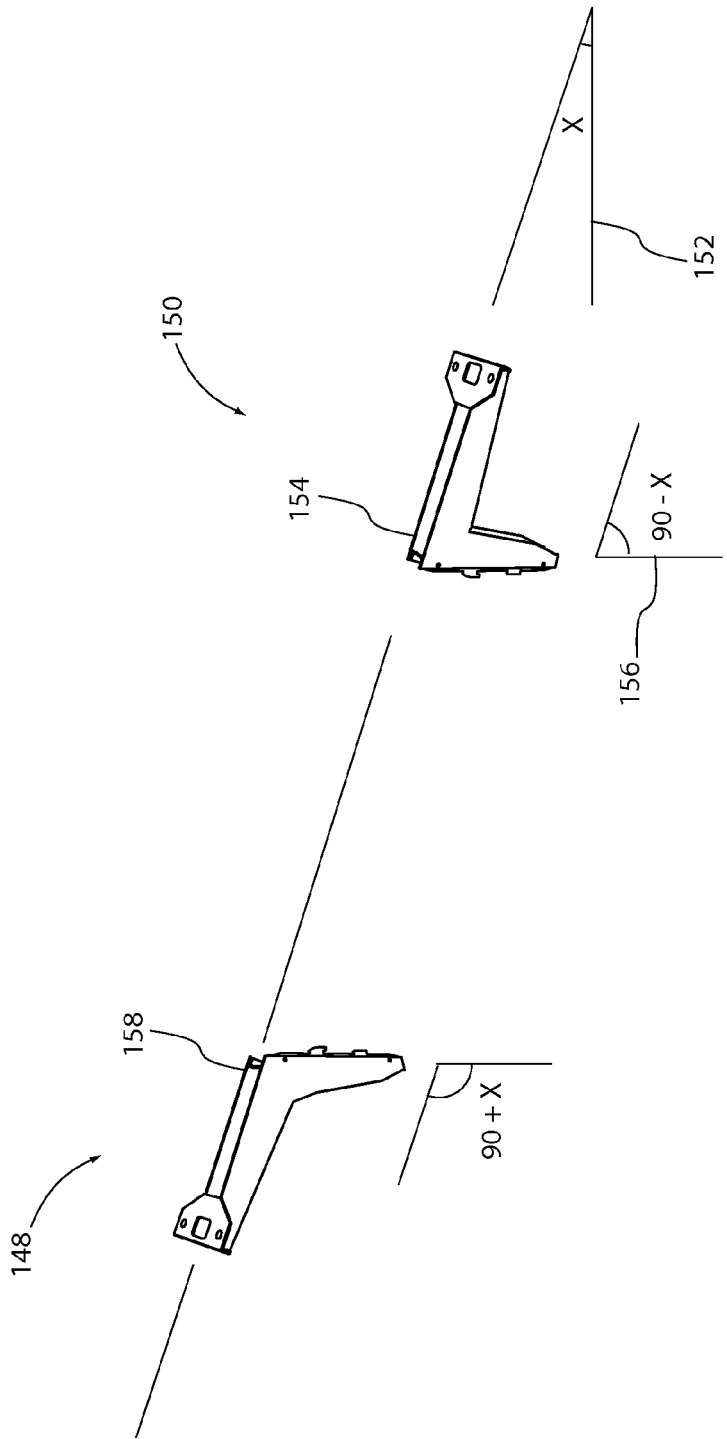
FIG. 10 illustrates complementary upward sloping and downward sloping end support brackets.

FIG. 10 illustrates an upward sloping end support bracket 148 and a downward sloping end support bracket 150. In the embodiment of FIG. 10, for a solar PV roof deck structure sloped at an angle of X degrees compared to the horizontal plane 152, the upper portion 154 of the downward sloping end support bracket 150 is sloped at an angle of 90−X degrees compared to the vertical plane 156. The upper portion 158 of the upward sloping end support bracket 148 is sloped at an angle of 90+X degrees compared to the vertical plane 156. The upper portion 158 of the upward sloping end support bracket 148 and the upper portion 154 of the downward sloping end support bracket 150 slope at complementary angles.

For example, for a solar PV deck structure sloped at a 10 degrees to the horizontal plane 152, the upper portion 158 the upward sloping end support bracket 148 would be sloped at 100 degrees compared with the vertical plane 156. The upper portion 154 of the downward sloping end support bracket 150 would be sloped at 80 degrees compared with the vertical plane. In an alternative example, a solar PV deck structure that is not sloped, that is, at 0 degrees to the horizon, both the upward sloping bracket and downward sloping bracket would be the same with their upper portions sloped at 90 degrees to the horizon. The examples in this paragraph are meant to be illustrative and should not be interpreted as limiting.

Figure 11:
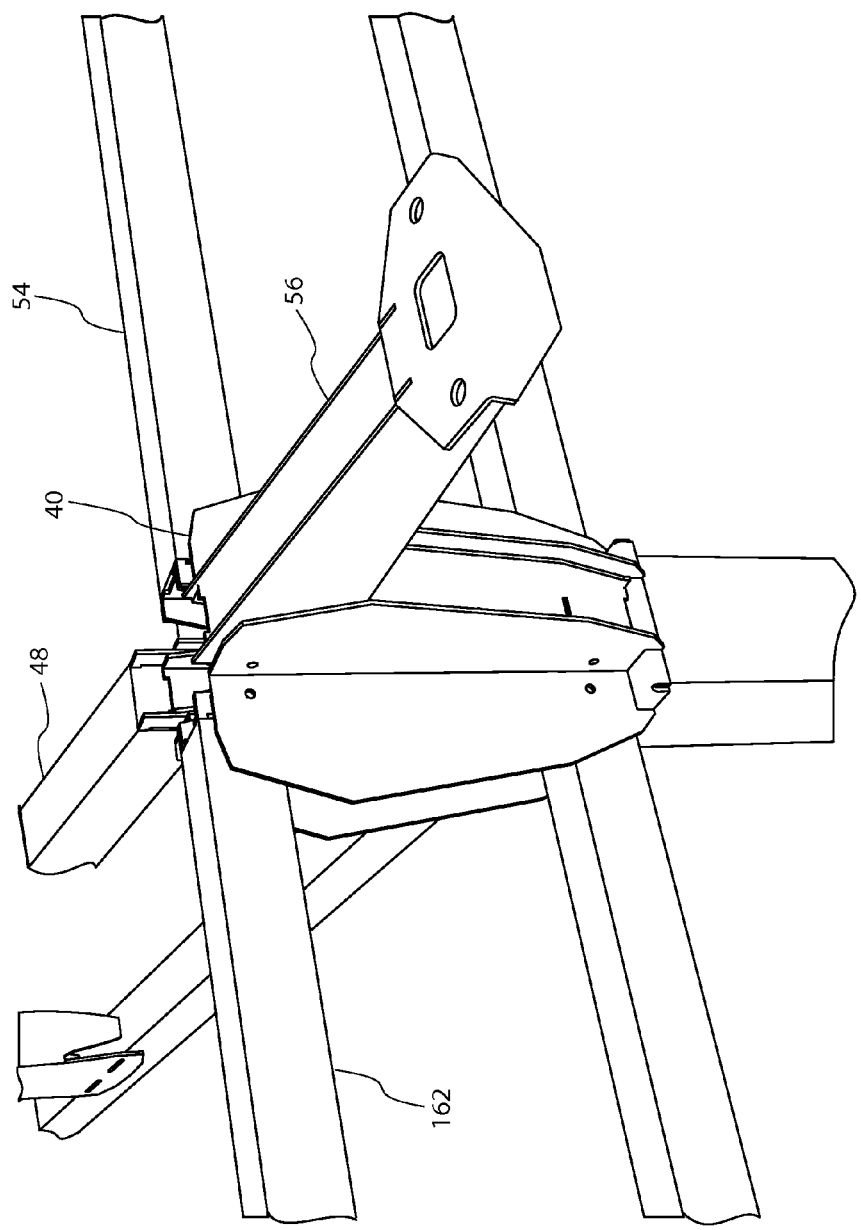
FIG. 11 illustrates a portion of an embodiment of a solar PV structure in perspective view showing portion of three beams and an end support bracket coupled to a column capital.
Figure 12:
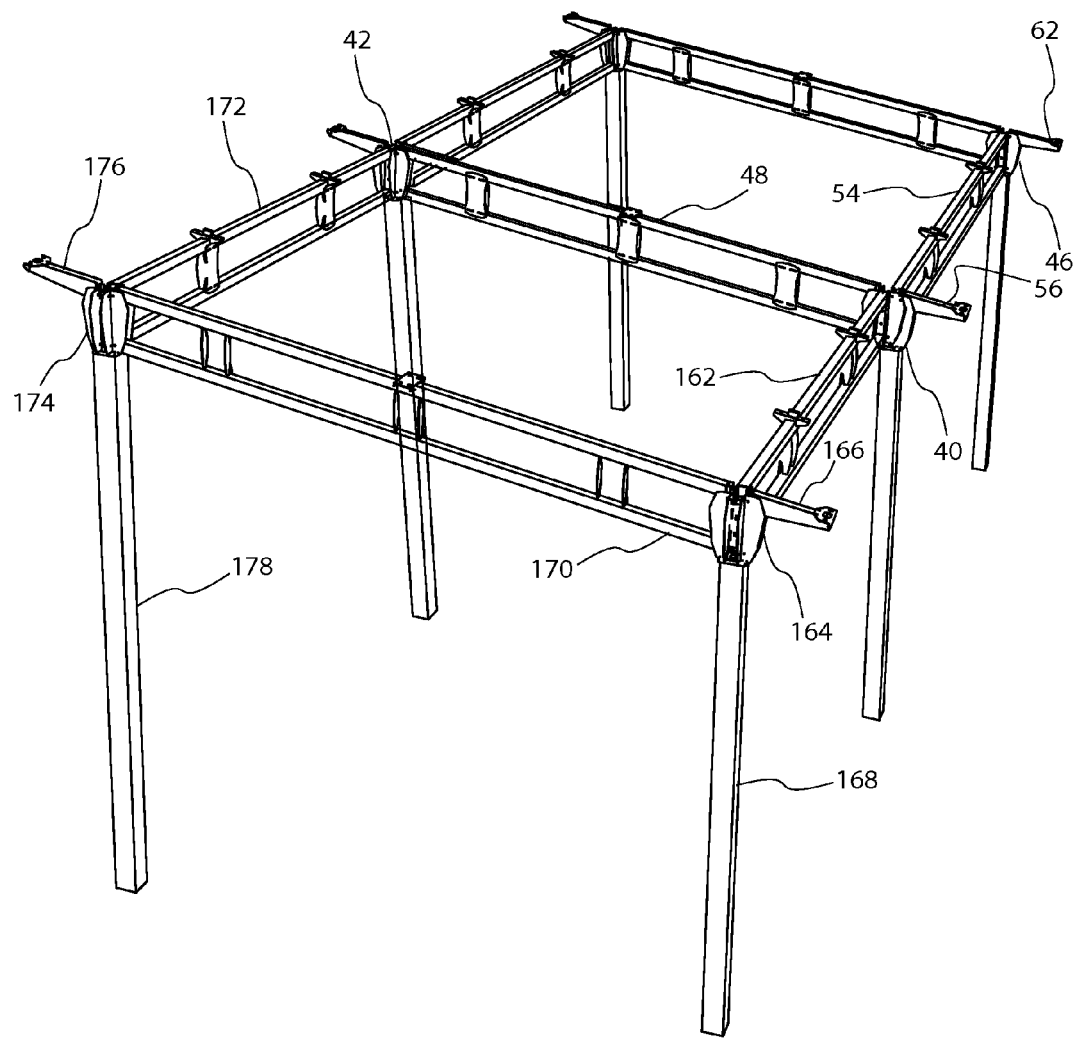
FIG. 12 illustrates a frame assembly of the solar PV structure of FIG. 1 modularly expanded with additional columns and beams.

As discussed earlier in this disclosure, the solar PV structure 10 is not limited to four columns and a single roof deck. The design of the disclosed column capitals allows for modular expansion of the structure. FIGS. 11 and 12 illustrate a frame of the solar PV structure 10 of FIG. 1 expanded with two additional beam and columns to accommodate an additional solar PV roof deck structure. The illustrated structure has approximately double the horizontal surface area as the solar PV structure 10 of FIG. 1. Referring to FIGS. 11 and 12, the first column capital 40 is coupled to a fifth beam 162 in addition to being coupled to the first beam 48, the fourth beam 54 and the first end support bracket 56.

Referring to FIG. 12, the fifth beam 162 is coupled to a fifth column capital 164. The fifth column capital 164 is also coupled to a fifth end support bracket 166, a fifth column 168, and a sixth beam 170. The second column capital 42 is coupled to a seventh beam 172. The seventh beam 172 is coupled to a sixth column capital 174. The sixth column capital 174 is coupled to a sixth end support bracket 176 and a sixth column 178.

The solar PV structure 10 can be expanded in the same linear direction by adding additional beams, columns, and column capitals as described in the preceding paragraph. In addition, the solar PV structure 10 can be expanded orthogonally by removing the first end support bracket 56, fourth end support bracket 62, and fifth end support bracket 166 and coupling additional beams in the first column capital 40, fourth column capital 46, and fifth column capital 164 in place of the corresponding end support brackets.

Figure 13:
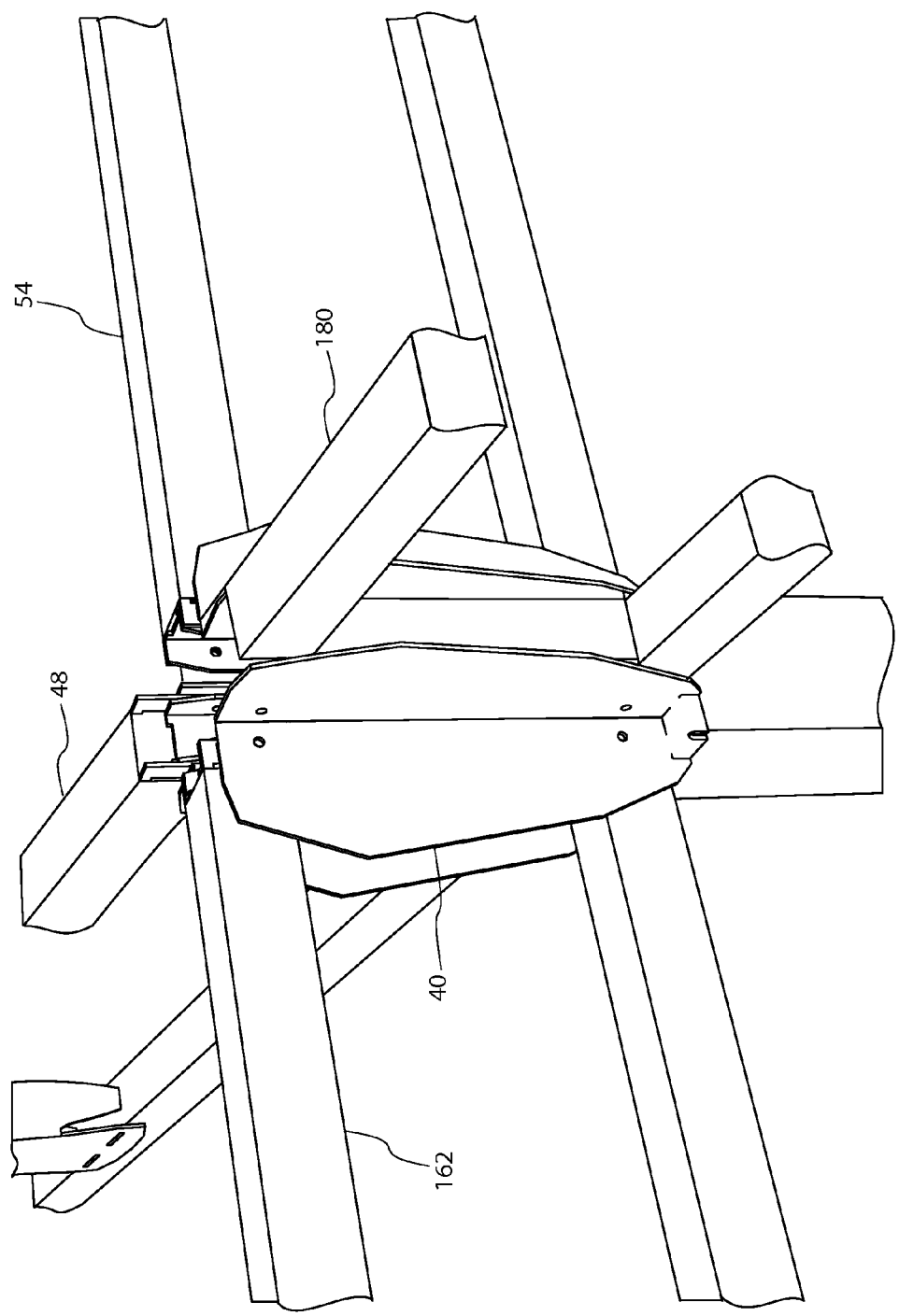
FIG. 13 illustrates a portion of an embodiment of a solar PV structure where a capital column is coupled to four beams.

Referring to FIG. 13, the first column capital 40 is coupled to an eighth beam 180 in addition to the first beam 48, the fourth beam 54, and the fifth beam 162. By adding additional column capitals, and to each column capital coupling a support column, two to four beams, or up to three beams in combination with an end support bracket, the solar PV structure can be extended to nearly an unlimited under sections.

Figure 14:
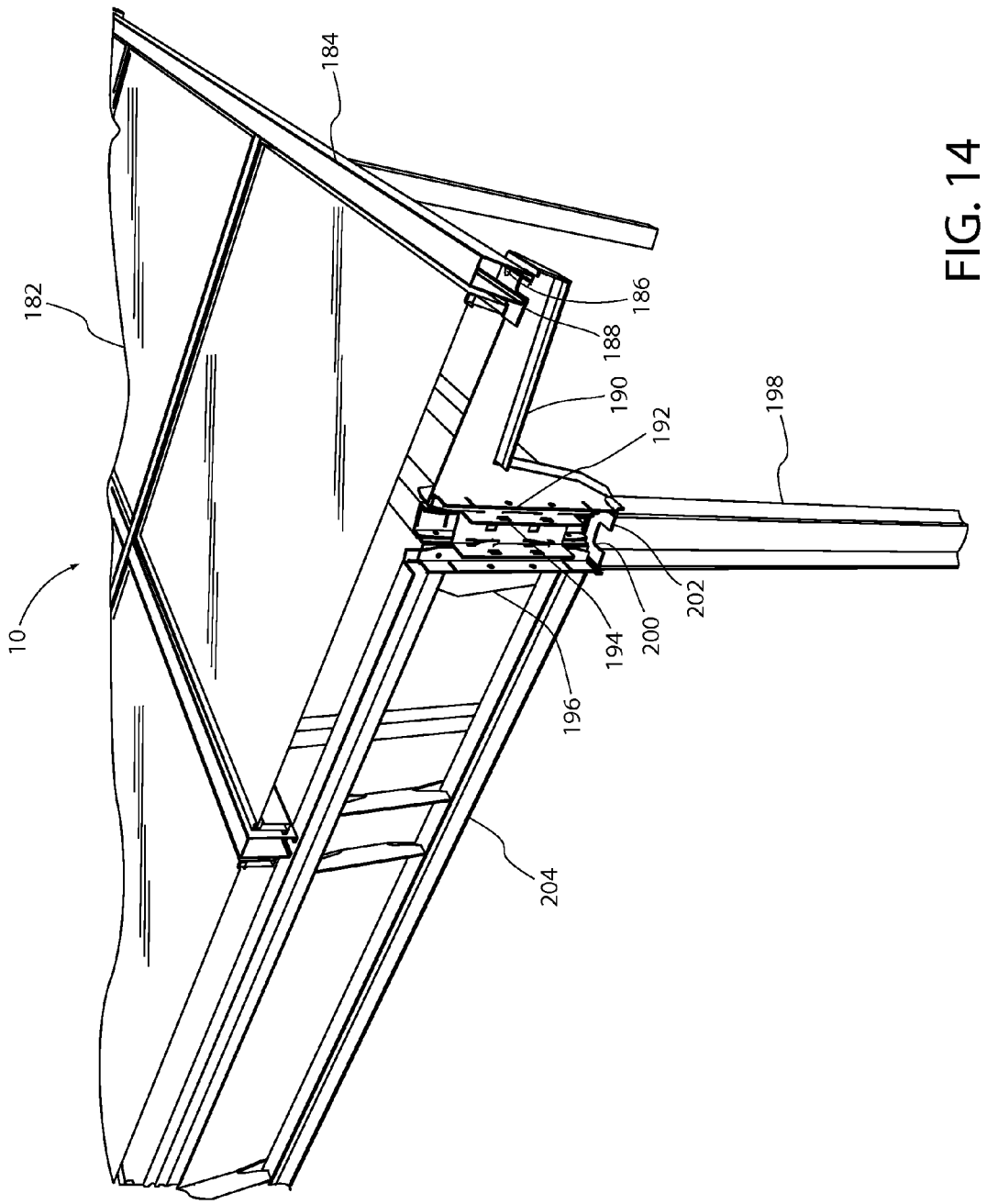
FIG. 14 illustrates a partial cutaway view of a portion of the PV solar energy structure of FIG. 1.

FIG. 14 illustrates a portion of the solar PV structure 10 in partial cutaway. One or more solar PV surfaces 182 are depicted as partially transparent revealing the detailed structure beneath them. The solar PV surfaces 182 can be transparent, partially transparent, translucent, or opaque. As depicted in FIG. 14, the solar PV roof deck can include a frame structure formed from hollow steel tubes or channels or aluminum tubes or channels. Depicted is a first hollow channel 184. The hollow channel or strut track is approximately u-shaped with an inward lip forming a base portion. The first hollow channel 184 couples to the bracket end portion 188. Wires from the solar PV surfaces 182 can be routed from an aperture 186 on a bracket end portion 188. The wires can be routed through a support bracket 190 through an aperture 192 on a central portion 194 of the column capital 196. The wires can be routed through the bottom of a column 198 through an aperture 200 in a column base 202. The column 198 is shown in cut away as hollow. In addition the beams can be hollow and configured to route wires from the solar PV surfaces 182 hidden from view. A hollow beam structure comprised of two steel tubes is depicted in the cutaway view of a beam coupled to the column capital 196.

Figure 15:
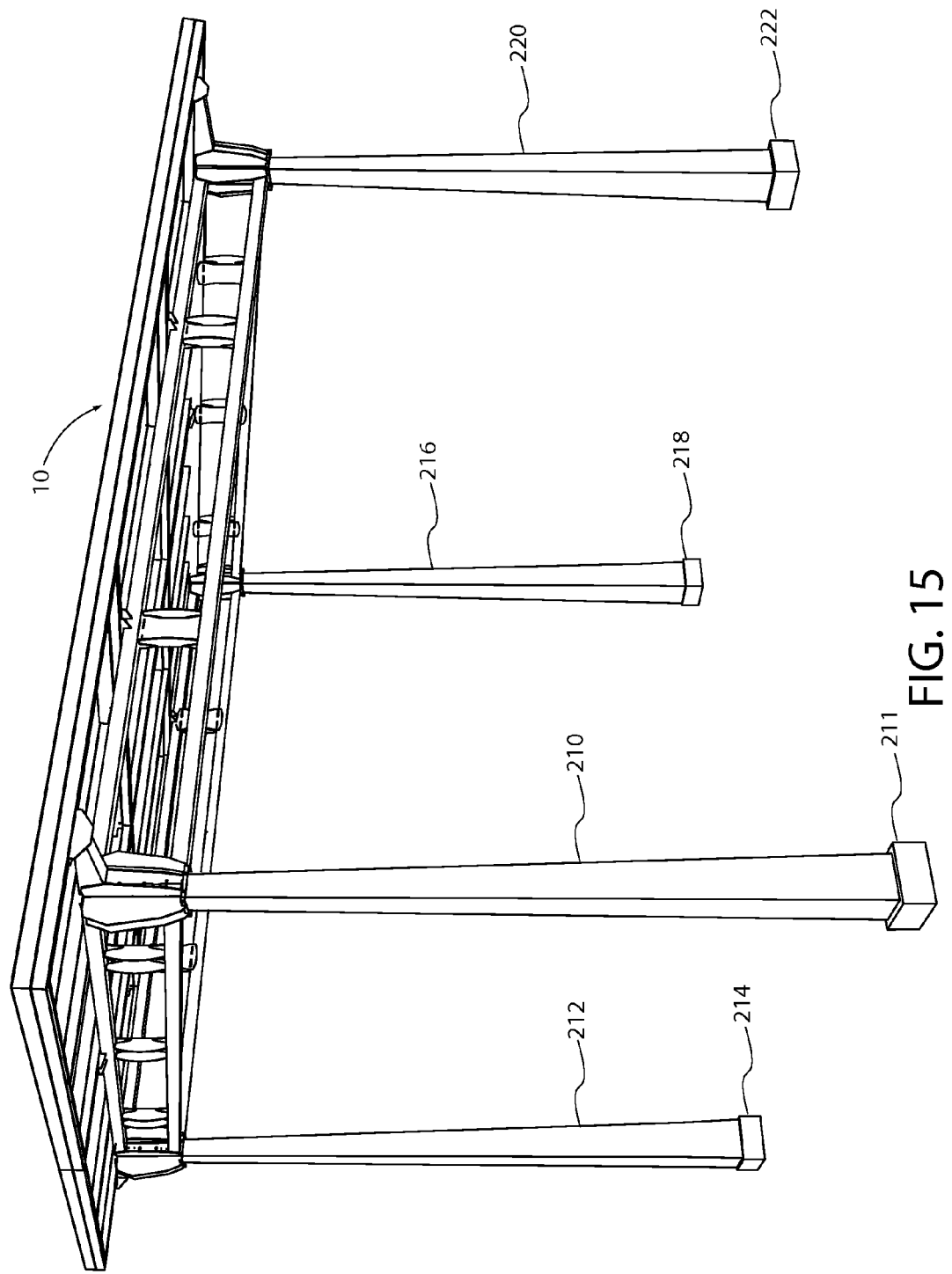
FIG. 15 illustrates an assembled solar PV structure as in FIG. 1 with tapered columns.
Figure 16:
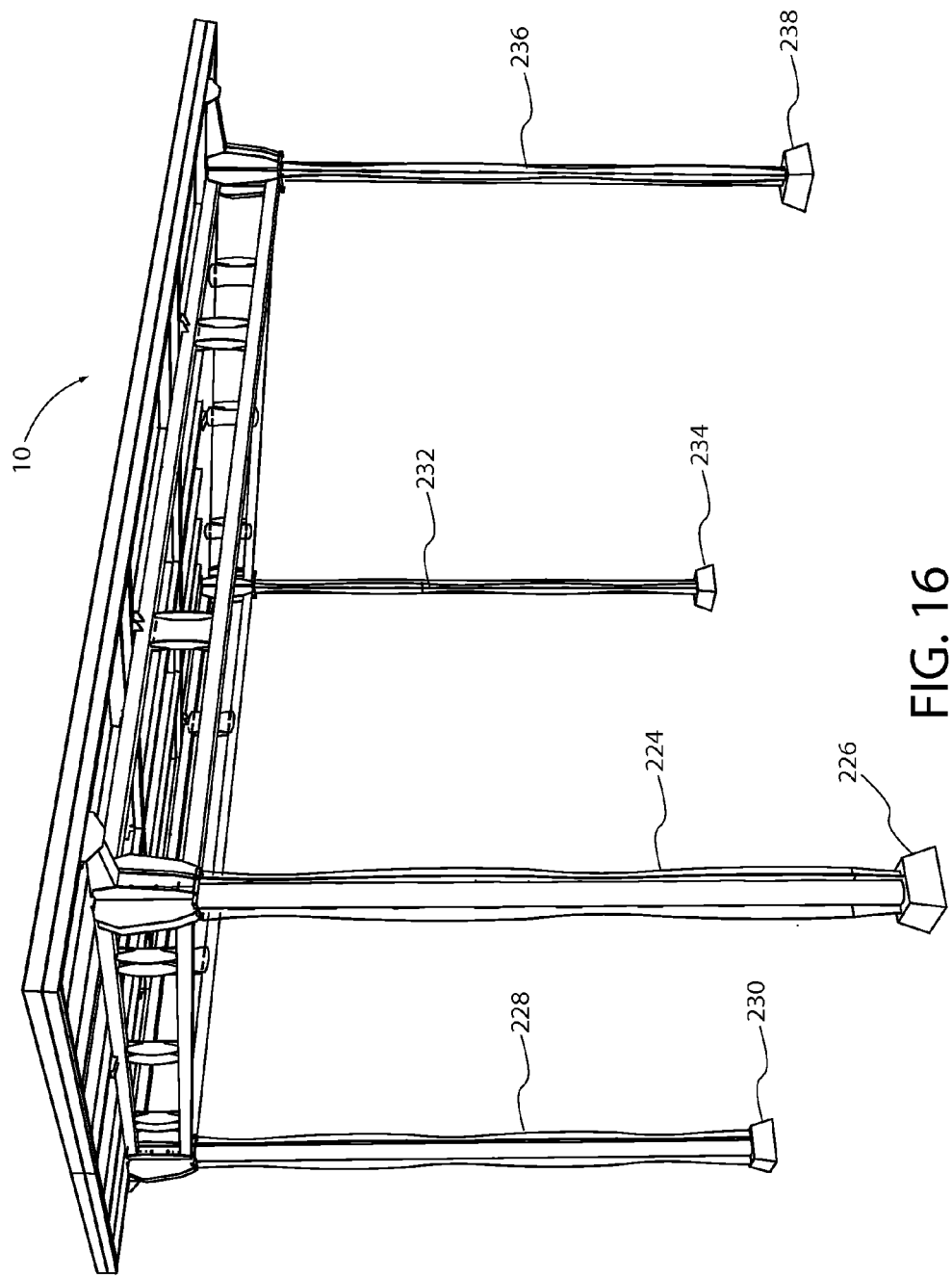
FIG. 16 illustrates an assembled solar PV structure as in FIG. 1 with alternative columns.

FIGS. 15 and 16 illustrate embodiments of the solar PV structure 10 with alternative column styles in order to suite different aesthetic requirements. Referring to FIG. 15, the solar PV structure 10 alternatively can include a first tapered support column 210 coupled to a first base cover 211, a second tapered support column 212 coupled to a second base cover 214, a third tapered support column 216 coupled to a third base cover 218, and a fourth tapered support column 220 coupled to a fourth base cover 222.

The support columns of FIGS. 1, 15, and 16 exemplify different support column styles. It is the inventor's intent not to limit support column styles to the exemplary embodiments.

The solar PV structure 10 can include other alternatively shaped support columns, for example as in FIG. 16. Referring to FIG. 16, the solar PV structure 10 can include a first alternative column 224 coupled to a first alternative base cover 226, a second alternative column 228 coupled to a second alternative base cover 230, a third alternative column 232 coupled to a third alternative base cover 234, and a fourth alternative column 236 coupled to a fourth alternative base cover 238.

Figure 17:
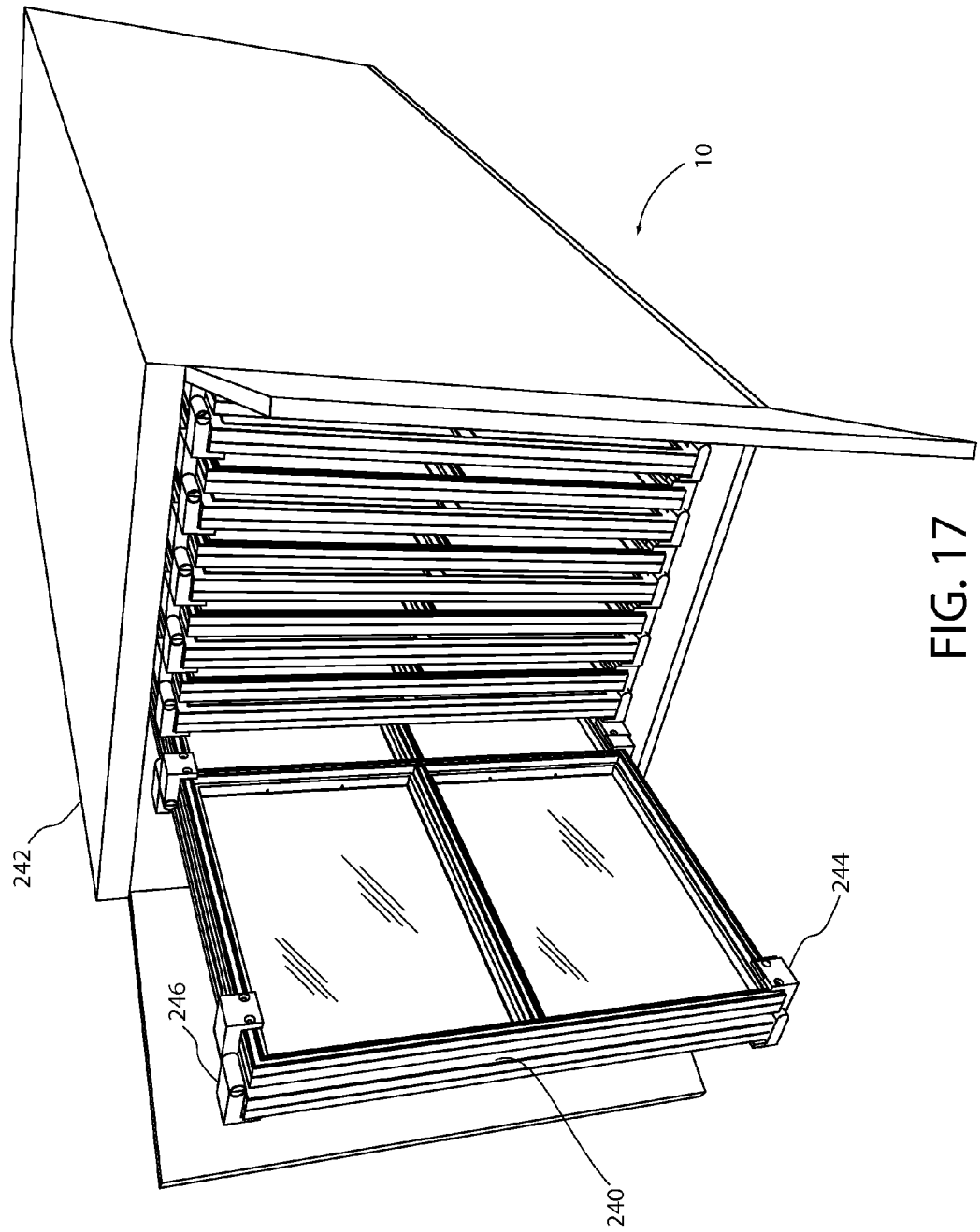
FIG. 17 illustrates a plurality of solar PV roof deck structures configured for transport in a transportation container.

FIG. 17 illustrates several solar PV roof deck structures configured for transportation in a transportation container such as an intermodal shipping container used for freight transportation in a ship, train, or attached to a tractor-trailer truck. A solar PV roof deck 240 is folded in half and stored vertically in a transportation container 242. A plurality of lower hinges 244 and a plurality of upper hinges 246 are removably attached to the solar PV roof deck 240. The lower hinges 244 and the upper hinges 246 secure the solar PV roof deck 240 in a fold and secured position. In addition, the lower hinges 244 and the upper hinges 246 are configured as protective elements for transportation.

Figure 19:
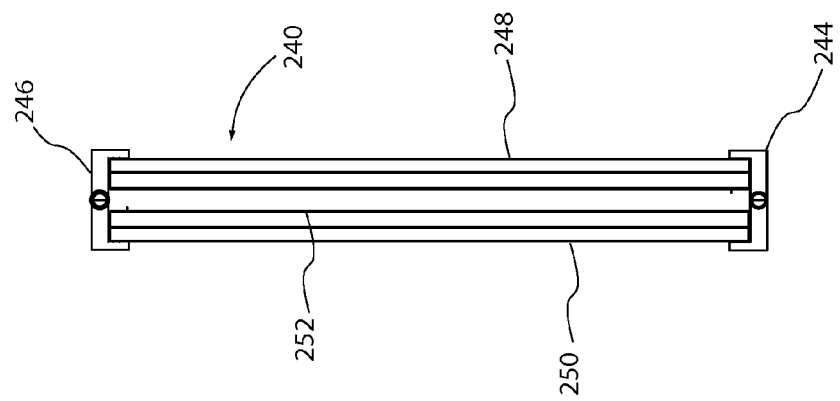
FIG. 19 illustrates a side view of the solar PV roof deck structure of FIG. 17.
Figure 18:
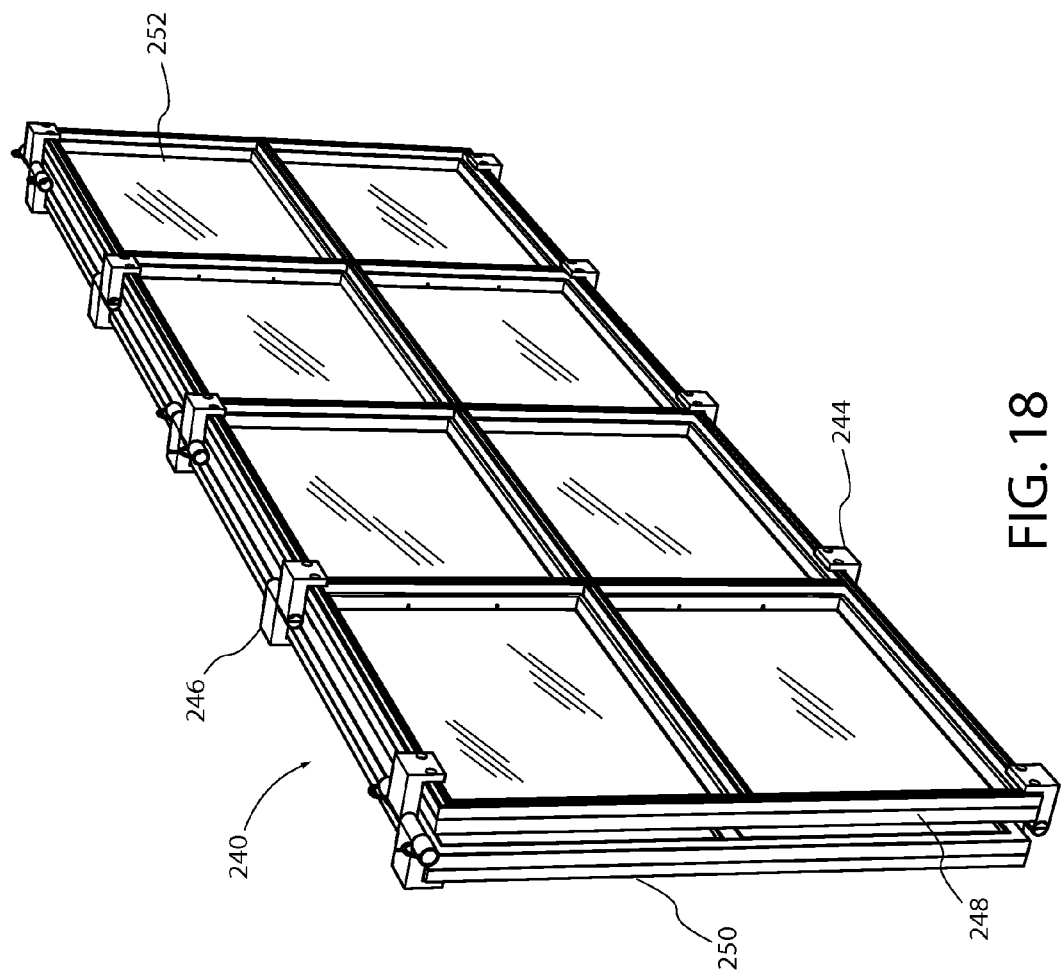
FIG. 18 illustrates a perspective view of the solar PV roof deck structure of FIG. 17.

FIG. 18 illustrates a perspective view of one of the solar PV roof deck 240 of FIG. 17. FIG. 19 illustrates a side view of the solar PV roof deck 240 of FIG. 18. Referring to FIGS. 18 and 19, the solar PV roof deck 240 illustrated includes a first panel section 248 and a second panel section 250. The two panels are secured by the plurality of lower hinges 244 and the plurality of upper hinges 246. The panels are assembled so that one or more solar PV panels or more generally, one or more solar PV surfaces 252 are on the inside of the fold. Illustrated are eight of the solar PV surfaces 252 attached to the first panel section 248. This number is exemplary; any number of panels can be used to suit structural, electrical, and aesthetic requirements.

The hinges, in combination, can form a protective shipping frame for the solar PV roof deck 240. The plurality of lower hinges 244 and plurality of upper hinges 246 are shown separating the inner portion of the first panel section 248 and second panel section 250. Since the solar PV surfaces 252 are facing inward, this helps to isolate the solar PV surfaces 252 on opposing faces. In one embodiment, the hinges can be evenly distributed along the length of the solar PV roof deck 240 or can be placed at predetermined locations. In addition, each side of the hinges can be offset and be rectangular shaped, as illustrated. This isolates the solar PV roof deck 240 when placed vertically next to other similar solar PV deck structures, for example, as illustrated in FIG. 17.

Figure 20:
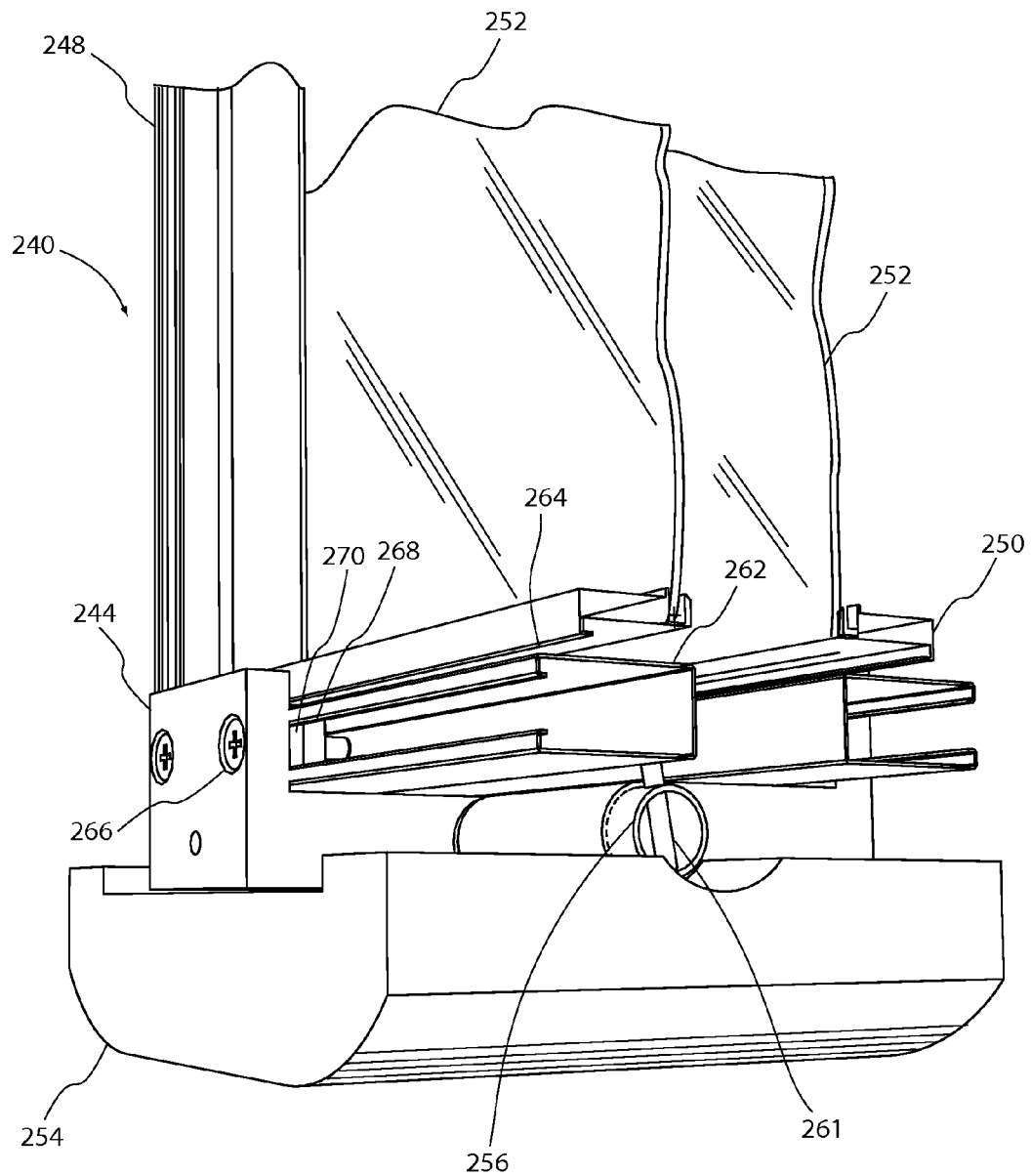
FIG. 20 illustrates a portion of the solar PV roof deck structure of FIG. 17 in perspective view showing detail of a bottom hinge set.

FIG. 20 illustrates a detailed perspective view of a lower portion of the solar PV roof deck 240 showing details of one of the lower hinges 244. The first panel section 248 and the second panel section 250 of the solar PV roof deck 240 is shown in partial cutaway view. The partial cutaway view extends from one vertical end of the frame of the solar PV deck. Illustrated is a protective hinge cover 254. The protective hinge cover 254 is optional. The protective hinge cover 254 is illustrated with a flat bottom face and curved bottom edges, however, the protective hinge cover 254 can also be rectangular shaped. The upper surface of the protective hinge cover 254 can be shaped to further protect or engage the lower hinge 244. The protective hinge cover 254 can include a u-shaped channel on its top face to partially surround the lower hinge 244. In addition, the protective hinge cover 254 can include a cutaway portion to accommodate a hinge pivot pin 256. The protective hinge cover 254 can provide additional abrasion protection and/or shock absorption between frame of the solar PV roof deck 240 and its resting surface. In addition, it can provide additional shock absorption and spacing between two or more of the solar PV roof deck 240 that are vertically transported or stored.

Figure 21:
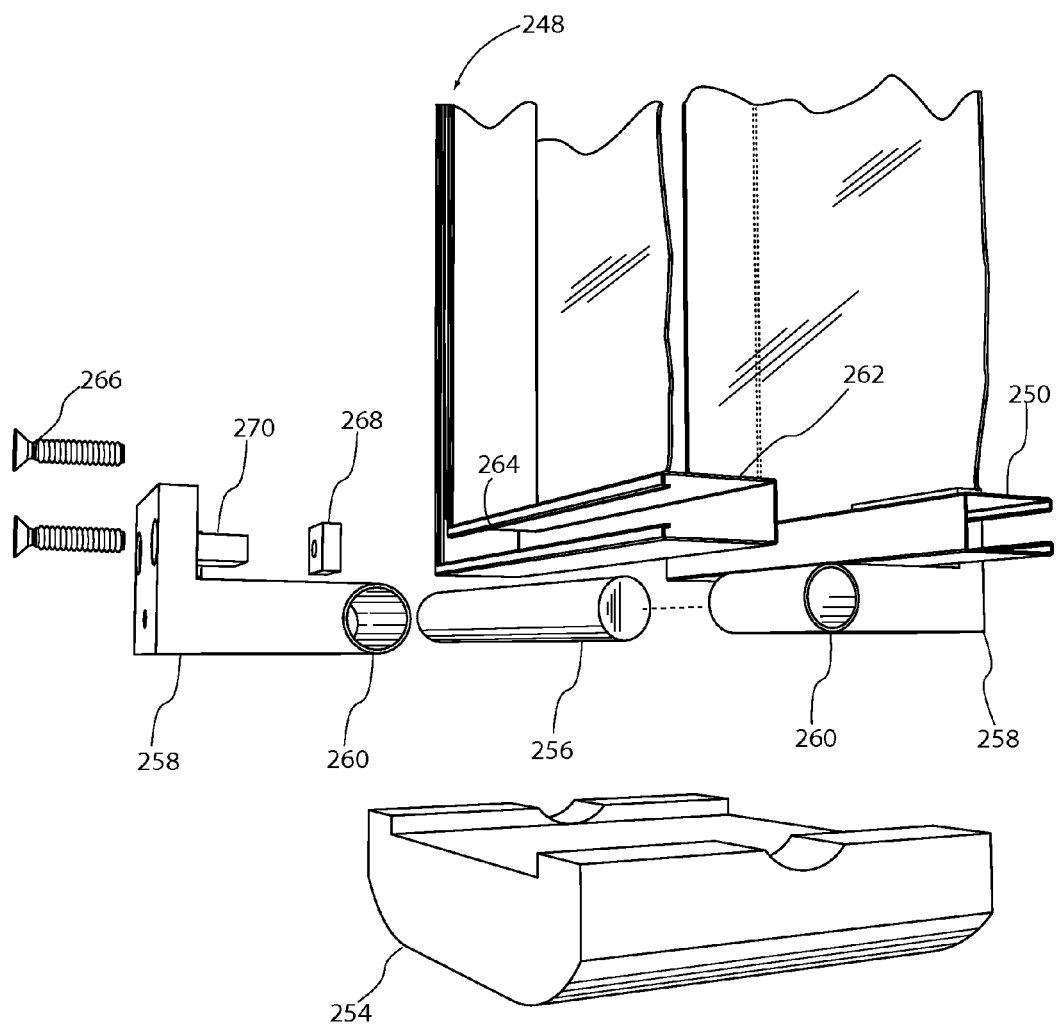
FIG. 21 illustrates an exploded perspective view of FIG. 20.

FIG. 21 shows a partial exploded view of FIG. 20 with the first panel section 248 and the second panel section 250 including the protective hinge cover 254. The protective hinge cover 254 is optional. Referring to FIG. 21 the lower hinge 244 of FIG. 20 is separable into hinge portions 258. The hinge portions 258 are joined in-line by the hinge pivot pin 256 through an aperture 260 near the inside facing edge of each hinge portion 258. The hinge pivot pin 256 extends through each aperture 260. Referring to FIG. 20, the hinge pivot pin 256 can be held into place by a holding pin 261. A plurality of holding pins 261 can extend through the diameter of each end the hinge pivot pin 256. Alternatively, one or more holding pins 261 can extend through the aperture 260 near the inside facing edge of hinge portion and into the hinge pivot pin 256.

Referring to FIGS. 20 and 21, the first panel section 248 includes a frame section 262. The frame section 262, as illustrated, is u-shaped and hollow. The closed portion of the u-shape faces inward when the panels are in the folded position or downward when the panels are in the open position and lies in approximately the same plane as the solar PV surfaces 252. The frame section 262 is shown with an inward facing lip portion 264 at the bottom of the u-shape. The hinge portion 258 is held to the frame by a threaded fastener 266. The threaded fastener 266 is seated on the top of the hinge portion 258, captured, and secured to a nut 268 that is held to frame section 262 by the inward facing lip portion 264. An alignment pin 270 helps to align the hinge portion 258 into the frame section 262 and prevent rotation.

Figure 22:
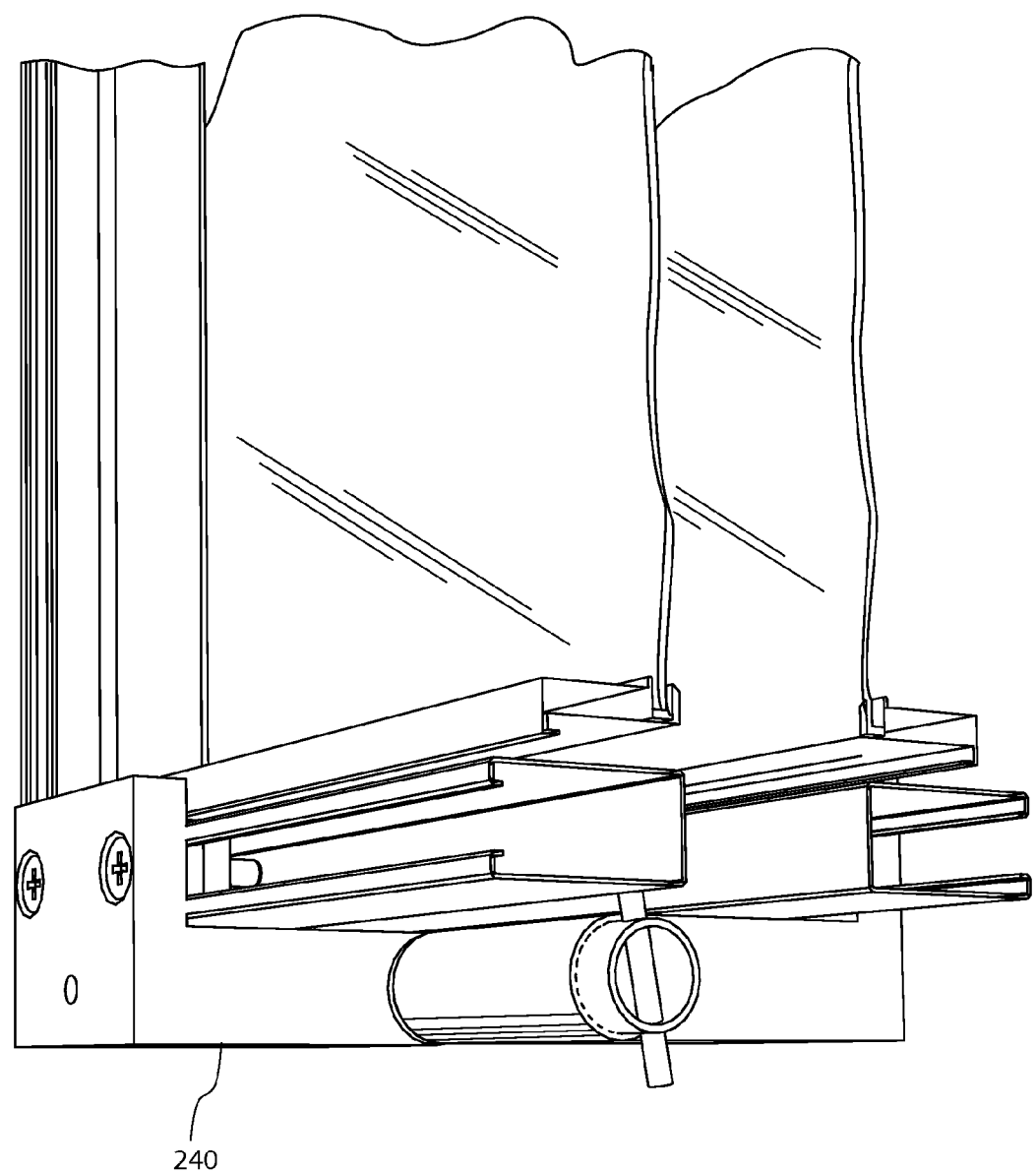
FIG. 22 illustrates a portion of the solar PV roof deck structure of FIG. 17 in perspective view showing detail of an alternative bottom hinge set.

FIG. 22 illustrates the portion of the solar PV roof deck 240 of FIG. 20 without a protective cover portion. The rectangular u-shape of the hinge itself with a approximately flat bottom and a flat sides acts as protective frame element by allowing the solar PV deck structure bottom surface flat on a horizontal surface and have vertical separations of the frame elements of different solar PV deck structures stored and shipped together, as for example, illustrated in FIG. 17.

Figure 23:
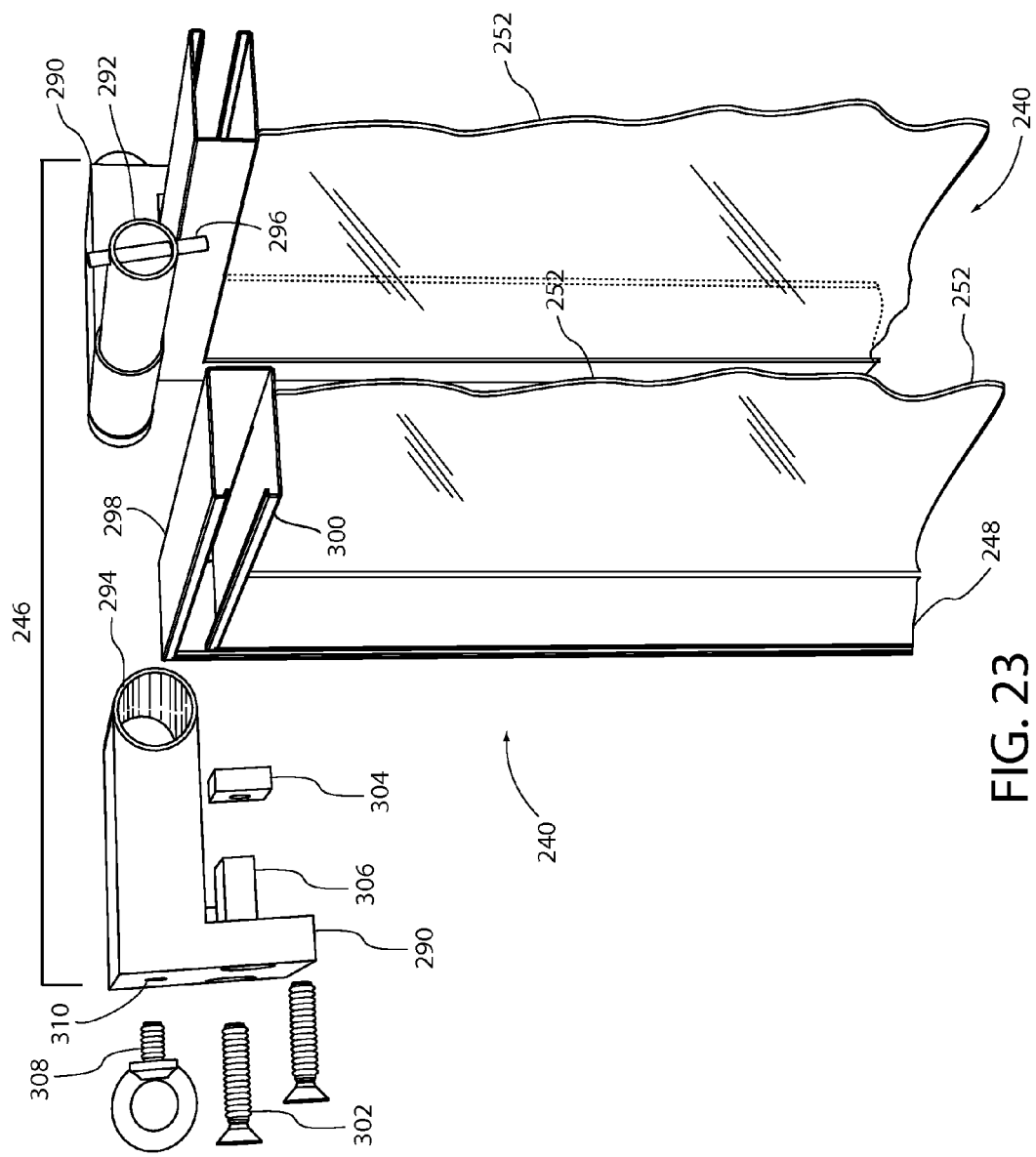
FIG. 23 illustrates a portion of the solar PV roof deck structure of FIG. 17 in exploded perspective view showing detail of a top hinge set.

FIG. 23 illustrates a detailed perspective and partially exploded view of an upper portion of the solar PV roof deck 240 showing details of one of the upper hinges 246. The first panel section 248 and the second panel section 250 of the solar PV roof deck 240 are shown in partial cutaway view. The partial cutaway view extends from one vertical end of the frame of the solar PV deck.

Figure 24:
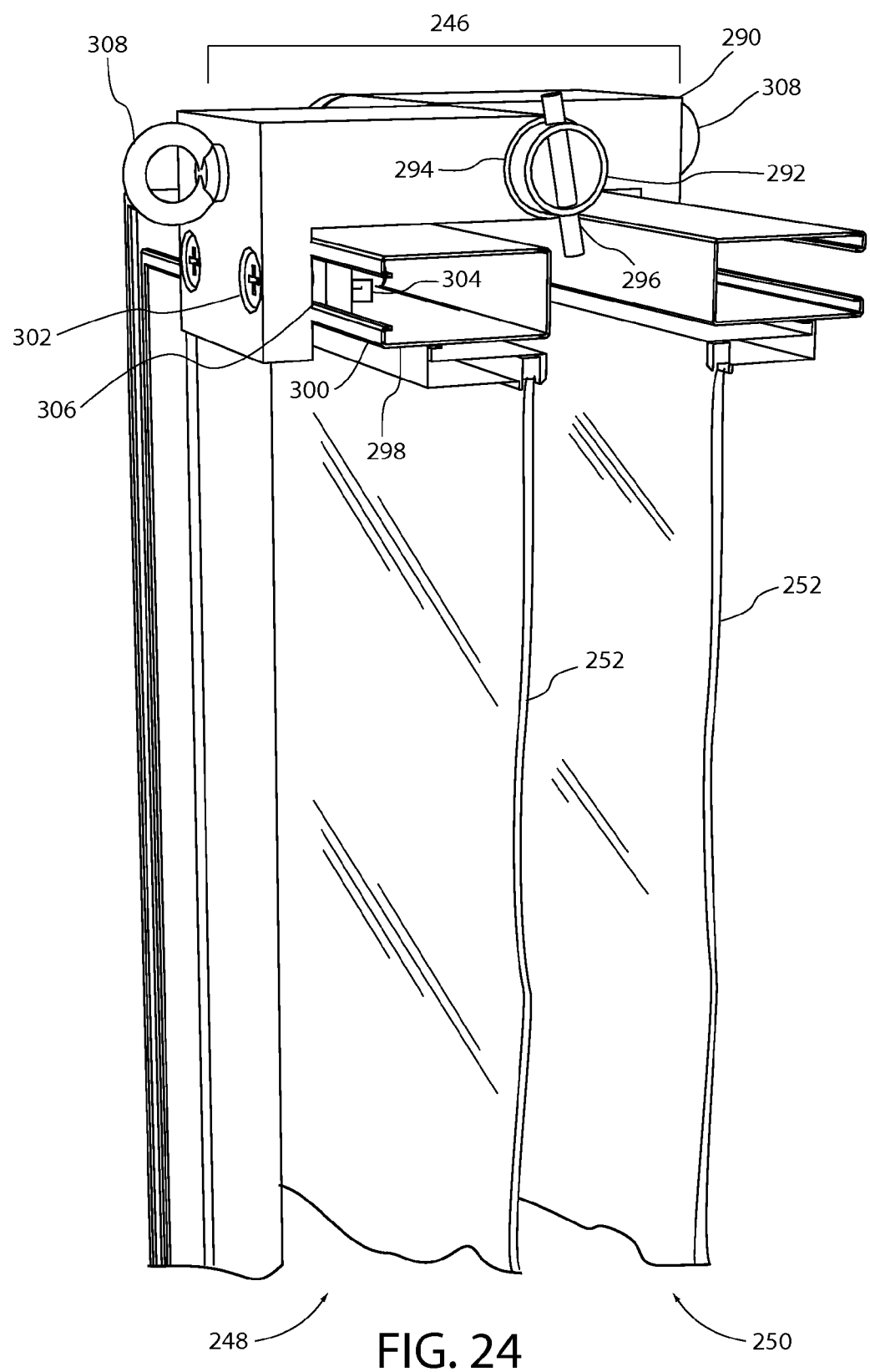
FIG. 24 illustrates a portion of the solar PV roof deck structure of FIG. 22 in perspective view showing detail of a top hinge set.

FIG. 24 shows an assembled view of FIG. 23 with the first panel section 248 and the second panel section 250. Referring to FIGS. 23 and 24 the upper hinge 246 is separable into hinge portions 290. The hinge portions 290 are joined in-line by the hinge pivot pin 292 through an aperture 294 near the inside facing edge of each hinge portion 290. The hinge pivot pin 292 extends through each aperture 294. The hinge pivot pin 292 can be held into place by a holding pin 296. A plurality of holding pins 296 can extend through the diameter of each end the hinge pivot pin 292. Alternatively, one or more holding pins 296 can extend through the aperture 294 near the inside facing edge of hinge portion and into the hinge pivot pin 292.

The first panel section 248 includes a frame section 298. The frame section 298 can be u-shaped and hollow, as illustrated. The closed portion of the u-shape faces inward and it lies in approximately the same plane as the solar PV surfaces 252. The frame section 298 is shown with an inward facing lip portion 300 at the bottom of the u-shape. The hinge portion 290 is held to the frame by a threaded fastener 302. The threaded fastener 302 is seated on the outside surface of the hinge portion 290, captured, and secured to a strut track nut 304 that is held to frame section 298 by the inward facing lip portion 300. An alignment pin 306 helps to align the hinge portion 290 into the frame section 298 and prevent withdrawal.

A threaded lift hook 308 is secured to the outside surface of the hinge portion 290. Referring to FIG. 23, the threaded lift hook can be secured to the outside surface of the hinge portion 290 through a threaded aperture 310.

Figure 25:
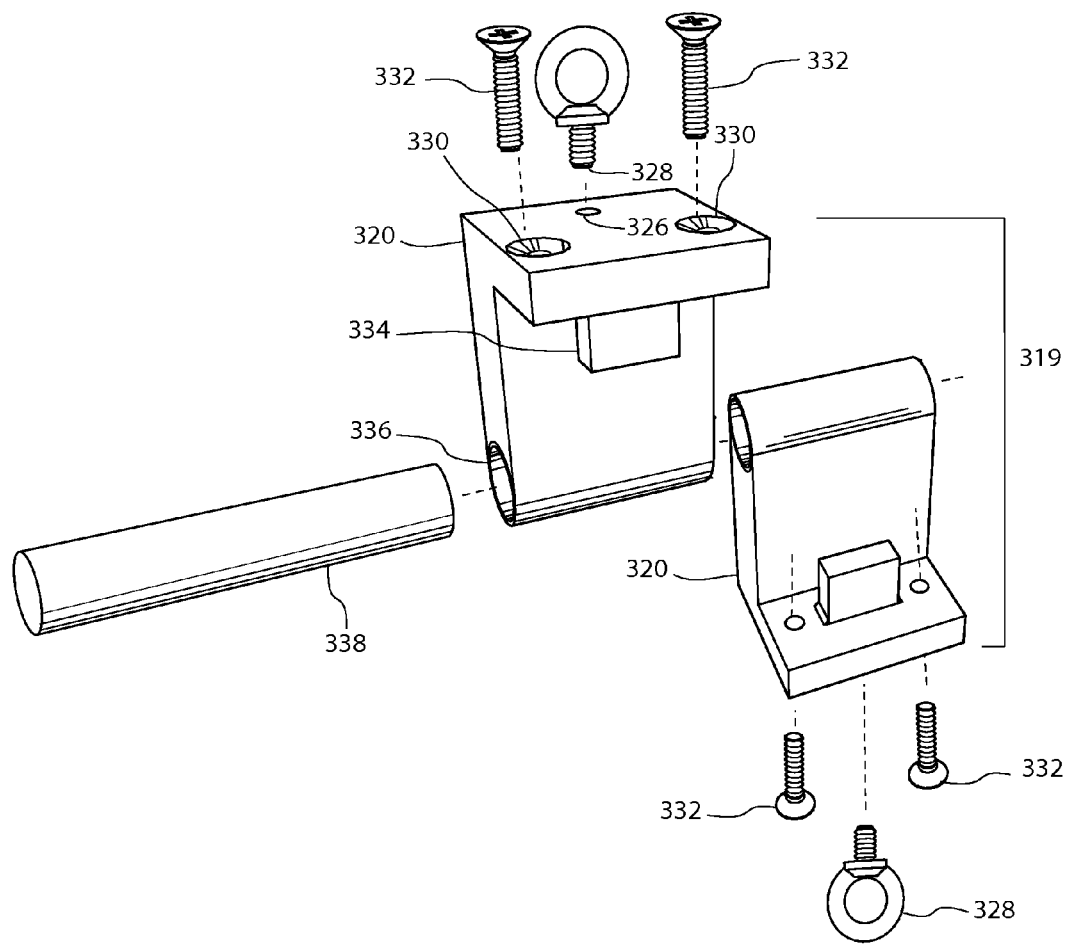
FIG. 25 illustrates an exploded view of the hinge set of FIG. 17.

FIG. 25 illustrates and exploded perspective view of a hinge set that can be used in accordance FIG. 17. The hinge set is viewed as if looking away from the solar PV roof deck. For simplicity of assembly and manufacture, the same hinge portion design can be used for hinge portions 258 of the lower hinge 244 of FIGS. 20 and 21 and the hinge portion 290 for the upper hinge 246 of FIGS. 23 and 24. Referring to FIG. 25, illustrated is a hinge set 319 with a hinge portion 320 that can be used to construct either an upper hinge or a lower hinge. The hinge portion 320 includes a threaded aperture 326 for receiving and securing a lift hook 328. The hinge portion also includes apertures 330 for receiving and seating one or more threaded fasteners 332. The threaded fasteners 332 secure the hinge portion 320 to a solar PV deck frame as previously described. The hinge portion 320 includes an alignment pin 334 similar to the alignment pin 306 of FIG. 23 and the alignment pin 270 of FIG. 21. The hinge portion 320 includes an aperture 336 for receiving a hinge pivot pin 338. Both the aperture 336 and hinge pivot pin 338 are structured in a similar manner as described for the corresponding apertures and hinge pivot pins of FIGS. 21 and 23.

Figure 26:
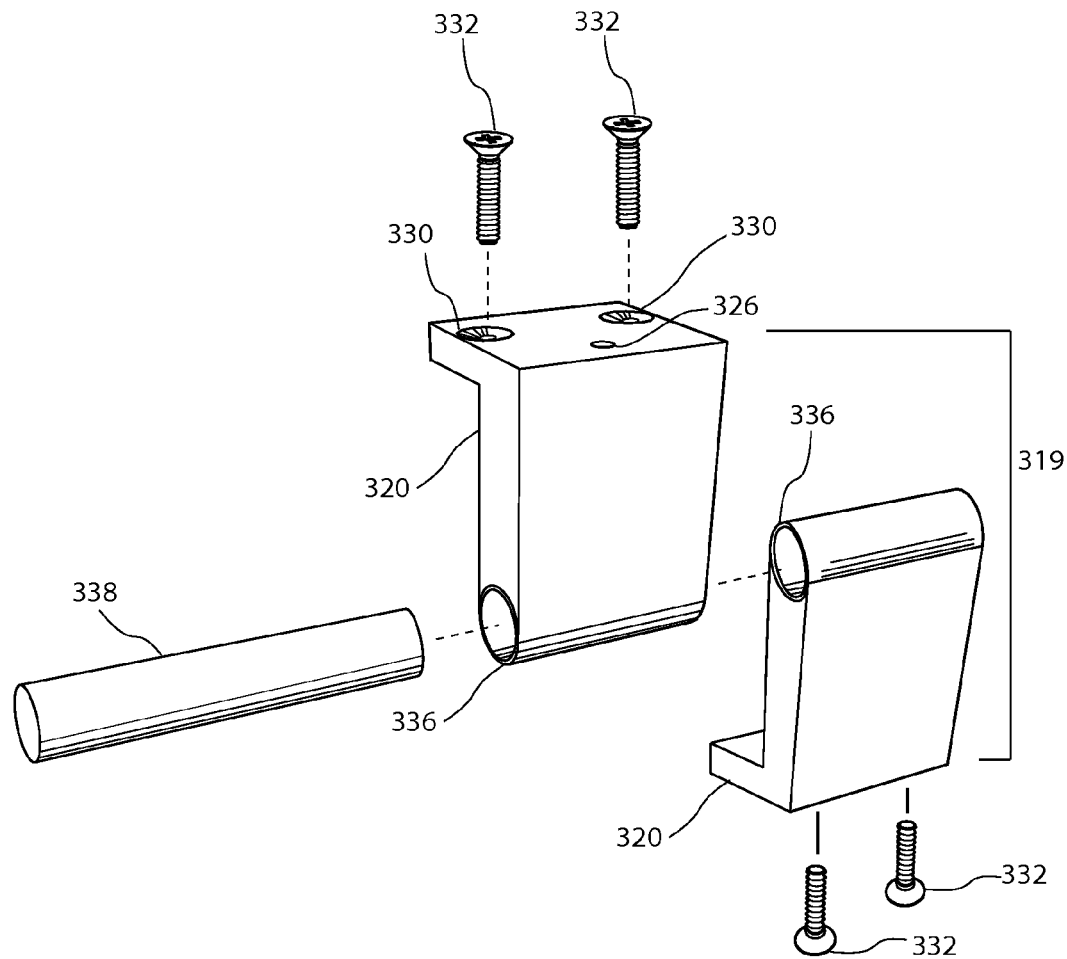
FIG. 26 illustrates an alternate exploded view of the hinge set of FIG. 17.

FIG. 26 illustrates an alternative view of the hinge set 319 of FIG. 25. The hinge set 319 is viewed as looking toward a solar PV roof deck. The hinge set is created from the hinge portions 320. Illustrated is the threaded aperture 326 for receiving and securing the lift hook 328 of FIG. 25, apertures 330 for receiving and seating the threaded fasteners 332, the threaded fasteners 332, the aperture 336 for receiving a hinge pivot pin 338, and the hinge pivot pin 338.

Figure 27:
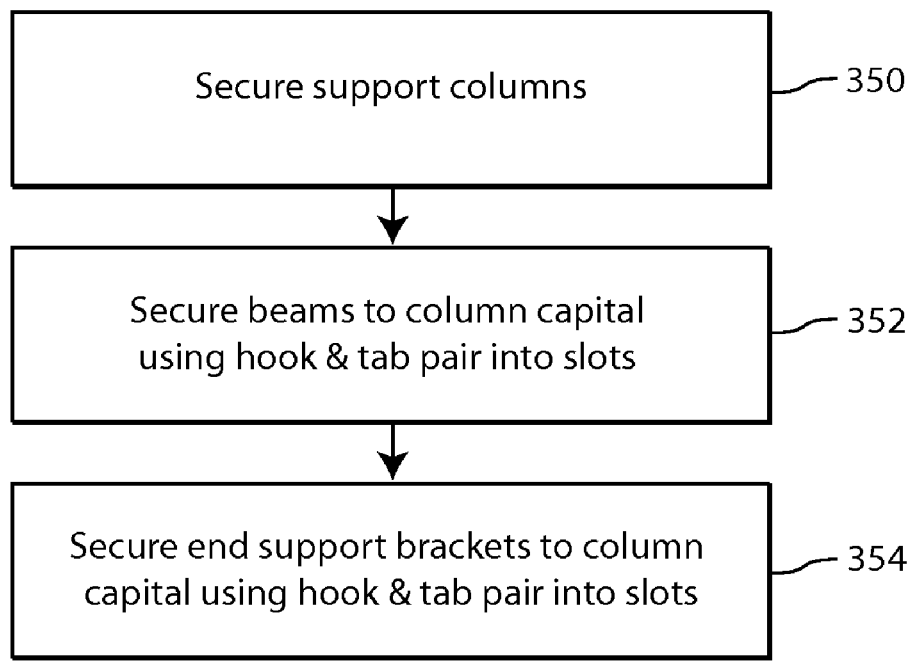
FIG. 27 illustrates a process for assembling a frame assembly of a solar PV structure.
Figure 28:
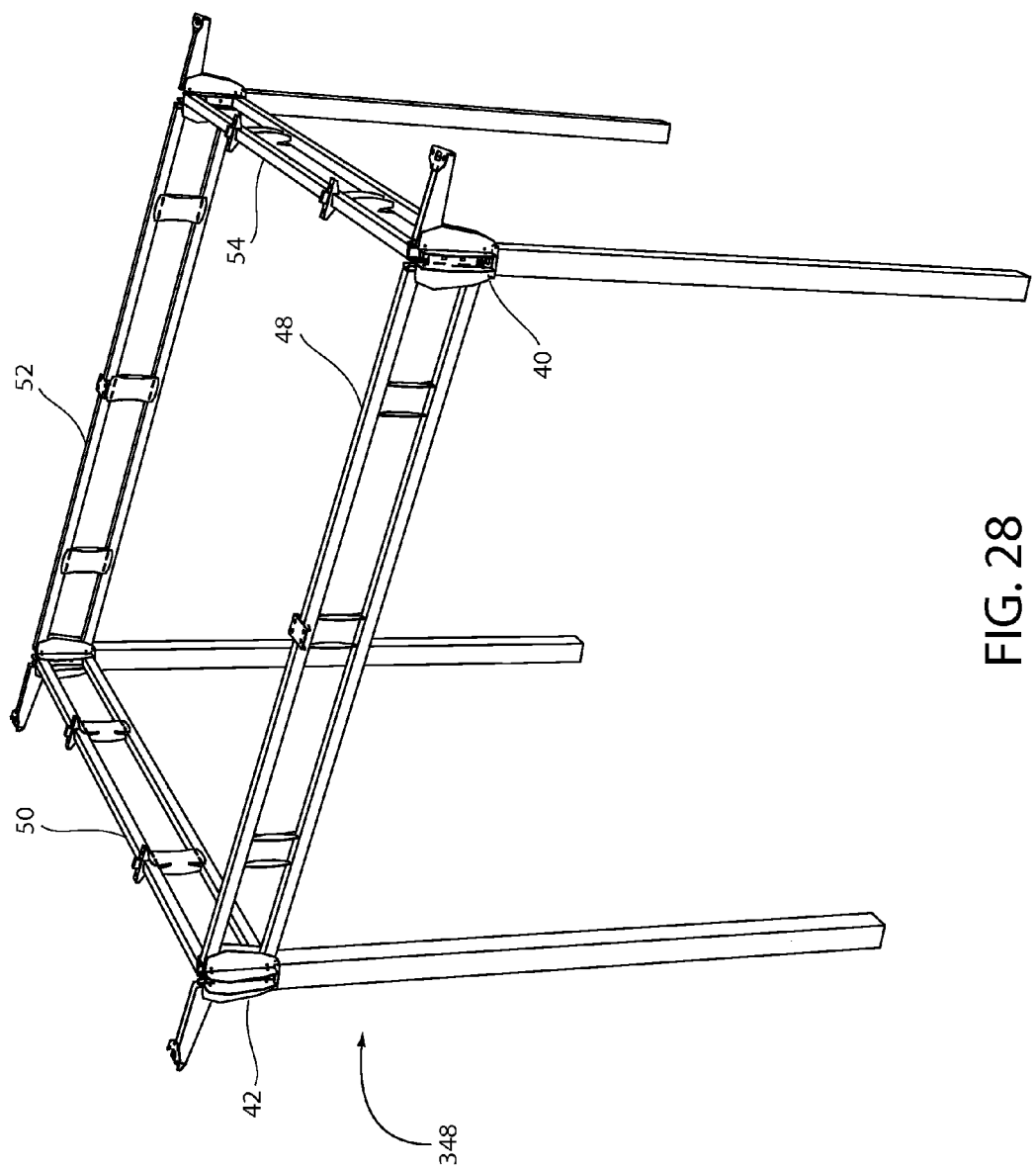
FIG. 28 illustrates in perspective view a frame assembly of a solar PV structure.

FIG. 27 is flow chart illustrating one method for assembling the frame of the solar PV structure 10 of FIG. 1. The assembled frame 348 is illustrated in FIG. 28. The process may be better understood by referring back to previously described figures as indicated and to the paragraphs describing those figures.

Referring to FIGS. 2 and 27, in the first step 350, the first support column 18, the second support column 20, the third support column 22 and the fourth support column 24 are secured in place. The columns can be fastened to a concrete footer, as described previously within this disclosure. The column capitals are attached to the support columns as previously described. The column capitals can be attached to the columns at the job site. Alternatively, the column capitals can be preassembled and transported to the job.

Referring to FIGS. 5, 27, and 28, in the second step 352, each beam is secured to their respective column capitals. The beams can be secured to the column capitals by using a hook, tab, and slot arrangement described previously. Referring to FIG. 5, the first beam 48 can be secured to the first column capital 40 by aligning the upper hook 76, lower tab 77, upper tab 80, and lower hook 82 with the corresponding slots within the column capital and then securing the upper hook 76 and lower hook 82 to the corresponding slots as previously described. Referring to FIG. 28, the beam end of the first beam 48 opposite to the first column capital 40 is secured to the second column capital 42 by aligning the hooks and tabs with the slots and then securing the hooks to the slots in a similar manner. The process is repeated for the securing the second beam 50, the third beam 52, and the fourth beam 54 to their corresponding column capitals.

Referring to FIG. 27, in the third step 354, the end support brackets are secured to their corresponding column capital. Each end support bracket can be secured by aligning the hooks and tabs of the end support bracket with the corresponding slots in the column capital and securing the hooks to the slots as previously disclosed.

Figure 29:
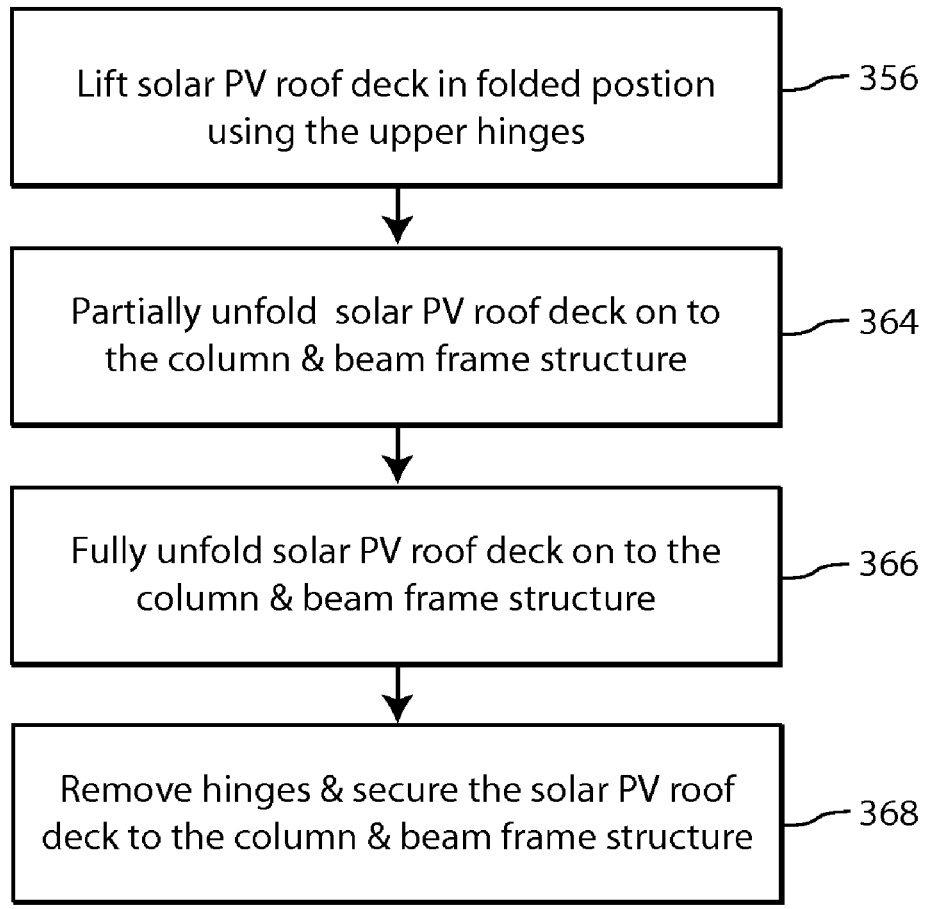
FIG. 29 illustrates a process for assembling a solar PV structure.
Figure 30:
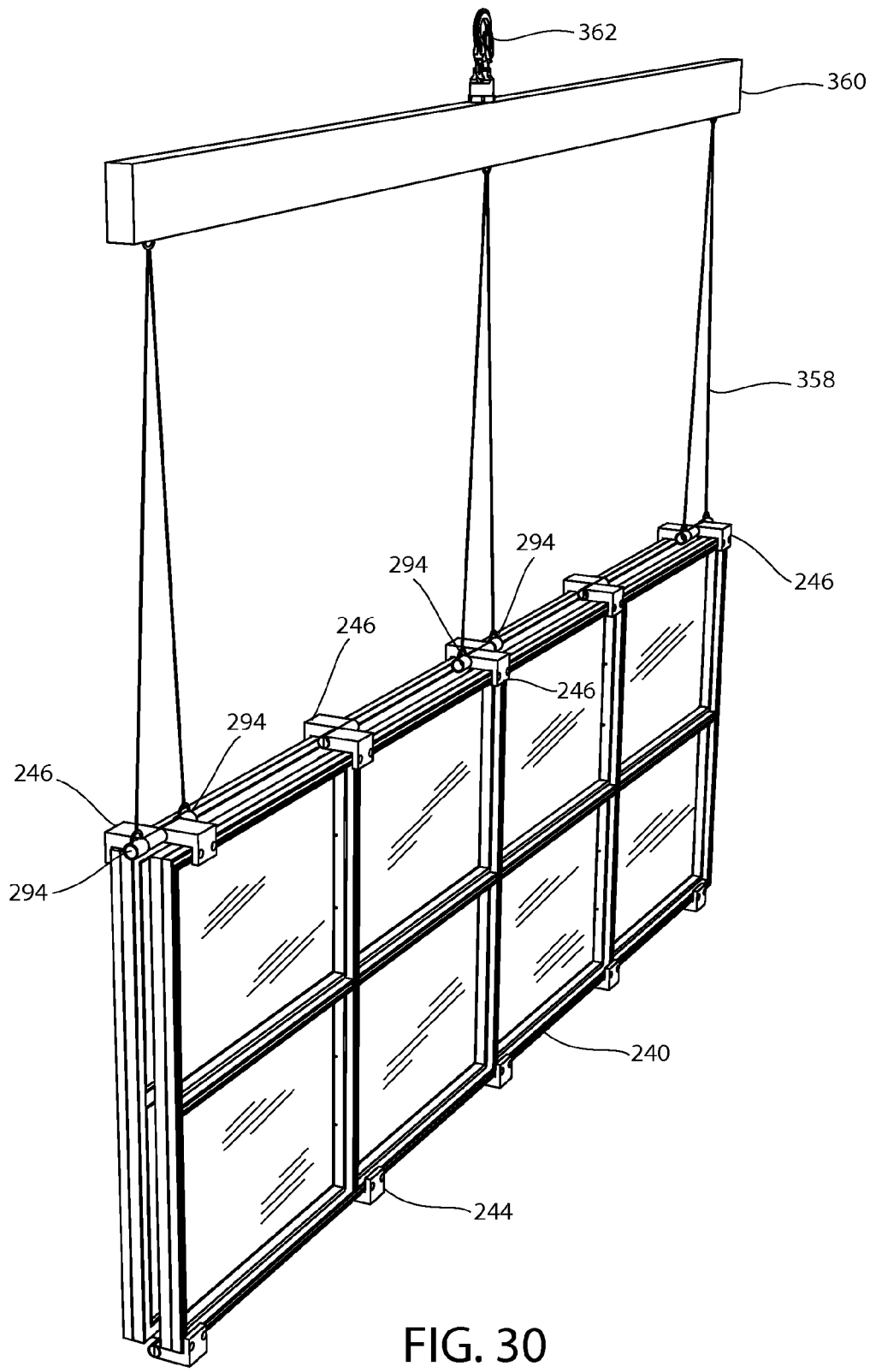
FIG. 30 illustrates a perspective view of a solar PV roof deck structure in a folded position lifted by a crane hook.

FIG. 29 illustrates a process for assembling the solar PV roof deck 240 of FIG. 17 to the assembled frame 348 of FIG. 28. Referring to FIG. 29, in the first step 356, the solar PV roof deck 240 of FIG. 17, is lifted by a crane or hoist in a folded position using lift hooks attached to the upper hinges. Alternatively, the apertures 294 of the hinge portions 290 of FIG. 23 can be used instead of the lift hooks. Referring to FIG. 30, the solar PV roof deck 240 is lifted using the apertures 294. The apertures 294 can be attached by a cable 358 to a lift beam 360 and a beam tied lift hook 362. Alternatively, the threaded lift hooks 308 of FIG. 23, can be secured to the cable 358 and used to lift the solar PV rook deck. The solar PV roof deck is held secure in a folded position by the lower hinges 244 and the upper hinges 246.

Figure 31:
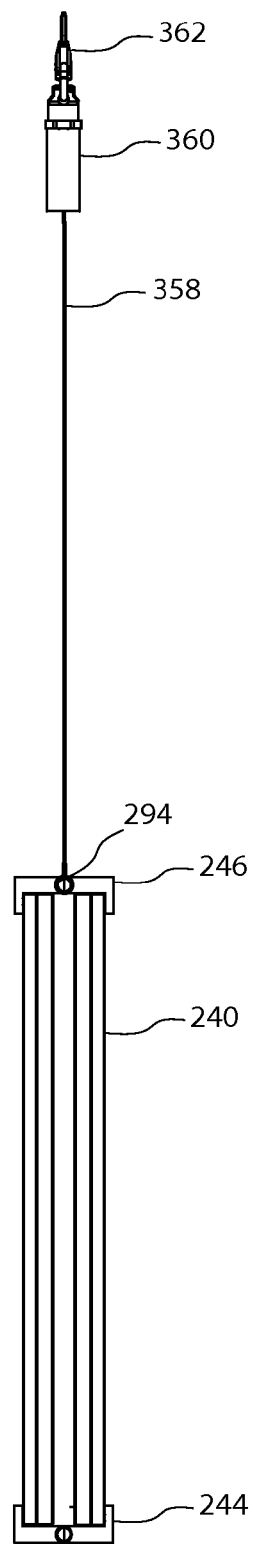
FIG. 31 illustrates a side view of a solar PV roof deck structure in a folded position lifted by a crane hook.

FIG. 31 illustrates a side view of FIG. 29 showing the solar PV roof deck 240, the lower hinges 244, the upper hinges 246, the aperture 294, the cable 358, the lift beam 360, and the beam tied lift hook 362.

Figure 32:
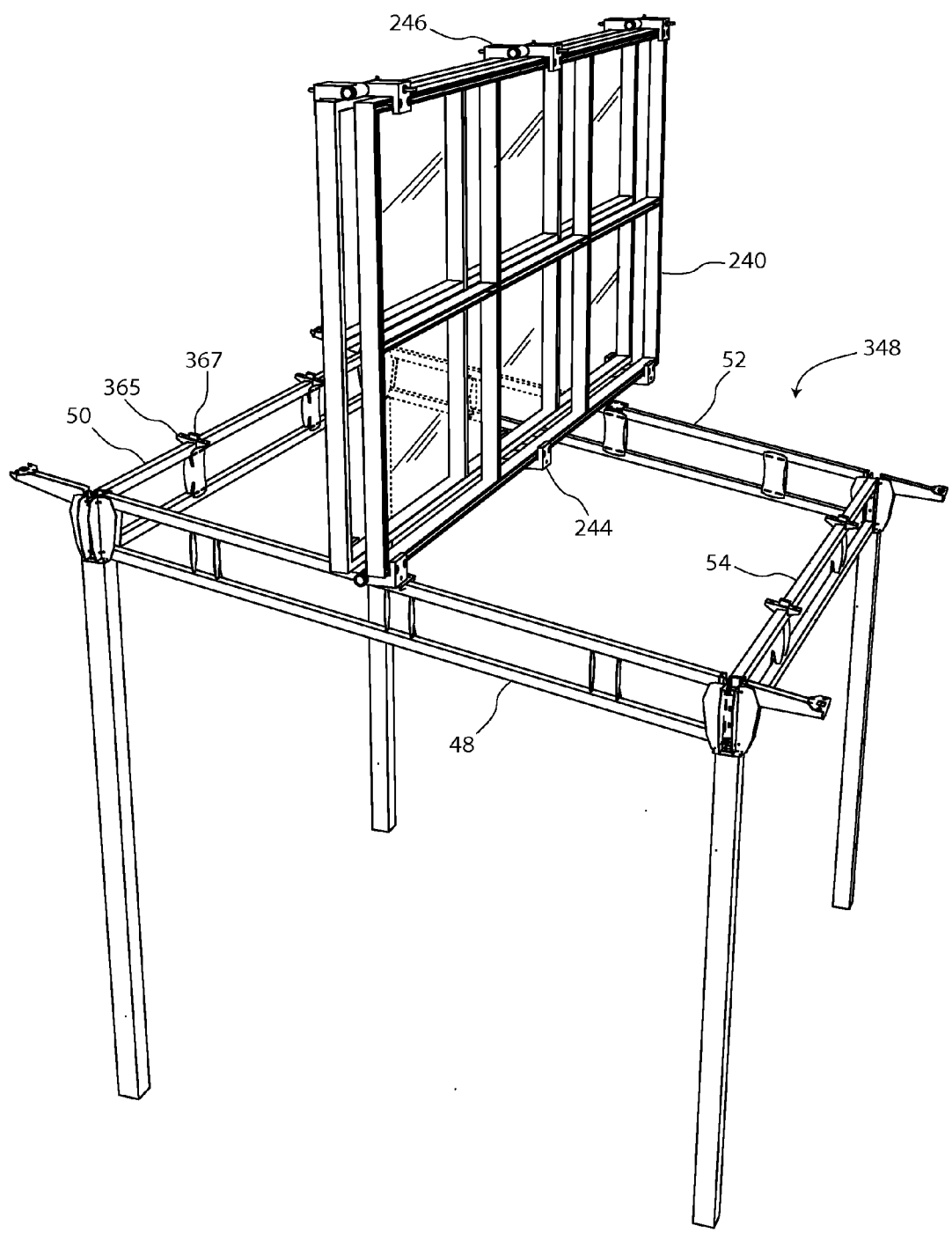
FIG. 32 illustrates in perspective view the frame assembly of FIG. 28 engaged with a solar PV deck structure in a folded position.

FIG. 32 illustrates the solar PV roof deck 240, in a folded position, secured by lower hinges 244 and upper hinges 246 being placed on assembled frame 348, approximately centered between the non-sloping beams, the second beam 50, and the fourth beam 54. Alternatively, the solar PV roof deck 240, in a folded position, can be positioned approximately centered between the sloping beams, the first beam 48 and the third beam 52.

Figure 33:
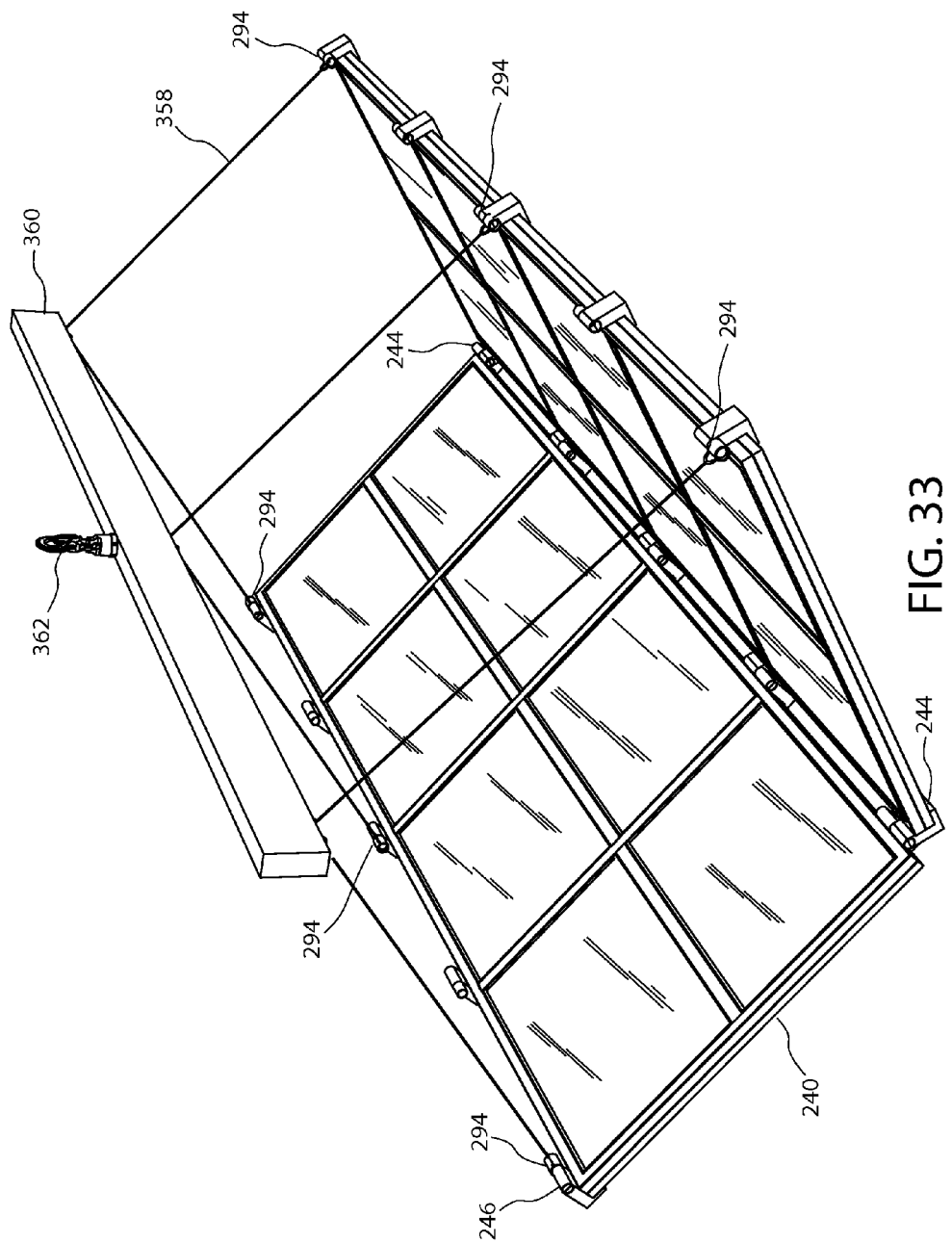
FIG. 33 illustrates a perspective view of a solar PV roof deck structure in a partially unfolded position lifted by a crane hook.
Figure 34:
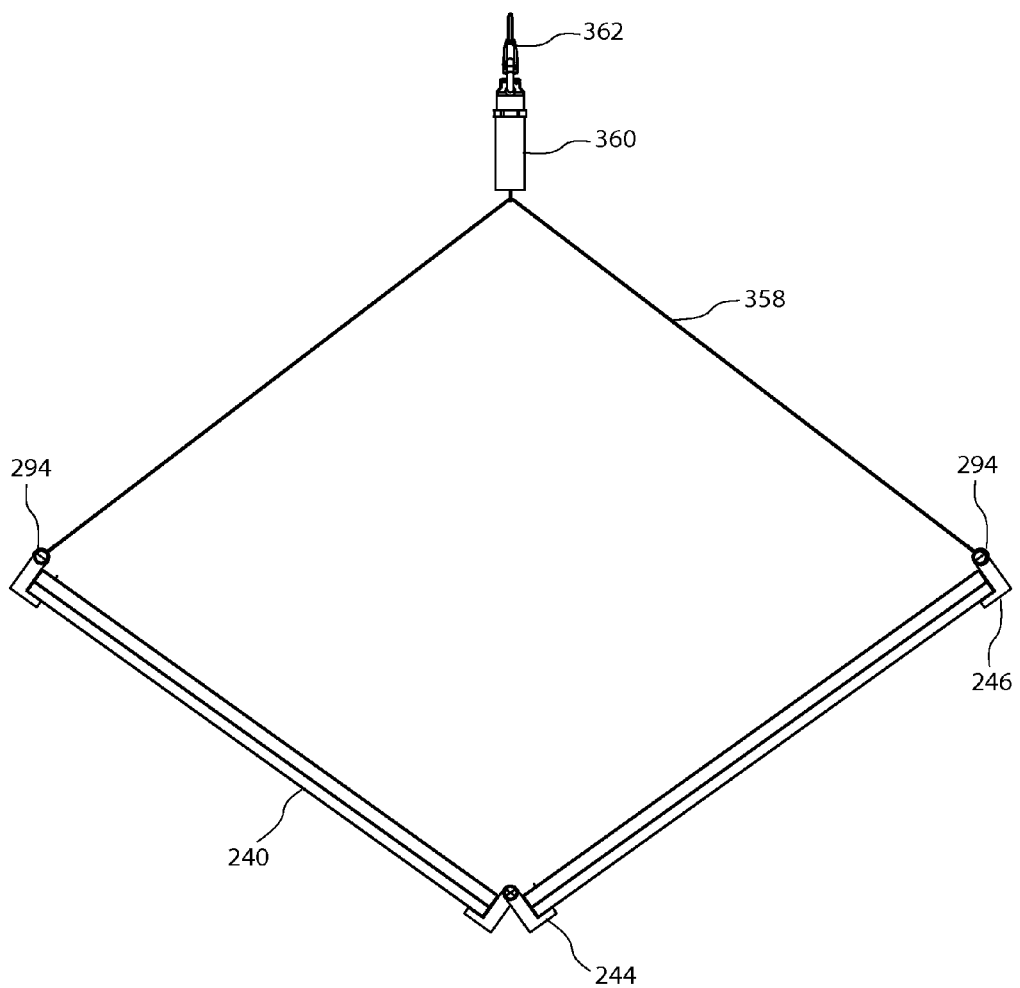
FIG. 34 illustrates a side view of a solar PV roof deck structure in a partially unfolded position lifted by a crane hook.

Referring to FIG. 29, in the second step 364, the solar PV roof deck is partially unfolded in place. Referring to FIG. 33 the solar PV roof deck 240 is partially unfolded in place by removing the hinge pivot pins 292 of FIGS. 23 and 24 from the upper hinges 246. FIGS. 33 and 34 shows the resulting partially unfolded state of the solar PV roof deck 240 connected from the aperture 294 or alternatively from the threaded lift hooks 308 of FIG. 23, to the cables 358, the lift beam 360, and the beam tied lift hook 362. The solar PV roof deck 240 unfolds along the lower hinges 244.

Figure 35:
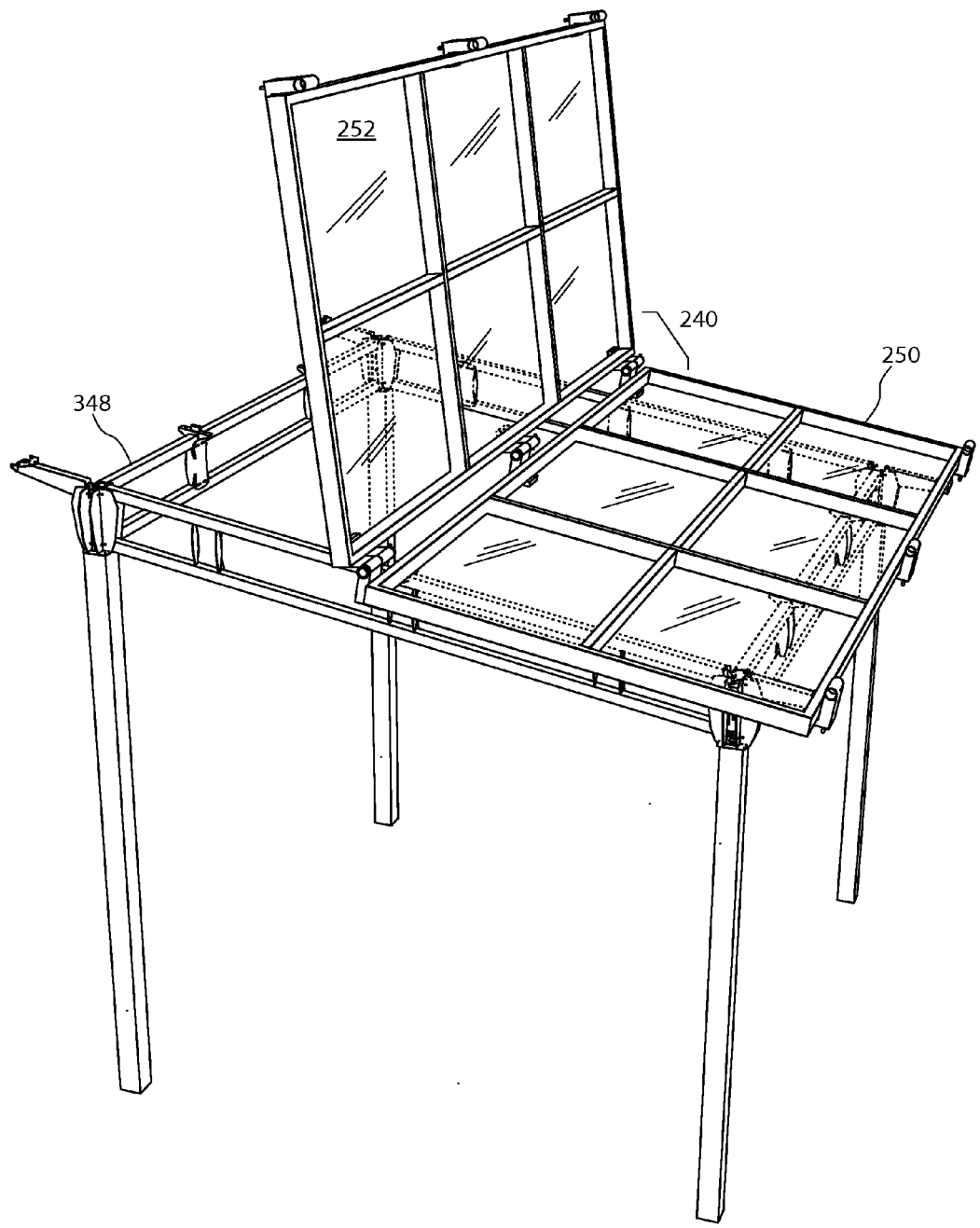
FIG. 35 illustrates in perspective view the frame assembly of FIG. 28 engaged with a solar PV deck structure in a partially unfolded and partially attached position.

FIG. 35 shows the solar PV roof deck 240, partially unfolded and partially attached using a registration tab 365 and an alignment pin 367 onto the assembled frame 348. The registration tab 365 and alignment pin 367 together form a registration tab/alignment pin pair. In the partially on folded position, one of the panel sections can be laid to rest and secured on the top surface of the assembled frame 348. Illustrated is the second panel section 250 resting on the assembled frame 348. Because the solar PV surfaces 252 on opposing faces of the solar PV roof deck 240 are facing inward in when the solar PV roof deck 240 is in the folded position, the panels are on the upper surface of the solar PV roof deck 240 in the unfolded position.

Figure 36:
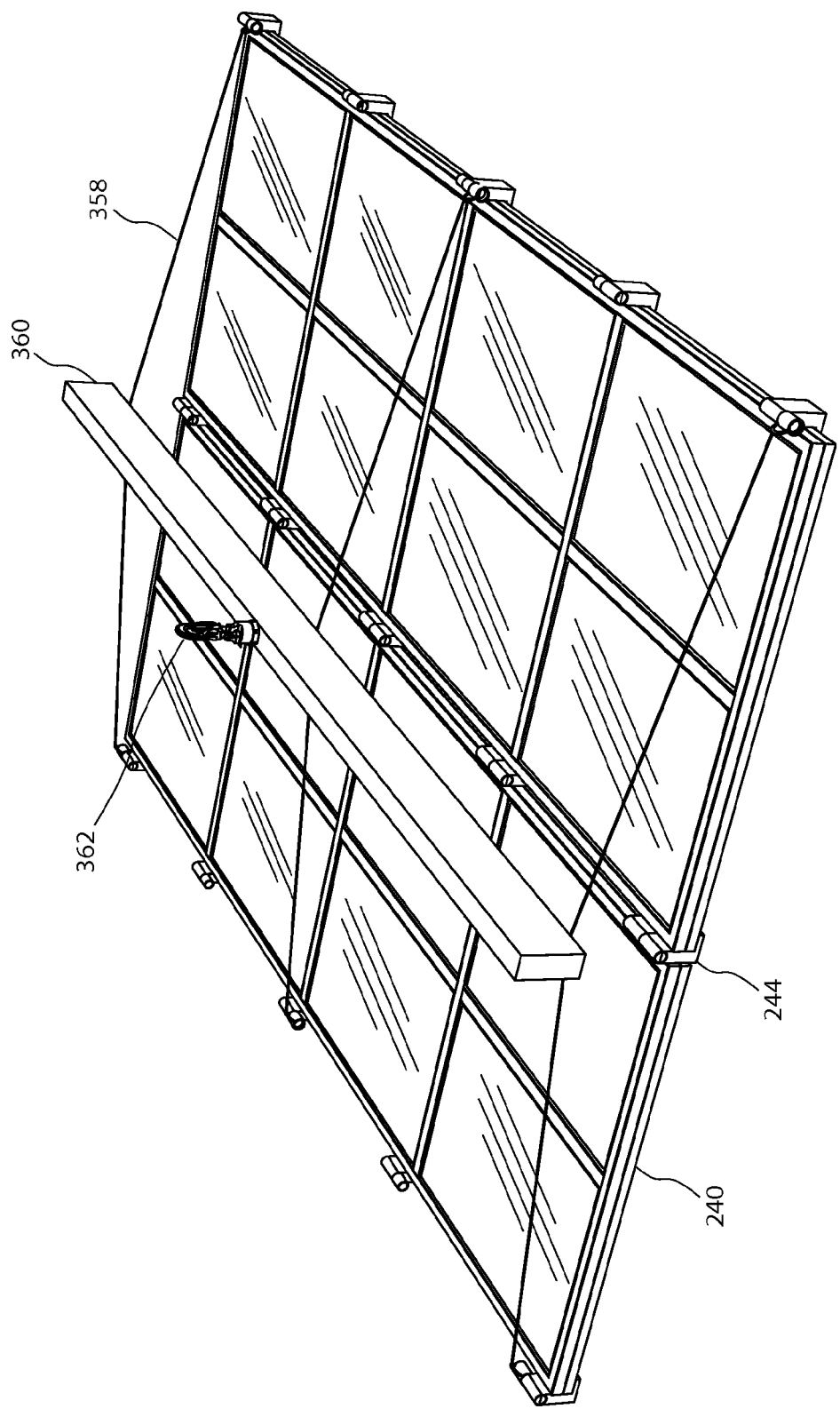
FIG. 36 illustrates a perspective view of a solar PV roof deck structure in an unfolded position lifted by a crane hook.
Figure 37:
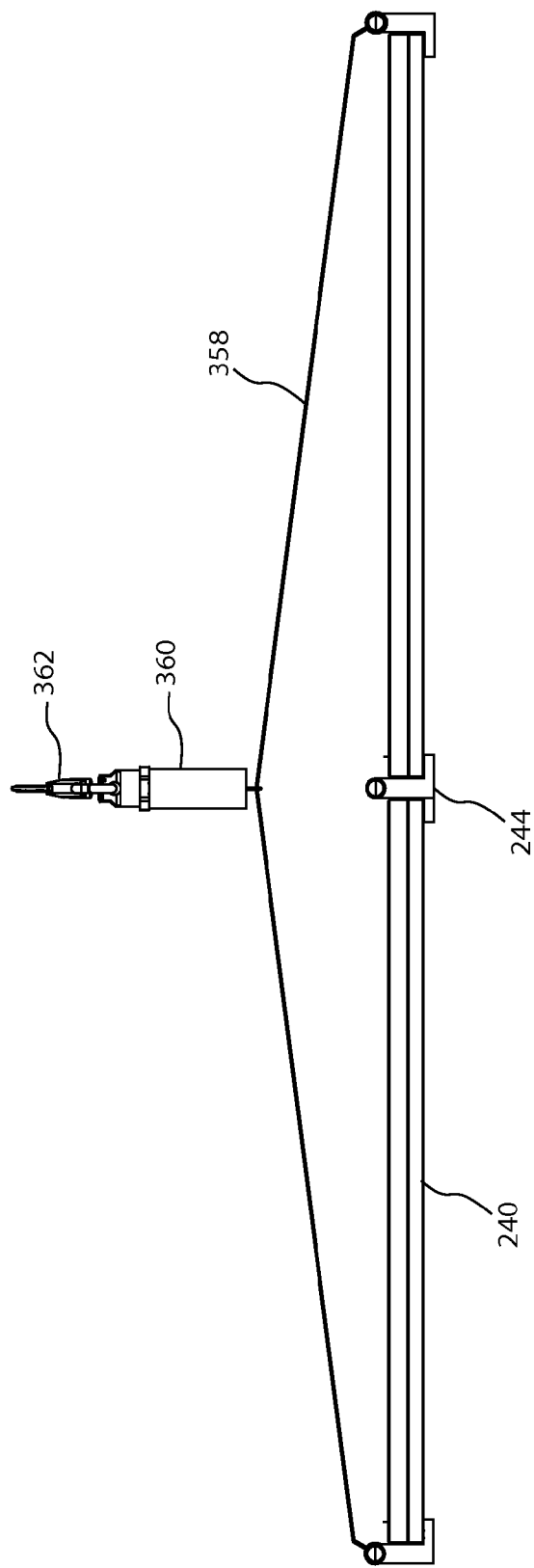
FIG. 37 illustrates a side view of a solar PV roof deck structure in an unfolded position lifted by a crane hook.
Figure 38:
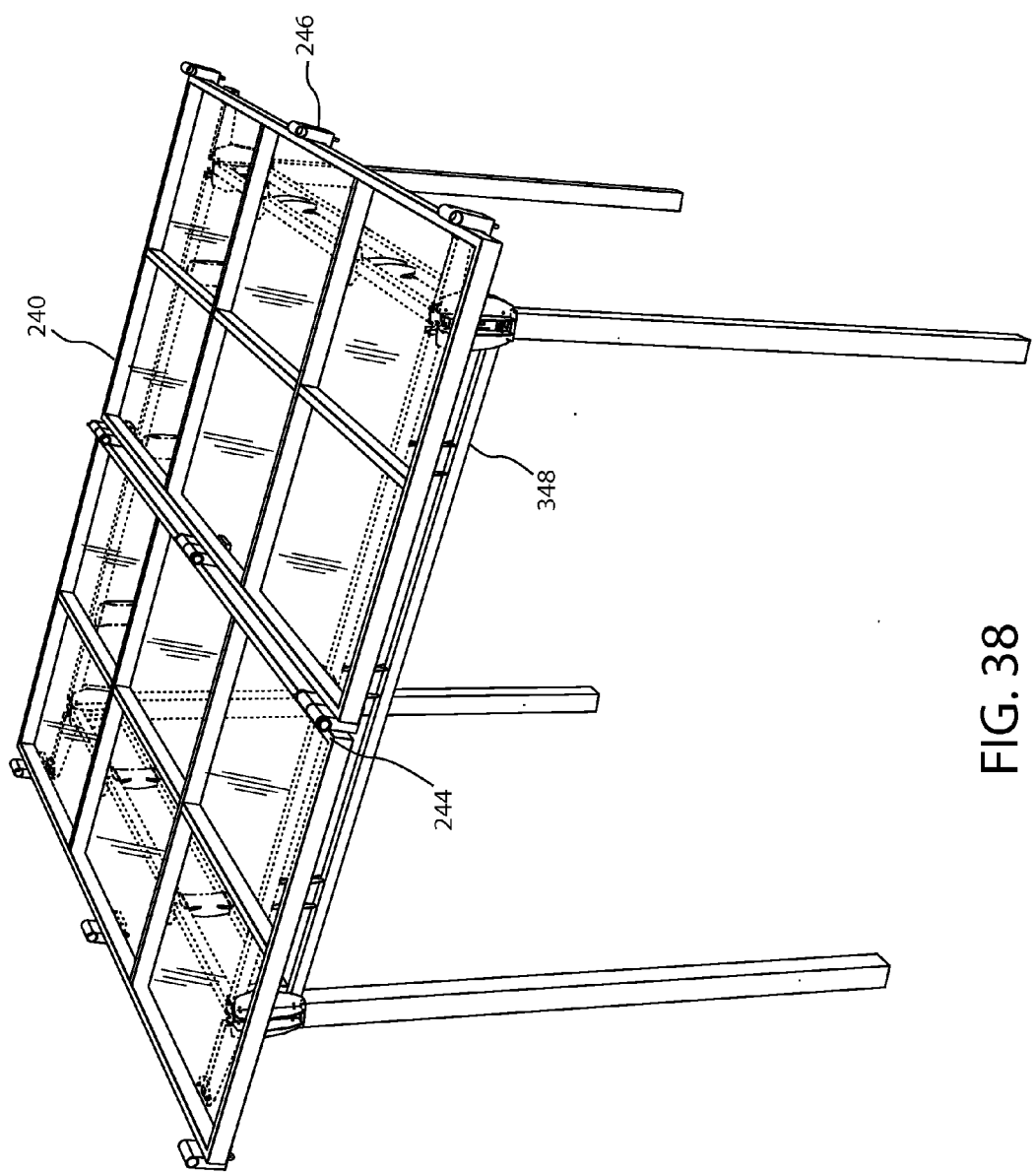
FIG. 38 illustrates in perspective view of the frame assembly of FIG. 28 engaged with a solar PV deck structure in an unfolded position.

Referring to FIG. 29, in the third step 366, the solar PV roof deck structure is fully unfolded and placed to rest on the assembled frame 348 of FIG. 28. Referring to FIGS. 36, 37, and 38, the solar PV roof deck 240 is fully unfolded along the lower hinges 244. Referring to FIG. 38, the solar PV roof deck 240 is place to rest fully on the assembled frame 348. The cables 358, the lift beam 360, and the beam tied lift hook 362 of FIG. 36 are removed from the upper hinges 246 once the solar PV roof deck 240 is in place on the assembled frame 348.

Figure 39:
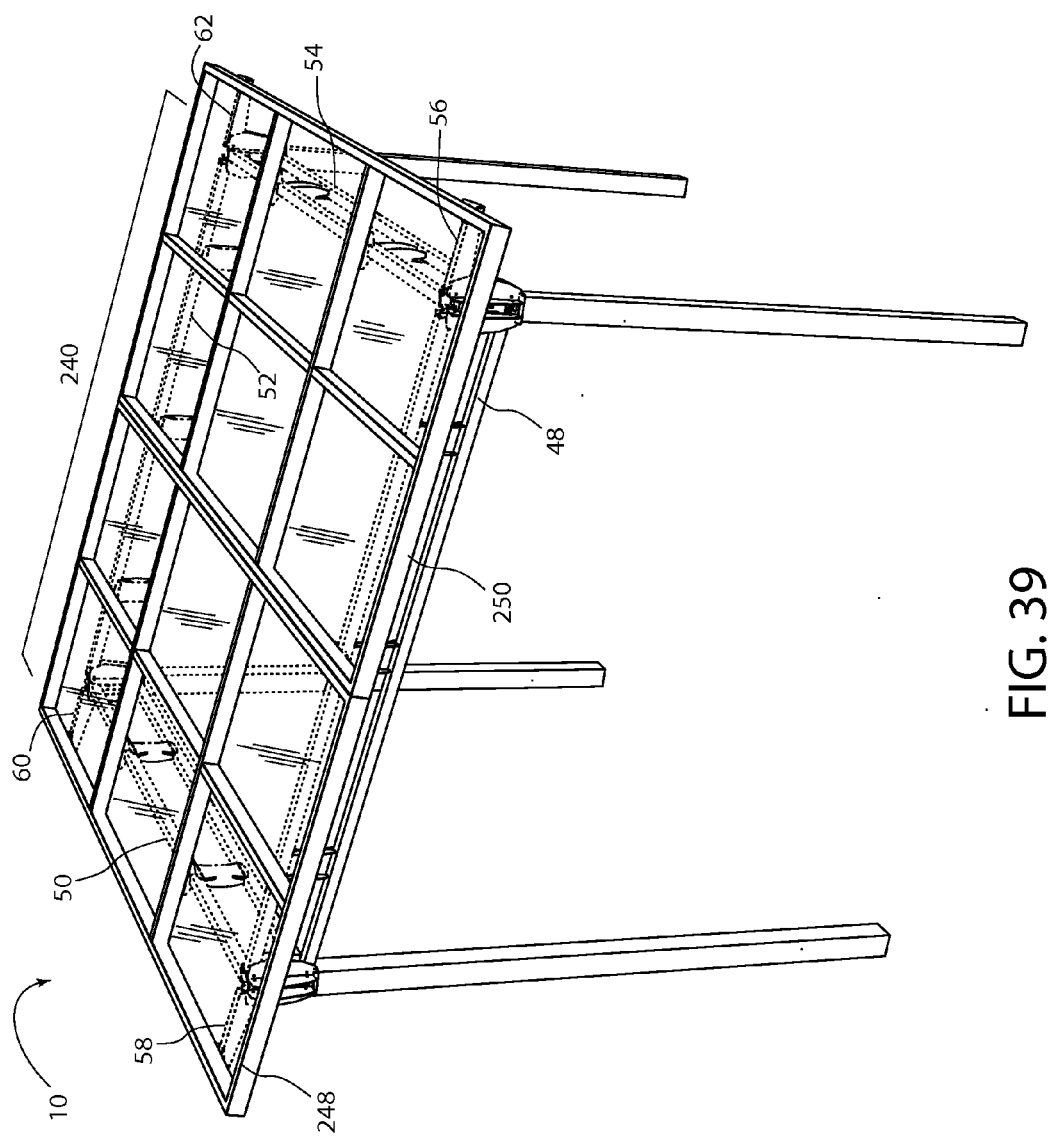
FIG. 39 illustrates in perspective view the frame assembly of FIG. 28 engaged with a solar PV deck structure in an unfolded position and with the hinges removed.

Referring to FIG. 29, in the fourth step 368, the remaining hinges removed and the solar PV roof deck structure is secured to the assembled frame. Referring to FIG. 39, the lower hinges 244 and the upper hinges 246 of FIG. 38 are removed from the solar PV roof deck 240. The solar PV roof deck 240 is secured to the corresponding beams and end support brackets. For example, in FIG. 39, the first panel section 248 is secured to the first beam 48, the second beam 50, the third beam 52, the second end support bracket 58, and the third end support bracket 60. The second panel section 250 is secured to the first beam 48, the third beam 52, the fourth beam 54, the first end support bracket 56, and the fourth end support bracket 62. This arrangement is exemplary. Securing of panel sections and to corresponding beams and support brackets will depend on the arrangement of the panel sections in relation to the beams and support brackets.

The solar panel roof structure can be made leak resistant by placing a water resistant seal between the first panel section 248 and the second panel section 250 before securing the panel sections. For example, a gasket strip, made of an elastomeric material, such as butyl rubber, silicone, or polychloroprene, can be placed along the facing edges of the first panel section and the section panel section. Those skilled in the art will readily recognize other suitable gasket material. The gasket strip can be an adhesive strip to assist in installation Alternatively water-resistant or waterproof flexible calking, such as silicon calking material can be applied after installation.

Figure 40:
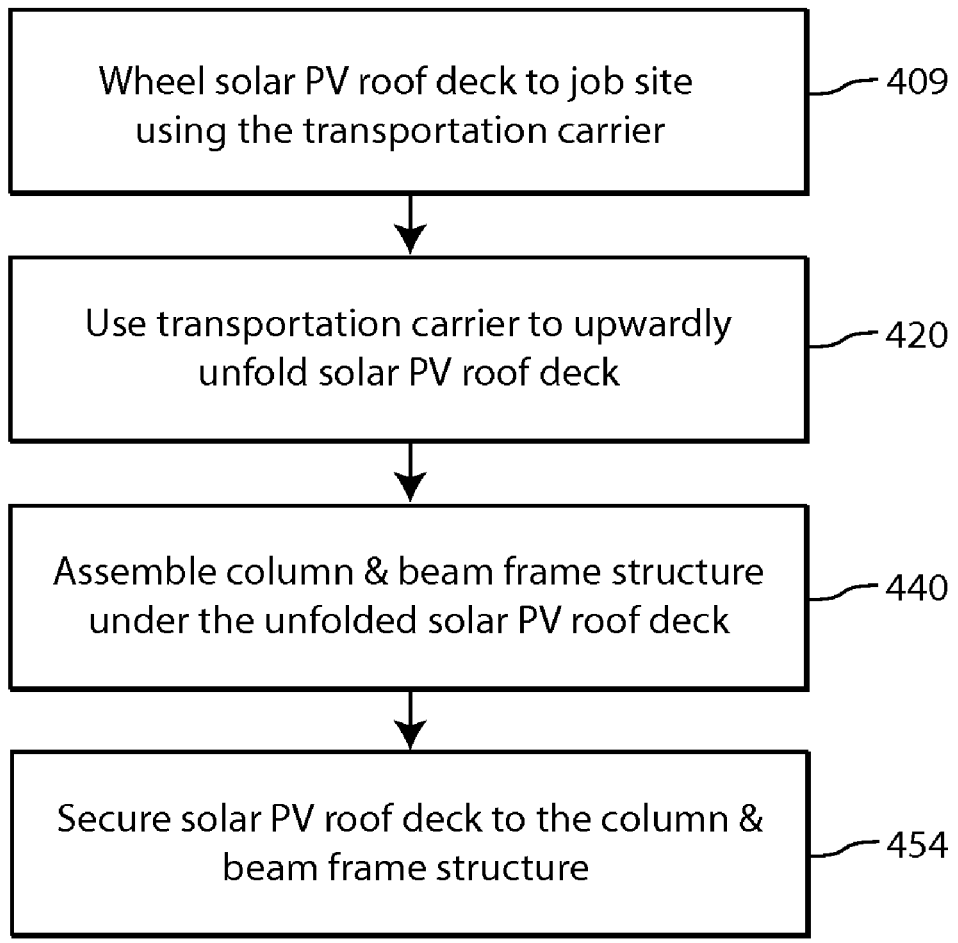
FIG. 40 illustrates a flow chart for an alternative assembly process of a solar PV structure.
Figure 41:
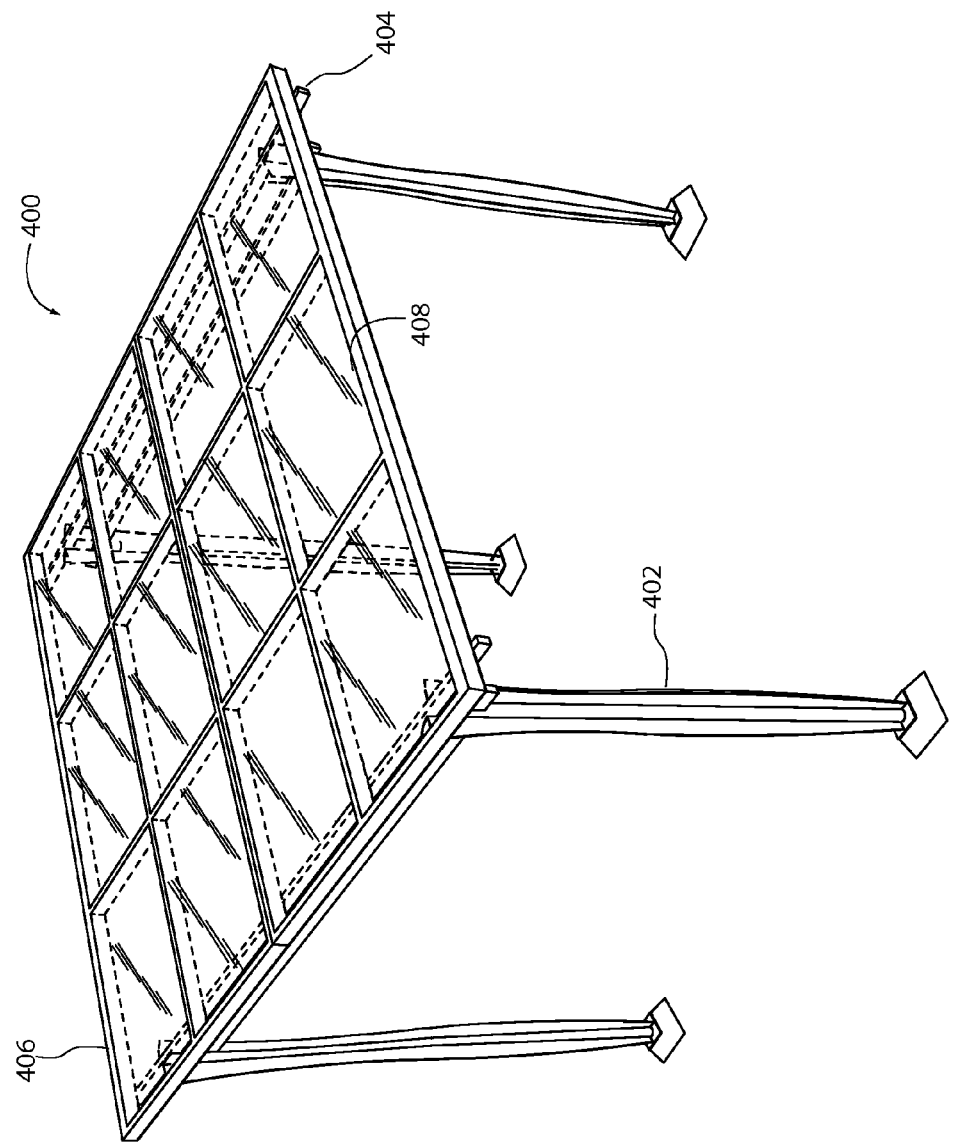
FIG. 41 illustrates a perspective view of an embodiment of a solar PV structure that can be assembled in accordance with FIG. 40.

FIG. 40 illustrates a process of assembling a solar PV structure using a transportation carrier as an assembly device. FIG. 41 illustrates a solar PV structure 400 that can be assembled using the process of FIG. 40. Referring to FIG. 41, the solar PV structure 400 includes a plurality of support columns 402, two or more beams 404, a solar PV roof deck 406, and a plurality of solar PV panels or more generally, solar PV surfaces 408 attached to the solar PV roof deck 406.

Figure 42:
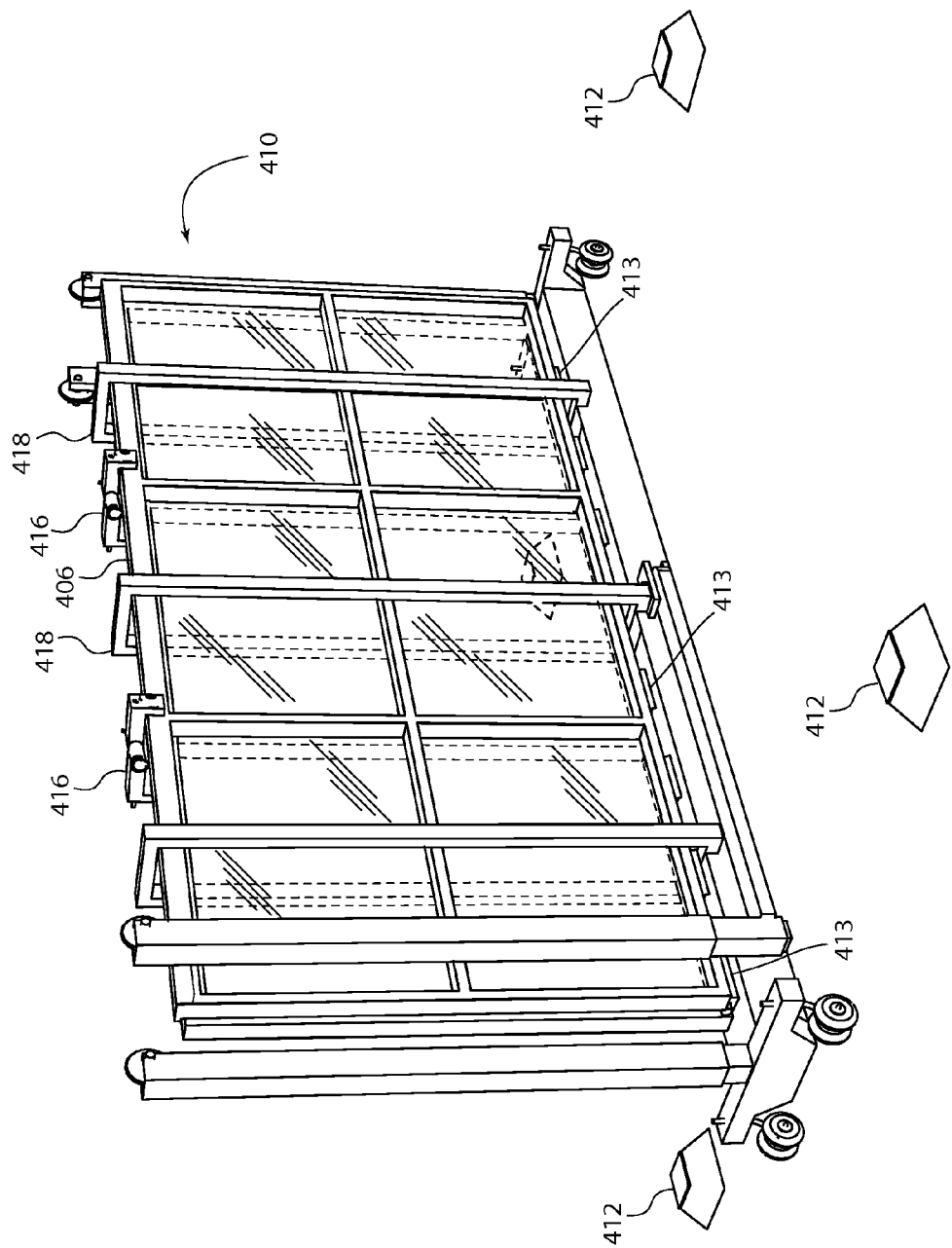
FIG. 42 illustrates a solar PV roof deck structure in a transportation carrier in accordance the assembly process of FIG. 40.

Referring to FIG. 40, in the first step 409, the solar PV roof deck 406 arrives to the job site in a wheeled transportation carrier 410 and at the location where the solar PV structure to be assembled. Referring to FIG. 42, the wheeled transportation carrier 410 can be wheeled by hand or optionally pulled behind a vehicle. The transportation carrier is shown placed between concrete footers 412. The footers can be pre-cast or cast in place. The solar PV roof deck 406 is shown folded in half for transportation and can be similar in structure to the solar PV roof deck 240 of FIG. 17. For example, the solar PV roof deck 406 can be secured and protected for transportation using lower hinges 413 and upper hinges 416. Lower hinges 413 and upper hinges 416 can have either have the same or a similar structure to the lower hinges 244 of FIG. 20 and the upper hinges 246 of FIG. 23. The solar PV roof deck 406 can be secured in the wheeled transportation carrier 410 by one or more removable holding bars 418.

Figure 43:
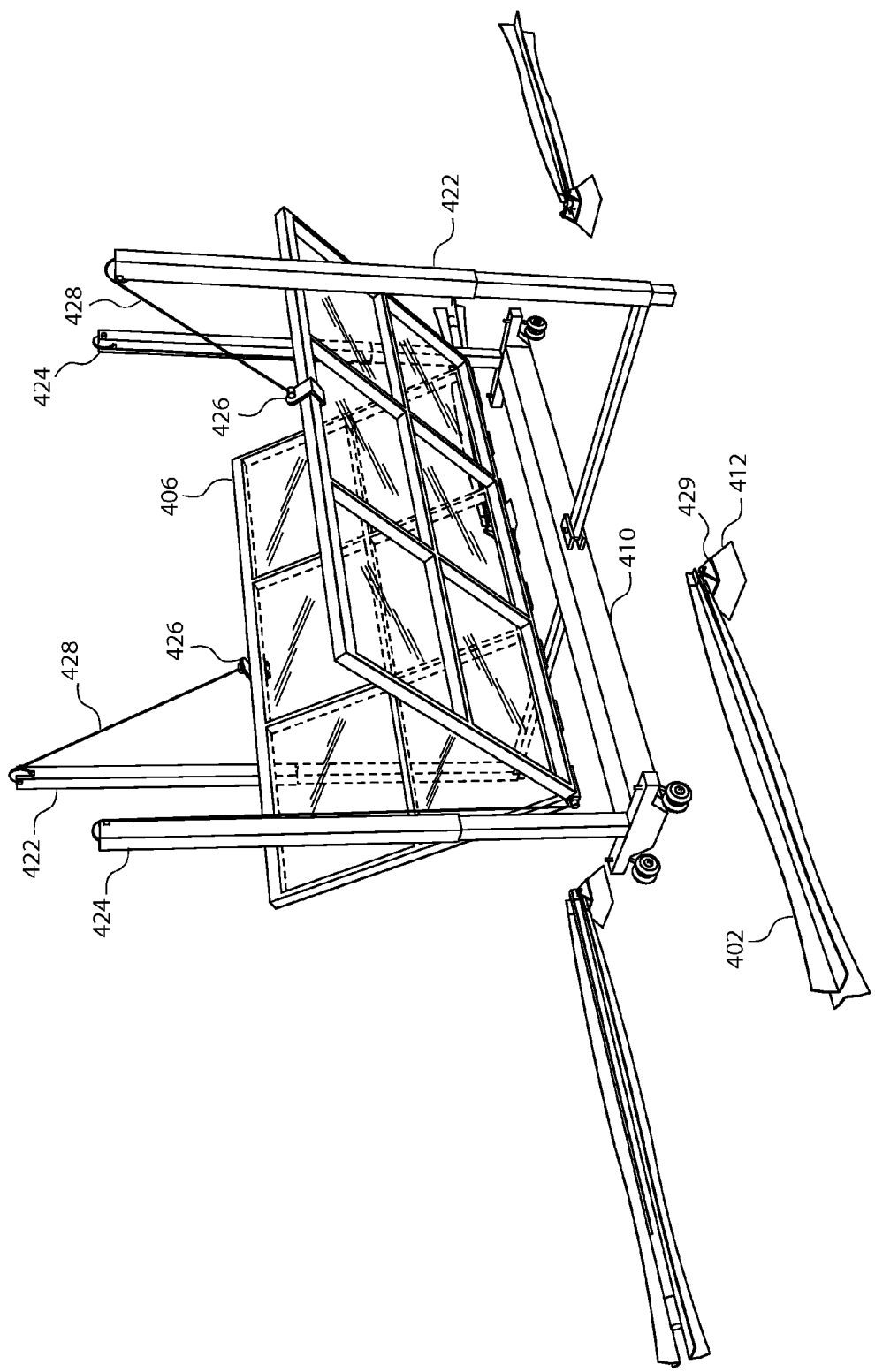
FIG. 43 illustrates an aspect of the assembly process of FIG. 40 where the transportation carrier is used to lift and unfold the solar PV roof deck structure.

Referring to FIG. 40, in the second step 420, the solar PV roof deck 406 of FIG. 43 is unfolded upward by providing an upward force on the edges of the solar PV roof deck 406. Referring to FIG. 43, the transportation carrier includes a plurality of telescoping arms 422. The telescoping arms 422 pivot from a position that is parallel to the front to back line of the wheeled transportation carrier 410 to approximately 90 degrees from their original position. The wheeled transportation carrier 410 can also includes telescoping arms 424 located at its front and the rear.

The wheeled transportation carrier 410 includes pulleys on each of the telescoping arms 422 and optionally on the telescoping arms 424 located at the front and the rear of the wheeled transportation carrier 410. The cables can be actuated using cable winches or hydraulic rams. The hydraulic ram can be electrically driven or can be driven by a gasoline or diesel motor. Alternatively, the cables can be driven by a hand-cranked or electric powered winch, hand driven hydraulic rams, or electric winches. The hydraulic mechanism can be self-contained within the transportation carrier or provide as a separate power pack. The upper hinges 416 of FIG. 42 are separated into hinge portions 426 by removing a hinge pivot pin as described earlier in this disclosure. Pulley cables 428 extending from each telescoping arms 424 and connect to each hinge portion 426 as illustrated. The pulley cables 428 can attach to lifting hooks similar to the threaded lift hooks 308 of FIG. 30. As the pulley is engaged, the pulley cable 428 shortens and applies an upward force on the hinge portions 426. This has the affect of pushing upward on the hinged fold of the solar PV roof deck 406.

Figure 44:
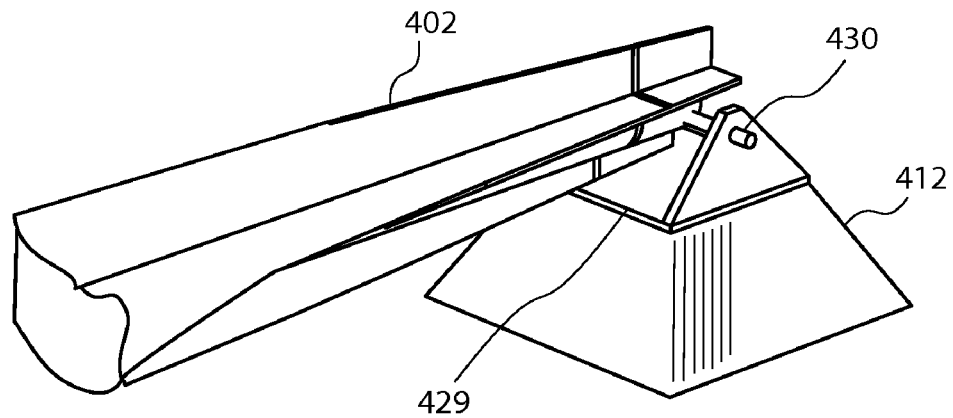
FIG. 44 illustrates a detailed perspective view of a portion of an embodiment of a support column.
Figure 45:
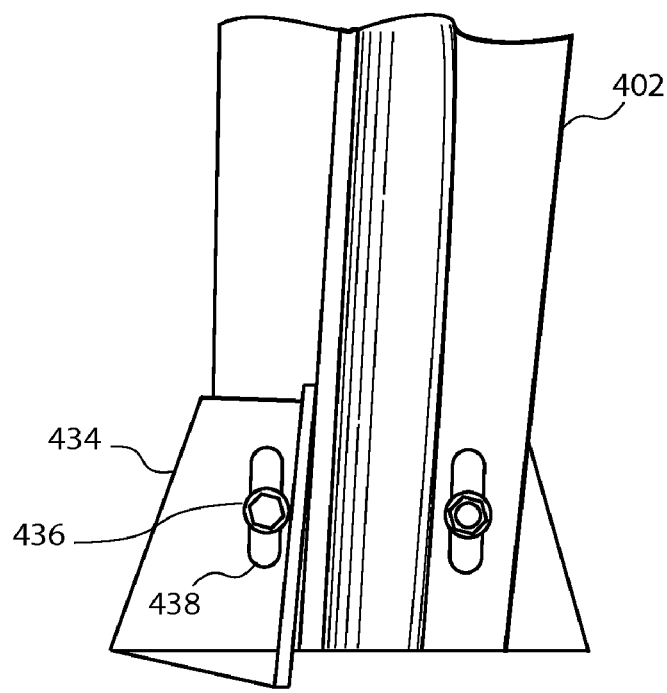
FIG. 45 illustrates a portion of a support column with a lower attachment arrangement.

In the illustrated embodiment of FIG. 43, the support column 402 can be attached to a base plate 429 with the support column 402 in a horizontal position. The base plate 429 can be attached to the concrete footer 412. Referring to FIG. 44, the support column 402 can be temporally joined to the base plate 429 by a pivot 430 attached between the support column 402 and the base plate 429. The base plate can be secured to the concrete footer 412 by means previously disclosed for securing the base plate 26 of FIG. 2 to a concrete footer. The pivot 430 allows the column to be securely hoisted in place by a small crew of workers. Once the support column 402 is hoisted into a vertical position, it can be more fully secured to base plate 429. Referring to FIG. 45, the support column 402 can be attached to the base plate 429 of FIG. 44 using one or more flange plates 434. The flange plate 434 can be secured to the column by a threaded fastener 436 though and aperture 438 in the flange plate 434. The bottom portion of the flange plate 434 can be secured either directly to the concrete footer 412 or through the base plate 429 of FIG. 44.

As an alternative to the pivoting structure just described, the support columns can include an attached base similar in structure to the base plate 26 of FIG. 2. The support columns can then be erected and secured in the same manner as described for the first support column 43 of FIG. 2.

Figure 46:
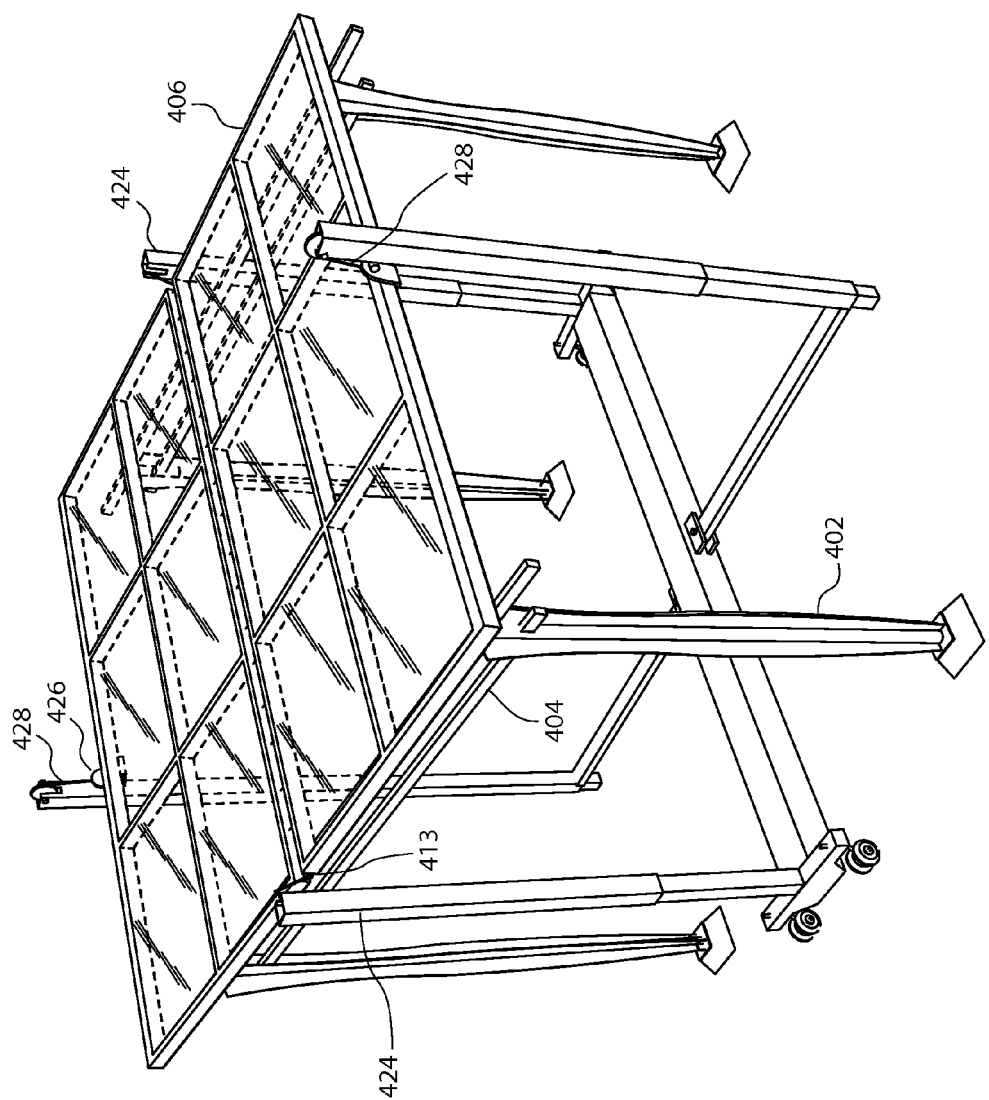
FIG. 46 illustrates an aspect of the assembly process of FIG. 40 where the solar PV roof deck structure is raised into an unfolded position.

Referring again to FIG. 40, in the third step 440, the frame elements are assembled under the solar PV roof deck 406 of FIG. 41. Referring to FIG. 46, the solar PV roof deck 406 is fully unfolded and held in place by the pulley cables 428 attached to the hinge portions 426 attached to the upper portion of the solar PV roof deck 406. The solar PV deck panel can be further secured by attachments to the telescoping arms 424. For example, the pulley cables 428 for the telescoping arms 424 can be attached to lower hinges 413 located near each end of the fold of the solar PV roof deck 406.

Figure 47:
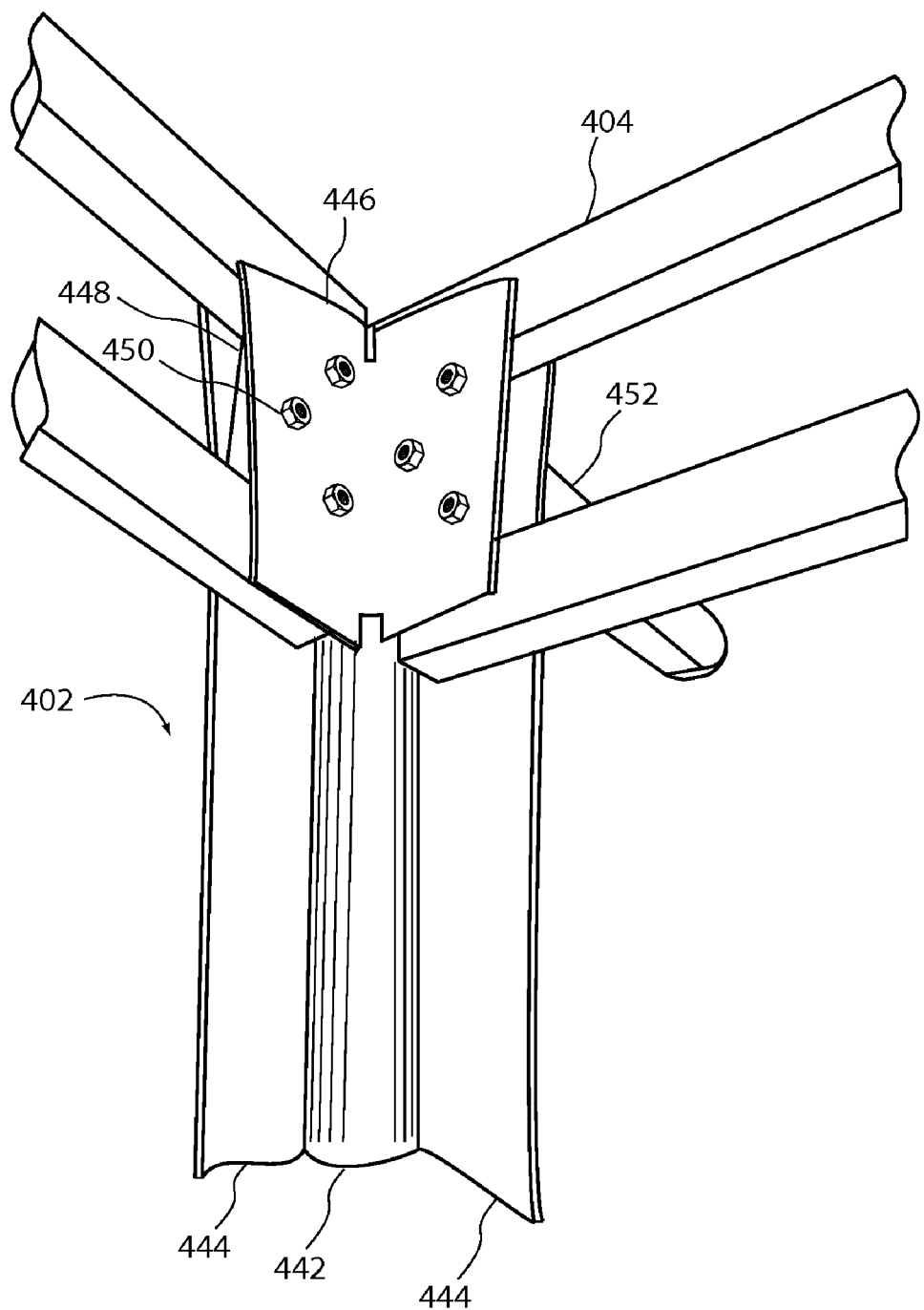
FIG. 47 illustrates a portion of a frame column assembly in perspective view in accordance with the process of FIG. 40.

The beams 404 are secured to the support columns 402. FIG. 47 illustrates a perspective view of a portion of the support column 402 and two of the beams 404 joined to the support column 402. The support column 402 includes a convex portion 442, a plurality of projections 444 extending outward with respect to the column vertical axis, and a right-angle mounting plate 446. The projections 444 are mounted at approximately 90 degrees apart. The inside vertex of the right-angle mounting plate 446 is welded or otherwise fastened to the convex portion 442 between two of the projections 444. This arrangement forms a parallel opening between each of the projections 444 and the right-angle mounting plate 446. The beam end 448 is illustrated secured to the support column 402 by a plurality of threaded fasteners 450. The upper portion of the beam 404 in includes an overhang 452 the projects beyond the beam end 448.

Figure 48:
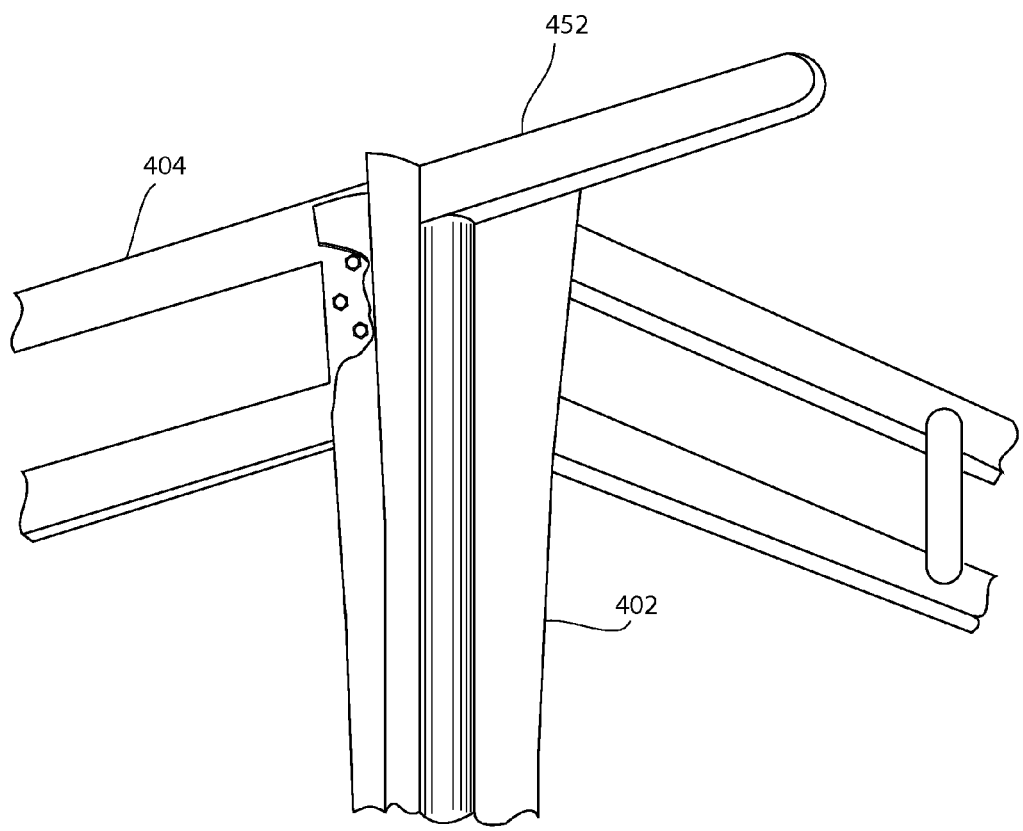
FIG. 48 illustrates an alternate perspective view of FIG. 47 with a partial cutaway on an upper support column portion.

FIG. 48 illustrates an alternative perspective view of FIG. 47 illustrating the overhang 452 of the beam 404 extending through the top of the support column 402. The illustration is in partial cutaway in order to illustrate the relationship between the beam end 448 and the overhang 452. The top of the support column 402 is shaped in order to form a notched portion for supporting the overhang 452 and projecting the overhang through the beam 404.

Figure 49:
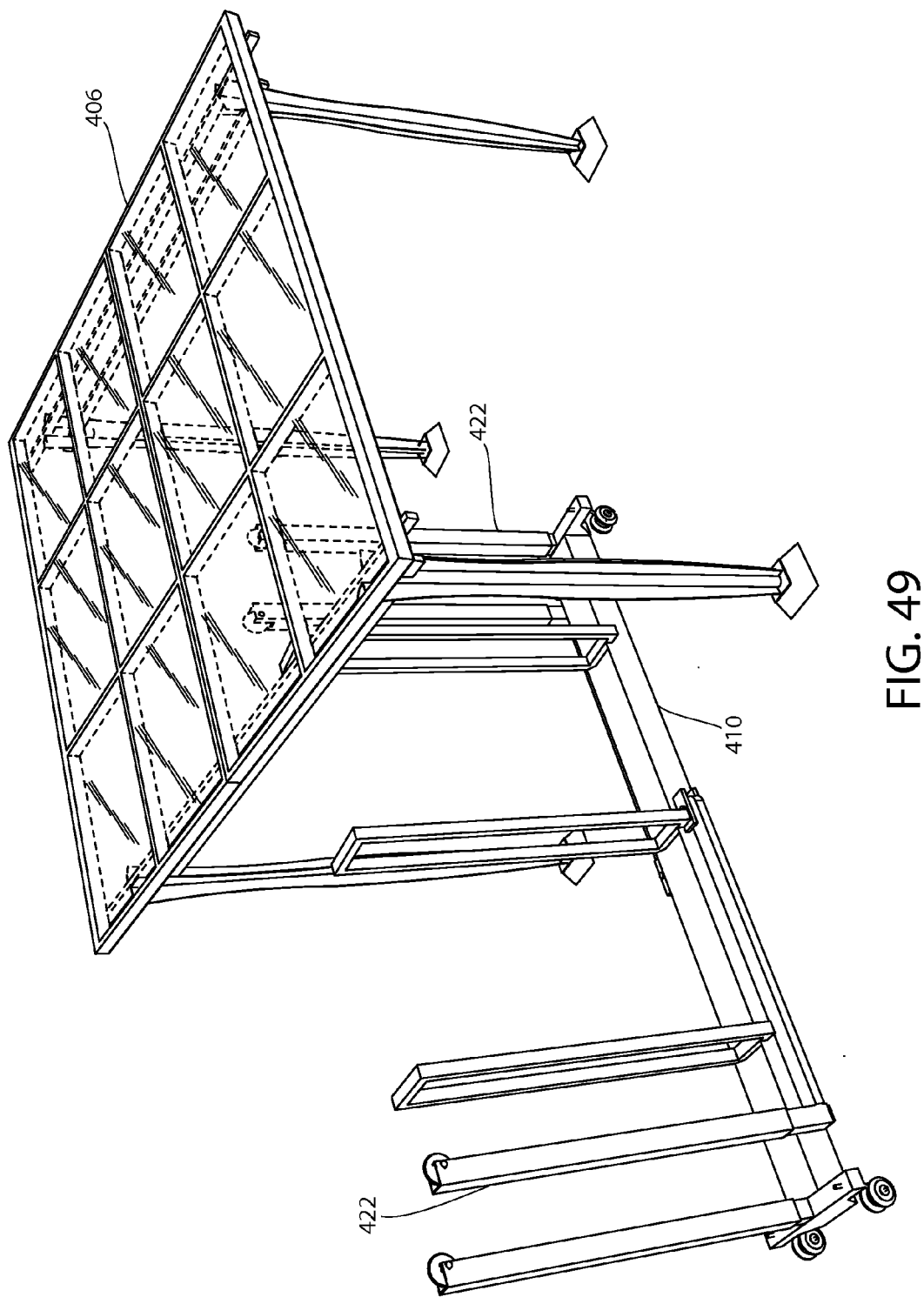
FIG. 49 illustrates an aspect of the assembly process of FIG. 40 where the transportation carrier is removed from the assembled solar PV structure.

Referring back to FIG. 40, in the fourth step, 454 the solar PV roof deck is secured to the frame assembly and the transportation carrier is removed from the solar PV structure 400 of FIG. 41. Referring to FIG. 49, the hinges are removed from the solar PV roof deck 406. A water resistant sealant or water resistant gasket material can be placed between the unfolded deck portions, as previously described, in order to prevent leakage. The wheeled transportation carrier 410 is removed by pivoting the telescoping arms 422 parallel to the length of the wheeled transportation carrier 410.

Figure 50:
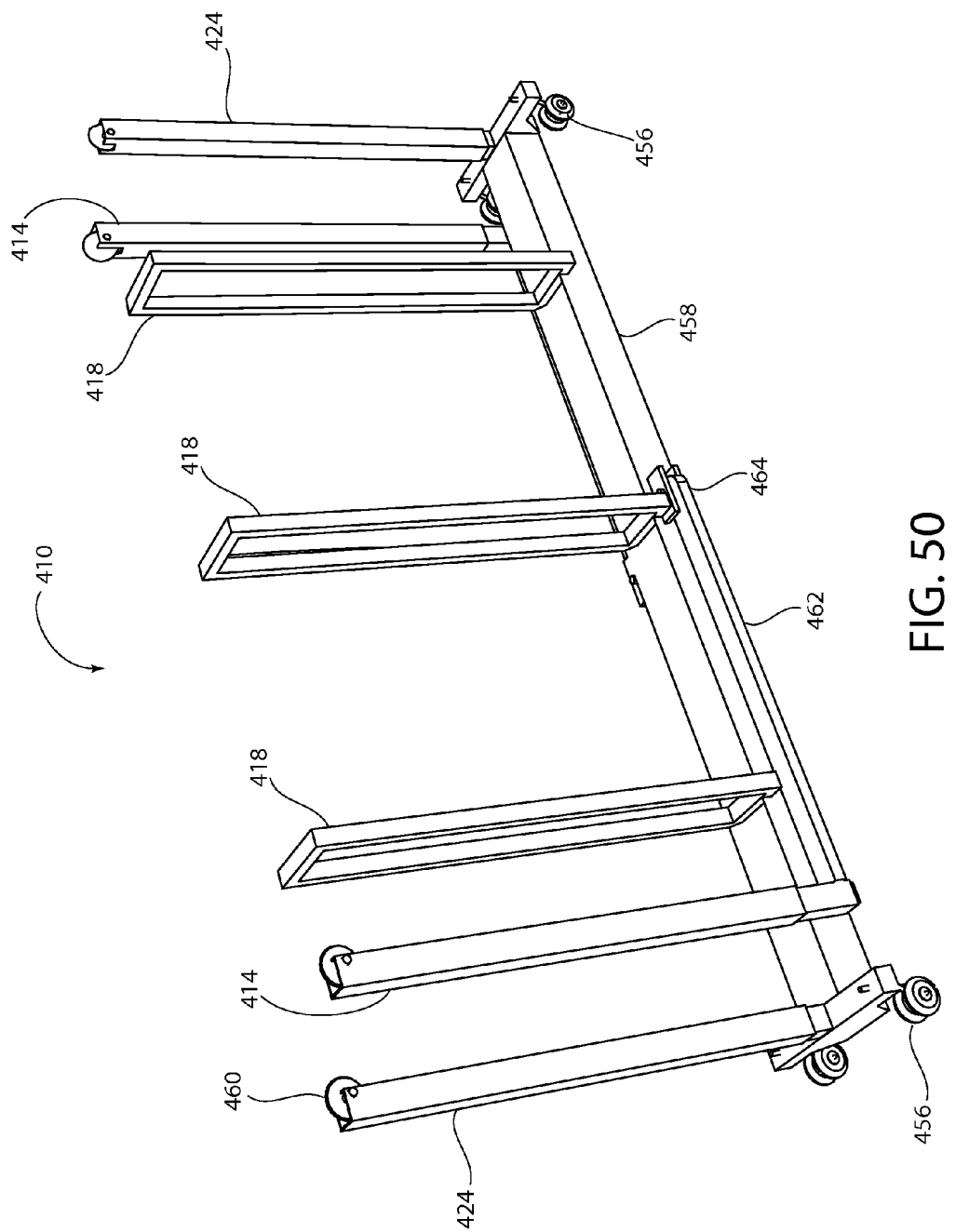
FIG. 50 illustrates a perspective view of a transportation carrier in position for transport of a solar PV roof deck.

FIG. 50 illustrates an embodiment of a wheeled transportation carrier 410 used to assemble a solar PV structure 400 of FIG. 41. The transportation carrier is shown in closed position ready for transport. Illustrated are the removable holding bars 418, the telescoping arms 414, the telescoping arms 424 located at the front and the back end, wheels 456, a chassis 458, and pulley guides 460. The size of the wheels is illustrative, for installation on soft ground or uneven terrain more and larger wheel or pneumatic tires can be used in place of the wheels 456. Wheel location and numbers may vary. Also some of the wheels may be driven or motorized to assist positioning of the wheeled transportation carrier 410 of FIG. 50. The telescoping arms include a pivot arm 462 connected to a pivot point 464 near the mid-point of the chassis 458 length. The pivot point can include a locking pivot so that the pivot arms 462 can be locked into place either in transport position or in installation position. The pivot arms 462 are illustrated 180 degrees in opposition. In an alternative embodiment, the pivot arms 462 are both facing the same end of the chassis 458.

Figure 51:
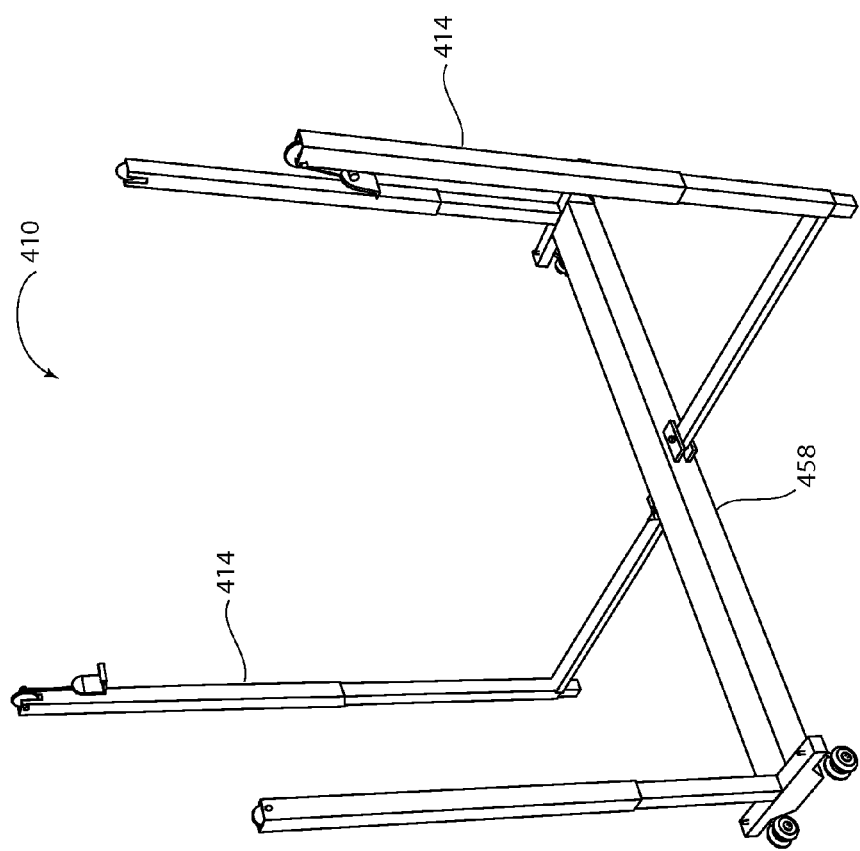
FIG. 51 illustrates a perspective view of the transportation carrier of FIG. 50 positioned for assembly of a solar PV structure.

FIG. 51 illustrates the wheeled transportation carrier 410 of FIG. 50 configured for installing a solar PV structure. The telescoping arms 414 are pivoted so that the pivot arms 462 are approximately 90 degrees with respect to the length of the chassis 458. The telescoping arms 414 are projected upward so that a solar PV roof deck can be lifted in an unfolded position above the height of a solar PV frame structure, such as the solar power frame structure 406 of FIG. 41. The telescoping arms 414 can be extended by a hand crank or hand lever, for example, using a hydraulic mechanism. Alternatively, the telescoping arm 414 can be extend by hand and held in place at a predetermined height by a holding pin. For larger installations requiring heaver transportation carriers, the telescoping arms 414 can be extended using a hydraulic mechanism powered electricity, gasoline, diesel, propane, or equivalents. Similarly, the telescoping arms 424 can be extended in a similar manner.

Figure 52:
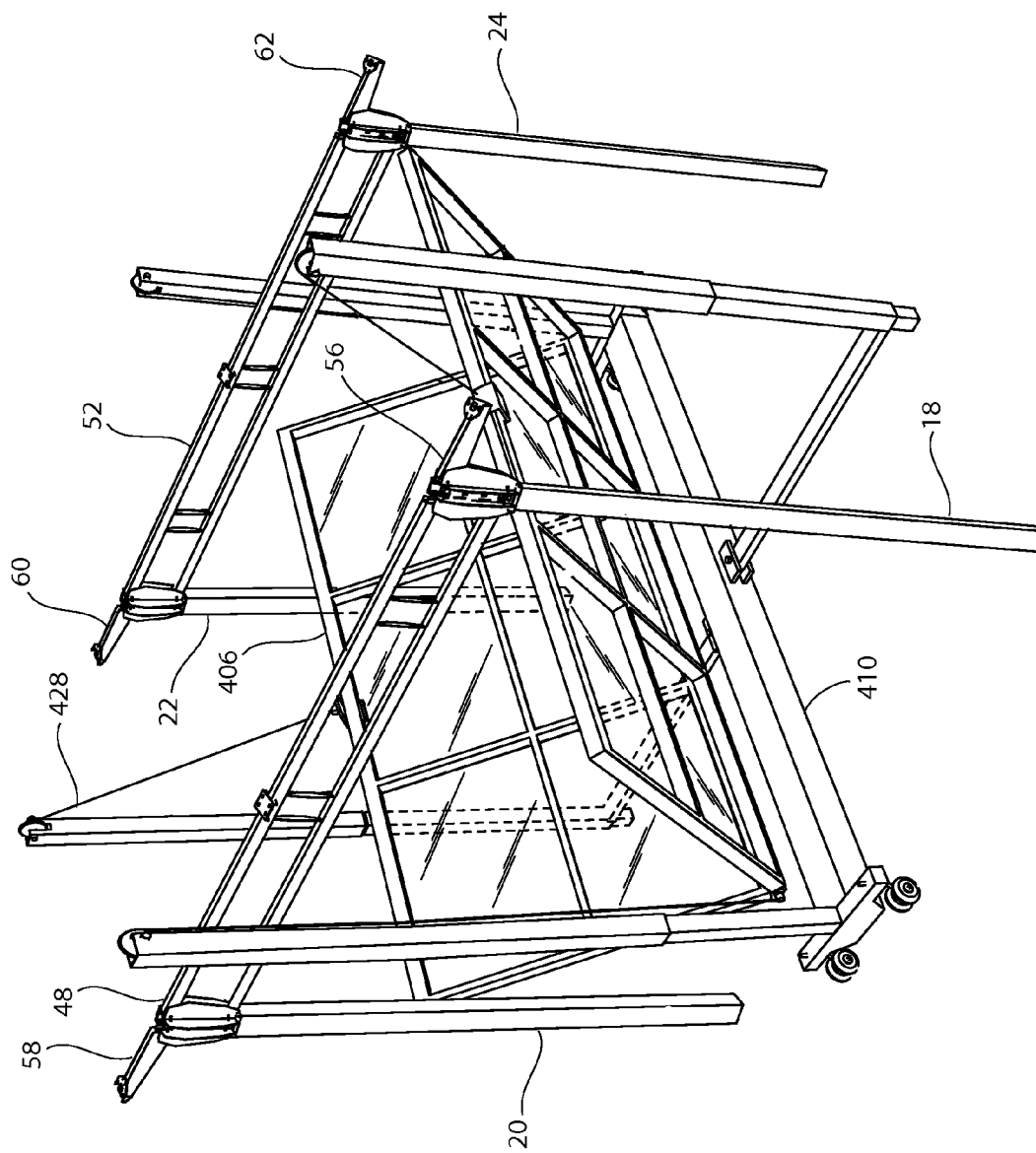
FIG. 52 illustrates using the transportation carrier of FIG. 50 in a deployment position FIG. 1.

While the described transportation carrier can be used to aid in the installation of a solar PV structure 400 of FIG. 41, it is not the inventor's intent to limit the wheeled transportation carrier 410 of FIG. 50 to only the illustrated structure. FIG. 52 illustrates the solar PV structure 10 of FIG. 1 adapted for installation with the wheeled transportation carrier 410. In the illustrated embodiment, the first support column 18, the second support column 20, the third support column 22, and the fourth support column 24, can be installed, for example, in a manner previously described and illustrated in FIG. 2. In addition, the first beam 48, the third beam 52, the first end support bracket 56, the second end support bracket 58, the third end support bracket 60, and the fourth end support bracket 62 can be installed in a manner previously described in this disclosure.

The transportation carrier can be used to lift and hold into place the solar PV roof deck 12 in a similar manner as described for the solar PV roof deck 406 of FIG. 41. The solar PV roof deck 406 is lifted by the pulley cables 428. The pulley cable 428 can be connected to the threaded lift hooks 308 of FIG. 23 that are secured to the hinge portion 290 of the upper hinge 246. Alternatively, the pulley cable 428 can be connected to the aperture 294 of FIG. 23. As the cable length between the top of the telescoping arm 424 and the hinge portion is shorted, an upward force is applied along each edge of the solar PV roof deck. This has the affect of creating an upward force along the hinge pivot line between the first panel section 248 and the second panel section 250.

After the solar PV roof deck 12 is fully unfolded above the partially assembled frame structure, the second beam 50, and the fourth beam 54 can be installed and secured in place. The solar PV roof deck 12 can be lowered on top of the assembled frame 348 by lowering the telescoping arms. The hinges can be removed and the solar PV roof deck structure secured to the assembled frame 348 in a manner previously described. The transportation carrier can be folded for transportation and removed from the solar PV structure 10.

Figure 53:
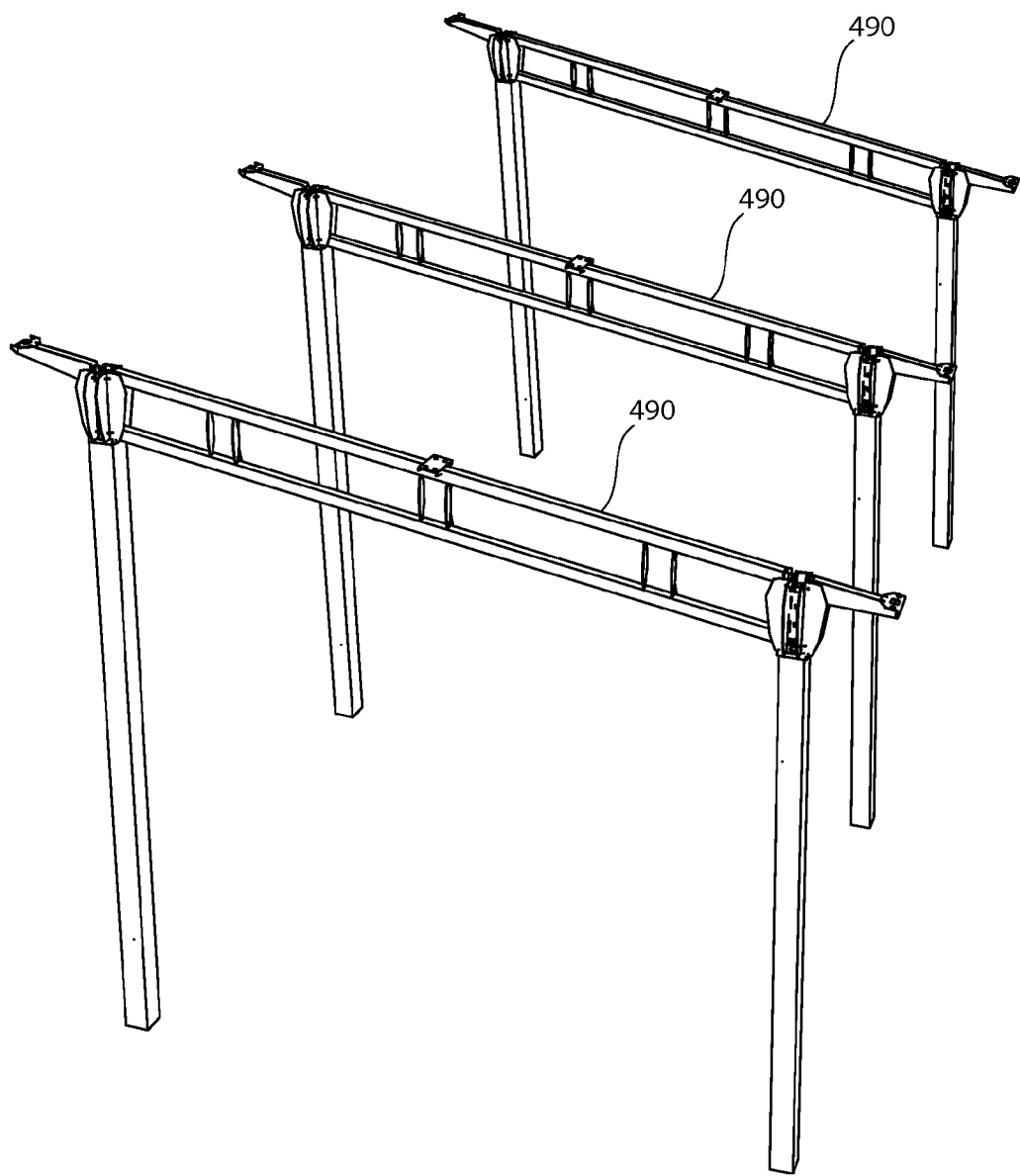
FIG. 53 illustrates frame sub-assemblies configured for installation of a solar PV roof deck using a transportation carrier.

Larger solar PV structures with two or more solar PV roof decks and six or more columns can be installed by repeating the above described process for each solar PV deck and frame section. FIG. 53 illustrates three of the frame sections 490, for a structure configured to receive two solar PV roof decks, and configured for installation by the wheeled transportation carrier 410 of FIG. 51. Each section can be assembled using the procedure described for FIG. 52. For solar energy structures with additional solar PV roof decks, the frame sections 490 can be secured before installation of any of the solar PV roof decks 12. Alternatively, the first two of the frame sections 490 can be secured in place, the solar PV roof deck 12 installed as described for FIG. 52, and each additional of the frame section 490 added one at a time after the solar PV roof deck 12 is installed.

A standalone or partially standalone solar PV structure, methods for assembling a solar PV structure, and apparatus to help facilitate deployment and assembly of a solar PV structure have been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A standalone or partially standalone solar photovoltaic (PV) structure, comprising:
    a solar PV roof deck including
        a support frame;
        a plurality of PV surfaces attached to the support frame;
    a beam for supporting the solar PV roof deck, the beam including an upper beam member, a lower beam member, and a beam end portion joining one end of the upper beam member and lower beam member, the beam end portion including an enclosed channel and an aperture for passing wires;
    the beam end portion including a hook and a tab extending away from the beam end portion, the hook and the tab forming a hook/tab pair;
    a support column, with a column top, the support column extending vertically beneath the solar PV roof deck;
    a column capital, secured to the column top, the column capital including a plurality of approximately vertical faces, the plurality of faces forming a hollow conduit;
    each face includes a plurality of slots for receiving the hook/tab pair and thereby securing the beam to the column in a fixed and non-rotatable position; and
    each face including an aperture for passing wires, the face aperture positioned and shaped to align with the beam end aperture.

2. The solar photovoltaic (PV) structure of claim 1 wherein the plurality of faces is four faces, the faces spaced at approximately 90-degree intervals, the hollow conduit having a rectangular cross section.

3. The solar photovoltaic (PV) structure of claim 2, further comprising:
    a first guide portion including a first planar surface and a second planar surface separated by approximately 90 degrees;
    a second guide portion including a third planar surface and a fourth planar surface separated by approximately 90 degrees;
    the four faces include a first face, a second face, and a third face;
    the first face forms a first vertical edge with the second face and the first face forms a second vertical edge with the third face;
    the first guide portion attaches along the first vertical edge such that the first planar surface is adjacent and perpendicular to the first face and the second planar surface is adjacent to and perpendicular to the second face; and
    the second guide portion attaches along the second vertical edge such that the third planar surface is adjacent and perpendicular to the first face and the fourth planar surface is adjacent and perpendicular to the third face.

4. The solar photovoltaic (PV) structure of claim 2 further including:
    the plurality of faces includes an outward face, the outward face oriented away from the solar PV roof deck;
    an end support bracket;
    the end support bracket includes a lower bracket portion and an upper bracket portion;
    the upper portion including a bracket end portion coupled to the support frame of the solar PV roof deck, the bracket end portion including an upper bracket aperture disposed to receive wires from the PV roof deck;
    the lower bracket portion including a lower bracket hook and a lower bracket tab extending outwardly away from the lower bracket portion, the lower bracket hook and the lower bracket tab forming a hook/tab arrangement;
    the lower bracket including a lower bracket aperture for passing wires received from the PV roof deck;
    the hook/tab arrangement configured to be received by the plurality slots of the outward face and thereby aligning and securing the end support bracket to the column; and
    the lower bracket aperture aligned and configured to pass wires received from the PV roof deck into the face aperture.

5. The solar photovoltaic (PV) structure of claim 1 wherein:
    the hook and the tab includes a first hook and a first tab forming a first hook/tab pair, and a second hook and a second tab forming a second hook/tab pair;

the beam end portion includes a first peripheral edge and a second peripheral edge;

the first hook/tab pair extends outward from the first peripheral edge, and the second hook/tab pair extends outward from the second peripheral edge; and the first hook, the first tab, the second hook, and the second tab are arranged so that the first hook is adjacent to the second tab.

6. The solar photovoltaic (PV) structure of claim 5 wherein:

the beam end portion is a first beam end portion and a second beam end portion, the second beam end portion on an opposing end of the beam from the first beam end portion; and the first beam end portion forms a complementary angle to the second beam end portion with respect a line defined along a length of the beam.

7. The solar photovoltaic (PV) structure of claim 2, wherein each face includes an associated guide portions extending perpendicularly away from the edge of corresponding face.

8. A standalone or partially standalone solar photovoltaic (PV) structure, comprising:

a foldable solar PV roof deck including:
   a pair of hinged frame members each including a surface for receiving a plurality of photovoltaic surfaces; and
   the pair of hinged frame members that when folded provides a pair of inward facing photovoltaic surfaces separated by a gap and when unfolded provides a planar photovoltaic top surface of the PV roof deck;

a plurality of column capitals;

a plurality of substantially vertical support columns, the vertical support columns each having one end coupled to an associated one of the column capitals;

a plurality of beams for supporting the solar PV roof deck, each beam including an upper beam member, a lower beam member, and two beam end portions, each beam end portion joining a corresponding end of the upper beam member and lower beam member each beam end portion including an enclosed channel and an aperture for passing wires, and each beam end portion including a hook and a tab forming a hook/tab pair;

each column capital including a plurality of approximately vertical faces, the plurality of faces forming a hollow conduit, each face including a plurality of slots for engaging and securing the hook/tab of the beam end portion of the associated one of the beams in a fixed and non-rotatable position; and each face including an aperture positioned and shaped the align with beam end aperture.

9. The solar photovoltaic (PV) structure of claim 8, further comprising:

a plurality of registration tab/alignment pin pairs for securing an associated one or more beams to the solar PV deck:
   each registration tab/alignment pin pair including a registration tab and an alignment pin; and
   one or more of each of the registration tab/alignment pin pairs is attached to the associated one of the beams.

10. The solar photovoltaic (PV) structure of claim 8, wherein each column capital is configured to receive and secure one or more of the plurality of beams at approximately 90-degree increments.

11. The solar photovoltaic (PV) structure of claim 10 wherein each column capital further comprises a plurality of planar surfaces, the planar surfaces each extending outward perpendicularly from the associated one of the faces of the associated one of the column capitals.

\* \* \* \* \*

UNITED STATES PATENT AND TRADEMARK OFFICE
CERTIFICATE OF CORRECTION

PATENT NO.        : 8,365,479 B2                                           Page 1 of 1
APPLICATION NO.   : 13/163655
DATED             : February 5, 2013
INVENTOR(S)       : Nicholas Brady Tucker It is certified that error appears in the above-identified patent and that said Letters Patent is hereby corrected as shown below:

In the Specification:

At column 8, line 47-48, change "complementary angles" to "supplementary angles with respect to the vertical plane 156."

Signed and Sealed this
Third Day of June, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,365,479 B2 | Page 1 of 1 |
| APPLICATION NO. | : 13/163655 | |
| DATED | : February 5, 2013 | |
| INVENTOR(S) | : Nicholas Brady Tucker | |

It is certified that error appears in the above-identified patent and that said Letters Patent is hereby corrected as shown below:

In the Specification:

At column 3, lines 5-7 delete: "FIG. 16 illustrates a solar PV roof deck structure with protective hinges folded for transportation in a shipping container."

Signed and Sealed this
First Day of December, 2015

Michelle K. Lee
*Director of the United States Patent and Trademark Office*